US011972402B1

(12) United States Patent
Hecht et al.

(10) Patent No.: US 11,972,402 B1
(45) Date of Patent: *Apr. 30, 2024

(54) REAL-TIME INTERBANK TRANSACTIONS SYSTEMS AND METHODS

(71) Applicant: Wells Fargo Bank, N.A., San Francisco, CA (US)

(72) Inventors: Alan W. Hecht, Chanhassen, MN (US); Ann M. Kirk, Deerwood, MN (US); Brian M. Pearce, Pleasanton, CA (US); Steven E. Puffer, Champlin, MN (US); Wairnola Marria Rhodriquez, San Francisco, CA (US); Javier S. Silva, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,078

(22) Filed: Apr. 4, 2022

Related U.S. Application Data

(63) Continuation of application No. 15/464,557, filed on Mar. 21, 2017, now Pat. No. 11,295,283, which is a
(Continued)

(51) Int. Cl.
*G06Q 20/00* (2012.01)
*G06Q 20/02* (2012.01)
(Continued)

(52) U.S. Cl.
CPC ......... *G06Q 20/102* (2013.01); *G06Q 20/023* (2013.01); *G06Q 20/108* (2013.01);
(Continued)

(58) Field of Classification Search
CPC .................................................... G06Q 20/00
See application file for complete search history.

(56) References Cited

U.S. PATENT DOCUMENTS 5,412,190 A     5/1995   Josephson et al.
5,465,206 A * 11/1995   Hilt ..................... G06Q 20/04
                                                           705/40

(Continued)

OTHER PUBLICATIONS

Towards an interoperable mobile wallet service Published in: 2013 10th International Conference and Expo on Emerging Technologies for a Smarter World (CEWIT) (pp. 1-6) Authors: Pradipta De • Kuntal Dey • Vinod Mankar • Sougata Mukherjea (Year: 2013).*

(Continued)

*Primary Examiner* — Bruce I Ebersman
*Assistant Examiner* — John A Anderson
(74) *Attorney, Agent, or Firm* — Foley & Lardner LLP

(57) ABSTRACT

Systems, methods, and computer-readable storage media for performing a peer-to-peer (P2P) transfer by a third-party, where a method includes receiving transfer information and a first token including sender information of a sender and a second token including receiver information of a receiver, and validating the first token and the second token based on verifying both the sender and the receiver are registered with the real-time payment system. The method includes processing the first token and the second token based on determining a sender endpoint, a receiver endpoint, and a demand deposit account of the sender, and transmitting a request for a guarantee, the request for the guarantee including the sender endpoint and the demand deposit account of the sender. The method includes receiving an issued guarantee, transferring funds based on the transfer information, the first token, and the second token, and transmitting a transfer confirmation.

17 Claims, 34 Drawing Sheets

Related U.S. Application Data continuation of application No. 15/045,215, filed on Feb. 16, 2016, now Pat. No. 11,068,866.

(60) Provisional application No. 62/239,823, filed on Oct. 9, 2015, provisional application No. 62/218,967, filed on Sep. 15, 2015, provisional application No. 62/181,028, filed on Jun. 17, 2015, provisional application No. 62/171,165, filed on Jun. 4, 2015, provisional application No. 62/117,293, filed on Feb. 17, 2015.

(51) Int. Cl.
  *G06Q 20/10* (2012.01)
  *G06Q 20/36* (2012.01)
  *G06Q 20/38* (2012.01)
  *G06Q 20/40* (2012.01)
  *G06Q 50/16* (2012.01)

(52) U.S. Cl.
  CPC ....... *G06Q 20/367* (2013.01); *G06Q 20/3674* (2013.01); *G06Q 20/387* (2013.01); *G06Q 20/401* (2013.01); *G06Q 20/4016* (2013.01); *G06Q 50/16* (2013.01); *G06Q 2220/00* (2013.01)

(56) References Cited

U.S. PATENT DOCUMENTS

| | | | | |
|---|---|---|---|---|
| 5,677,955 | A * | 10/1997 | Doggett | G06Q 20/367 380/30 |
| 5,930,778 | A | 7/1999 | Geer | |
| 6,076,074 | A | 6/2000 | Cotton et al. | |
| 7,076,458 | B2 | 7/2006 | Lawlor et al. | |
| 7,444,676 | B1 * | 10/2008 | Asghari-Kamrani | G06Q 20/341 713/168 |
| 7,505,937 | B2 | 3/2009 | Dilip et al. | |
| 7,747,523 | B2 | 6/2010 | Cohen | |
| 7,844,546 | B2 | 11/2010 | Fleishman et al. | |
| 7,930,411 | B1 | 4/2011 | Hayward | |
| 8,001,045 | B1 | 8/2011 | McClinton | |
| 8,175,968 | B2 | 5/2012 | O'Leary et al. | |
| 8,407,140 | B2 | 3/2013 | Ayala et al. | |
| 8,666,888 | B2 | 3/2014 | Edmonds et al. | |
| 8,751,379 | B1 | 6/2014 | Bueche, Jr. | |
| 9,779,392 | B1 | 10/2017 | Prasad et al. | |
| 9,928,490 | B1 | 3/2018 | Vancini et al. | |
| 10,515,368 | B1 | 12/2019 | Hecht et al. | |
| 2002/0026396 | A1 * | 2/2002 | Dent | G06Q 40/08 705/35 |
| 2002/0052852 | A1 * | 5/2002 | Bozeman | G06Q 20/24 705/64 |
| 2002/0099652 | A1 | 7/2002 | Herzen et al. | |
| 2003/0200184 | A1 | 10/2003 | Dominguez et al. | |
| 2003/0208440 | A1 | 11/2003 | Harada et al. | |
| 2004/0236688 | A1 | 11/2004 | Bozeman | |
| 2006/0015450 | A1 | 1/2006 | Guck et al. | |
| 2006/0036537 | A1 | 2/2006 | Lawrence et al. | |
| 2006/0041506 | A1 | 2/2006 | Mason et al. | |
| 2006/0053290 | A1 | 3/2006 | Randle et al. | |
| 2006/0136595 | A1 | 6/2006 | Satyavolu | |
| 2007/0038561 | A1 * | 2/2007 | Vancini | G06Q 20/108 705/39 |
| 2007/0255653 | A1 * | 11/2007 | Tumminaro | G06Q 20/3255 705/39 |
| 2007/0271193 | A1 * | 11/2007 | Tan | G06Q 20/027 705/79 |
| 2008/0154772 | A1 | 6/2008 | Carlson | |
| 2010/0030687 | A1 * | 2/2010 | Panthaki | G06Q 40/02 705/42 |
| 2010/0057614 | A1 * | 3/2010 | Rainey | G06Q 20/108 705/42 |
| 2011/0178927 | A1 | 7/2011 | Lindelsee et al. | |
| 2011/0191241 | A1 | 8/2011 | Blain et al. | |
| 2012/0136781 | A1 * | 5/2012 | Fridman | G06Q 20/405 705/40 |
| 2012/0173409 | A1 * | 7/2012 | Hu | G06Q 20/108 705/39 |
| 2012/0203689 | A1 | 8/2012 | Parvis | |
| 2012/0284175 | A1 | 11/2012 | Wilson et al. | |
| 2013/0018786 | A1 | 1/2013 | Sher | |
| 2013/0054461 | A1 | 2/2013 | Gupta et al. | |
| 2013/0238492 | A1 | 9/2013 | Muthu et al. | |
| 2013/0246274 | A1 | 9/2013 | Marcous et al. | |
| 2014/0101049 | A1 | 4/2014 | Fernandes et al. | |
| 2014/0114852 | A1 | 4/2014 | Rajagopal et al. | |
| 2014/0188728 | A1 | 7/2014 | Dheer et al. | |
| 2014/0236811 | A1 | 8/2014 | Etchegoyen | |
| 2014/0358796 | A1 * | 12/2014 | Smets | G06Q 20/3276 705/76 |
| 2015/0095225 | A1 | 4/2015 | Appana et al. | |
| 2015/0112866 | A1 | 4/2015 | Muthu et al. | |
| 2015/0193748 | A1 | 7/2015 | Pentel | |
| 2016/0283918 | A1 | 9/2016 | Weinflash | |
| 2016/0300225 | A1 | 10/2016 | Novac et al. | |

OTHER PUBLICATIONS

A token-based authorized file-sharing protocol for BitTorrent-like P2P systems Published in: The 5th International Conference on New Trends in Information Science and Service Science (vol. 1, pp. 155-158) Authors: Hung-Wen Yang • Chou-Chen Yang • Yi-Ju Lin • Woei Lin (Year: 2011).*

A novel architecture for asynchronous distributed real time banking. Author : Ghosh—Brown University USA. Published IEEE—Transactions vol. 23 Issue 3 p. 917-927. (Year: 1993).

Aljohani, A., "Mobile Payments With Instant Settlements," 2014 Eighth International Conference on Next Generation Mobile Apps, Services and Technologies, Oxford, 2014, pp. 181-185, doi: 10.1109/NGMAST.2014.61 (Year 2014).

Deposit Agreement—First National Bank of Omaha, Jun. 1, 2015, pp. 11-12.

* cited by examiner

REAL-TIME INTERBANK TRANSACTIONS SYSTEMS AND METHODS

CROSS-REFERENCE TO RELATED APPLICATIONS AND CLAIM OF PRIORITY

This application is a continuation of U.S. patent application Ser. No. 15/464,557, entitled "Real-Time Interbank Transactions Systems and Methods," filed on Mar. 21, 2017, which is a continuation of U.S. patent application Ser. No. 15/045,215, entitled "Real-Time Interbank Transactions Systems and Methods," filed Feb. 16, 2016, now U.S. Pat. No. 11,068,866, which claims the benefit of and priority to U.S. Provisional Patent Application No. 62/239,823, entitled "Real-Time Interbank Transactions Systems and Methods," filed on Oct. 9, 2015, U.S. Provisional Patent Application No. 62/218,967, entitled "Real-Time Interbank Transactions Systems and Methods," filed on Sep. 15, 2015, U.S. Provisional Patent Application No. 62/181,028, entitled "Real-Time Interbank Transactions Systems and Methods," filed on Jun. 17, 2015, U.S. Provisional Patent Application No. 62/171,165, entitled "Interbank Payload Messaging System and Method," filed on Jun. 4, 2015, and U.S. Provisional Patent Application No. 62/117,293, entitled "Interbank Account Verification and Funds Transfer System and Method," filed on Feb. 17, 2015, each of which is incorporated herein by reference in their respective entireties and for all purposes.

This application is related to U.S. patent application Ser. No. 14/496,493, entitled "Interbank Account Verification and Funds Transfer System And Method," filed on Sep. 25, 2014, which claims priority to U.S. Provisional Patent Application Ser. No. 61/885,459, entitled "Interbank Account Verification and Funds Transfer System And Method," filed on Oct. 1, 2013, both of which are incorporated herein by reference in their respective entireties and for all purposes.

TECHNICAL FIELD

The present application relates generally to the field of interbank fund transfers. In particular, they relate to systems and methods for transmitting data payloads as part of a fund transfer from a first account at a first financial institution to a second account at a second financial institution in approximately real-time.

BACKGROUND

Payments made between individuals and businesses are often made from accounts held at financial institutions such as banks, e.g., from a checking account via a check or ACH transfer. In situations in which a payor (i.e., the paying individual or business) and a payee (i.e., the receiving individual or business) initiate a transaction involving two different financial institutions, the transaction may take a few days to clear such that the funds are available to the payee. For example, if the payor writes a check from a first financial institution to the payee for deposit in a second financial institution, the second financial institution may hold the transaction as pending for a number of days until the transaction is verified and approved by both the first and second financial institutions. During the time the transaction is pending, the payee may not have access to the funds provided by the payor. Additionally, the financial institutions may be at risk for duplicate transactions based on the same financial instrument (e.g., the same check being deposited twice). Enhanced systems and methods of facilitating such payments would be desirable.

SUMMARY

One example embodiment relates to a method of transmitting a data payload in real-time between an originator and a recipient. The method includes receiving, by an intermediary computing system, a first message including a data payload and an identity token from an originator computing system associated with the originator. The method includes cross-referencing, by the intermediary computing system, the identity token with a routing directory to identify a financial institution associated with the recipient and to identify the recipient. The method further includes transmitting, by the intermediary computing system, a second message including the data payload and an identity of the recipient to a financial institution computing system associated with the financial institution.

Another example embodiment relates to a method of performing a real-time non-inquiry electronic transaction. The method includes receiving, by a depository bank computing system associated with a depository bank, a request to transfer funds from a paying bank and into an account associated with a customer of the depository bank. The method further includes determining, by the depository bank computing system, that the request to transfer funds corresponds to a non-inquiry transaction based at least in part on an amount of funds being transferred falling below a non-inquiry transaction limit. The method includes sending, by the depository bank computing system, a message including transaction information to an account verification service. The method further includes crediting, by the depository bank computing system, the account with the amount of funds such that the amount of funds are made available for the customer to use in real-time.

A further example embodiment relates to a method. The method includes receiving, by an account verification service computing system, a credit push from a first financial institution computing system associated with a first financial institution. The credit push includes a unique transaction, an identity of a second financial institution, and a payee identifier. The method further includes forwarding, by the account verification service computing system, the credit push to a second financial institution computing system associated with the second financial institution. The method includes receiving, by the account verification service computing system, a credit push response message from the second financial institution computing system. The credit push response message includes an indicator that the credit push was accepted. The method further includes forwarding, by the account verification service computing system, the credit push response message to the first financial institution computing system.

Another example embodiment relates to a method. The method includes receiving, by a financial institution computing system associated with a first financial institution, a payment request associated with a transaction from a payer, the payment request including a payment amount and a payee identity token. The method further includes cross-referencing, by the financial institution computing system, a payee directory with the payee identity token to identify a payee that has an account with a second financial institution. The method includes sending, by the financial institution computing system and to an account verification service computing system, a credit push request identifying the second financial institution, a unique transaction identifier, and the payee token. The method includes receiving, by the financial institution computing system and from the account verification service computing system, a credit push response message from the second financial institution. The credit push response message includes an indicator that the credit push request was accepted. The method includes debiting, by the financial institution computing system, the payment amount from an account associated with the payer.

These and other features, together with the organization and manner of operation thereof, will become apparent from the following detailed description when taken in conjunction with the accompanying drawings.

DETAILED DESCRIPTION

Fund transfer systems and methods that provide an option to conditionally use real-time interaction between financial institutions to facilitate substantially real-time transfers of funds between the financial institutions are described. The fund transfer systems and methods may enable funds transfers in which the payor and the payee have accounts at different financial institutions to be processed approximately as quickly as funds transfers in which the payor and the payee have accounts at the same financial institution. Hence, for example, a depository bank may treat funds transfers from other banks in the same manner as it treats funds transfers between its own account holders because it has the ability to check funds availability for the payor account at the paying bank in real-time. In example embodiments, an account verification service is used as a conduit for information in connection with the funds transfer interactions. The account verification service provides a conduit for the real-time funds transfer. The real-time interaction between financial institutions may include operations such as account inquiries, transaction completings, and transaction reversals via the account verification system. The real-time interaction between financial institutions may provide the ability for financial institutions to have insight to account holder transactions intra-day for account holders at other financial institutions using actual/real-time account information at paying financial institution. The arrangement may also be used for check cashing transactions in which a person cashes a check at a first bank, but the person is not customer of the first bank and the check is from an account held by a payor at a second bank.

In various embodiments, in addition to check transactions, the arrangement may also be used for financial transactions through other types of payment networks, such as automated clearing house (ACH) payments, automated teller machine (ATM) transactions, debit card transactions, mobile banking transactions, peer-to-peer payments, customer-to-business payments, business-to-customer payments, and the like. For example, in various embodiments, when a check from another bank is deposited, the customer of the depository bank may receive immediate access to the transferred funds. That is, instead of only receiving memo credit, in which the deposit transaction is reflected but the funds are not made available and the transaction is designated as "pending," the funds are decremented at the paying bank and credited at the depository bank in real-time. Hence, the funds may be made available to the customer of the depository bank at a time substantially immediate to the time when the deposit is made. The funds transfer is authorized and occurs in real-time.

Figure 1:
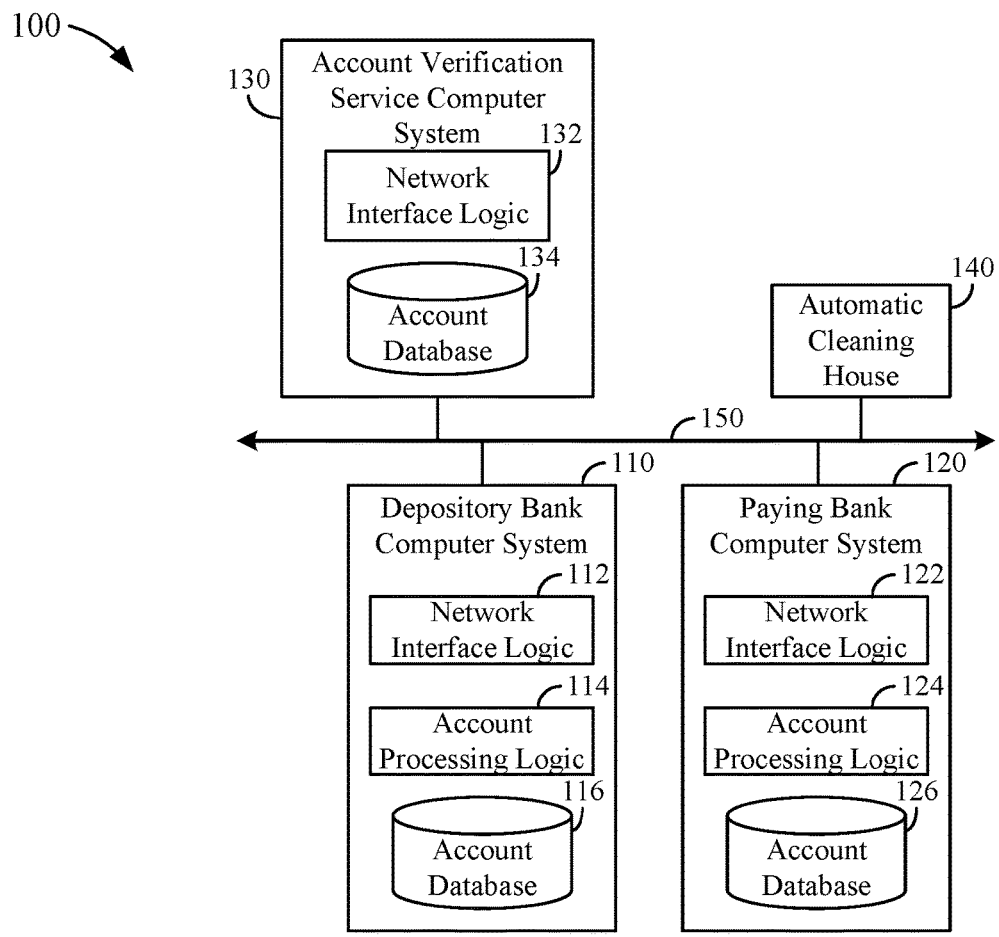
FIG. 1 is a schematic diagram of a fund transfer system in which a payor and a recipient use different banking institutions according to an example embodiment.

Referring to FIG. 1, a fund transfer system 100 that implements a payment network is shown. The fund transfer system 100 may be utilized by payors to send funds to payees and by payees to receive the funds from payors, e.g., via check, ACH, or in another manner. The payors and payees may be individuals or business entities. The fund transfer system 100 may be used for both intrabank transfers (i.e., transfers in which the payor and the recipient both have accounts at the same bank and the funds are transferred between the accounts within the same bank) and interbank transfers (i.e., transfers in which the payor and the recipient have accounts at different banks and the funds are transferred between the accounts at different banks).

The fund transfer system 100 may include, among other systems, a depository bank computer system 110, a paying bank computer system 120, an account verification service computer system 130, and an automated clearing house (ACH) computer system 140. Each of the above described systems may communicate through a network 150, which may include one or more of the Internet, a proprietary banking network, and so on. In FIG. 1, and throughout the remaining description, for sake of providing an example, it is assumed that the payee receives the funds using a first demand deposit checking account maintained by the depository bank computer system 110, and the payor performs a funds transfer out of a second demand deposit checking account maintained by the paying bank computer system 120. The depository bank associated with the depository bank computer system 110 is a different financial institution than the paying bank associated with the paying bank computer system 120. Hence, the computer system 110 is sometimes referred to herein as the depository bank computer system 110 and the computer system 120 is sometimes referred to herein as the paying bank computer system 120. It will be appreciated of course that any given bank computer system may operate in different capacities in the context of different fund transfer transactions.

The depository bank computer system 110 is operated by a bank institution that maintains accounts held by customers, such as demand deposit accounts, credit card accounts, home mortgage loans, student loans, and so on. The bank computer system 110 may, for example, comprise one or more servers each with one or more processors configured to execute instructions stored in memory, send and receive data stored in memory, and perform other operations to implement the operations described herein associated with logic or processes shown in FIGS. 1-26.

The bank computer system 110 may include network interface logic 112, account processing logic 114, and an account database 116. The network interface logic 112 may include, for example, program logic that connects the bank computer system 110 to the network 150. The network interface logic 112 may facilitate secure communications between the bank and the payor and/or the recipient. The network interface logic 112 may also facilitate communication with other entities, such as other banks, settlement systems, and so on.

The account processing logic 114 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a payor or recipient of funds), the account processing logic 114 reflects an appropriate debit or credit in the account database 116, which stores account information (e.g., transactions, information about the account holder, and so on) for accounts that are maintained by the bank on behalf of its customers. In some arrangements, the account processing logic 114 performs various tokenization functions associated with the processed transactions. The tokenization functions include the ability to create tokens that identify customer accounts involved in the transactions. Each token may be a string of characters (e.g., numbers, letters, symbols) that represents an encoded version of a customer account number associated with a given transaction. The tokenized account number can be retrieved from the token by decoding the token. The use of tokens instead of actual customer account numbers provides an added layer of data theft protection thereby further protecting the integrity of customer accounts.

The paying bank computer system 120 may be configured in a similar manner as the depository bank computer system 110. Thus, the bank computer system 120 comprises network interface logic 122, account processing logic 124, and account database 126 corresponding to the network interface logic 112, account processing logic 114, and account database 116 of the bank computer system 110.

The account verification service computer system 130 may be associated with an account verification service that is configured to facilitate interbank fund transfers, e.g., an account verification service provided by a non-bank entity as previously mentioned. The account verification service may, for example, be an entity that is formed as a joint venture between banks and/or other entities that send and receive funds using the fund transfer system 100. As another example, the account verification service may be a third-party vendor. In some arrangements, the account verification service computer system 130 includes tokenization logic in a similar manner as described above with respect to processing logic 114 and processing logic 124. Accordingly, the account verification computer system 130 can encode (i.e., tokenize) account numbers into tokens and decode (i.e., detokenize) received tokens into customer account numbers.

Herein, the banks associated with computer systems 110 and 120 are assumed to be "member banks." That is, the banks associated with computer systems 110 and 120 are assumed to follow established protocols for transferring funds using the fund transfer system 100. For example, in the context of an account verification service that is created as a joint venture, the member banks may include at least the banks that are part owners of the joint venture, as well as potentially other banks. While two member banks are shown in FIG. 1, it will be appreciated that there may be additional member banks. Additionally, other financial entities, such as check cashing companies and payday loan companies, may subscribe to the account verification service.

The account verification service computer system 130 may, for example, comprise one or more servers each with one or more processors configured to execute instructions stored in memory, send and receive data stored in memory, and perform other operations to implement the operations described herein associated with logic or processes shown in FIGS. 1-8. The account verification service computer system 130 includes network interface logic 132. The account verification service computer system 130 is a pass-through system that communicates with the computer systems 110 and 120.

The account verification service computer system 130 may serve as an information repository that may be accessed by banks and other financial institutions for fraud prevention and risk management. The financial institutions may share account information regarding their respective customers. For example, before completing a transaction, the financial institutions may access information stored in database 134 to assess the likelihood that the transaction is fraudulent. The account verification service computer system 130 may store information relating to whether accounts are opened, whether accounts are closed, and/or returned transaction items associated with accounts of member banks. As described in further detail below, the account verification service computer system 130 may serve as a conduit for the real-time or near real-time exchange of account information between member banks regarding customers of other ones of the member banks. The account verification service computer system 130 may also provide services, such as fraud prevention services and check verification services, to other financial institutions (e.g., check cashing businesses, payday loan businesses, currency exchanges, etc.).

The Automatic Clearing House (ACH) system 140 is used to transmit funds to and from bank accounts of the payors and payees. As is known, the ACH Network is a nationwide batch-oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. In non-guaranteed transaction situations, the RDFI may reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified. In some arrangements, the ACH system 140 includes tokenization logic in a similar manner as described above with respect to processing logic 114 and processing logic 124. Accordingly, the ACH system 130 can encode (i.e., tokenize) account numbers into tokens and decode (i.e., detokenize) received tokens into customer account numbers.

Figure 2:
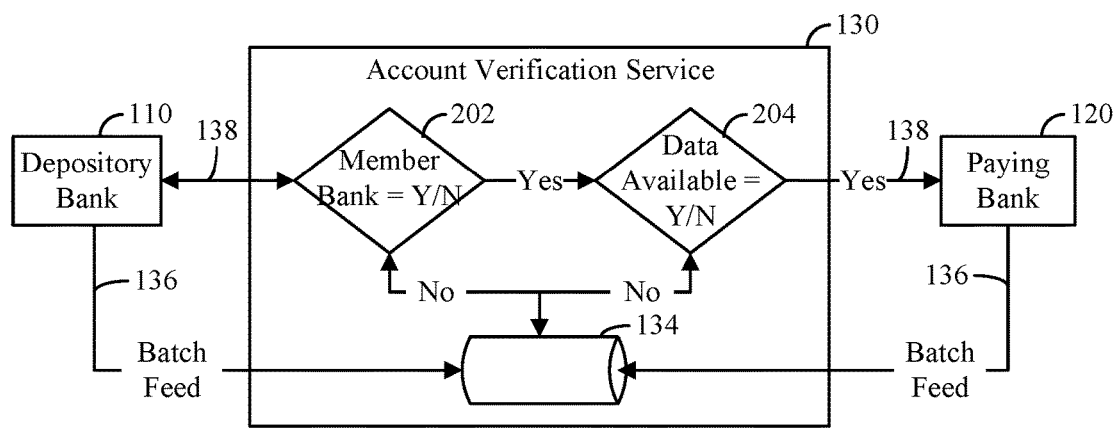
FIG. 2 is a data flow diagram showing movement of data between a depository bank, a paying bank, and an account verification service in connection with a funds transfer, according to an example embodiment.

Referring now to FIG. 2, FIG. 2 is a data flow diagram showing movement of data between paying bank computer system 110, depository bank computer system 120, and account verification service computer system 130 in connection with a funds transfer, according to an example embodiment. As shown in FIG. 2, depository bank computer system 110 and paying bank computer system 120 interact via account verification service computer system 130. In the example embodiment, two data channels 136 and 138 are provided through the account verification service computer system 130 For example, the data channel 136 may be a batch feed data channel and the data channel 138 may be a real-time data channel. For example, at predetermined intervals (e.g., at a predetermined time on certain days in the week, once per day, or at another interval), each of the member financial institutions may conduct a batch transfer of data to the account database 134 maintained by the account verification service computer system 130. Such information may be used for purposes of fraud detection and prevention, as previously described.

Data channel 138 may be a real-time data channel to permit real-time access to banking data of the payor. For example, via data channel 138, depository bank computer system 110 may obtain access to real-time account information for the payor from the database 126 of the paying bank computer system 120. Hence, the information that is made available via data channel 138 may be as up to date as information that would be received by the payor if the payor went into an online banking area of a website of the paying bank computer system 120.

As shown generally by decision blocks 202 and 204 in FIG. 2, at the time of a transaction, the depository bank computer system 110 may send a message to the account verification service computer system 130. The message may comprise information describing a transaction, such as a transaction channel (e.g., where the transaction is occurring, such as in a store location of a bank, at an ATM machine, via a mobile device, and so on), a transaction reference ID, a transaction amount, an account number (e.g., including bank routing number) or tokenized account number of the payor, and so on. The message may also include metadata, such as a field indicating a message type (e.g., inquiry, complete, reverse, etc.). When the message is received, the verification service computer system 130 may ascertain whether the paying bank identified in the message is a member bank (202) and whether the computer system of the paying bank is available for real-time interaction (204). For example, although a bank may be a member of the account verification service, the bank may have decided to only utilize the batch feed data channel 136 and not the real-time data channel 138. Hence, at 204, the bank may not be available for real-time interaction. If either of decision steps 202 or 204 is not met, then the batch feed data channel 136 may be utilized to complete the transaction. As described in further detail below, if either of the decision steps 202 or 204 is met, the requested transaction may be carried out via the real-time data channel 138 in a faster manner than ordinarily carried out through the batch feed data channel 136. For transactions occurring over the real-time data channel 138, the paying bank can provide a guarantee to the depository bank that certain funds for the contemplated transaction are available, thereby allowing real-time or near-real-time transactions via the data channel 138. The paying bank may offer the guarantee in exchange for a fee. In some arrangements, account numbers transmitted to and from the account verification service computer system 130 can be encoded as tokens as described in more detail above.

Figure 3:
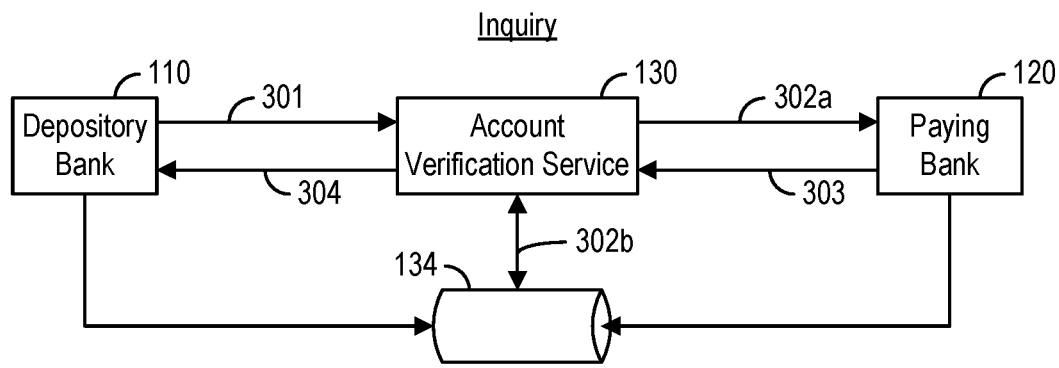
FIG. 3 is a process in which an inquiry is made by a depository bank to a paying bank via an account verification service, according to an example embodiment.

Referring now to FIG. 3, FIG. 3 is a process in which an inquiry is made by a depository bank to a paying bank via an account verification service, according to an example embodiment. At 301, an inquiry is made by the depository bank computer system 110. Specifically, an inquiry message may be sent from the depository bank computer system 110 to the account verification service computer system 130. The inquiry may be made that sufficient funds are available in the payer's account to cover a transaction, that the payer's account is open, that the transfer is within transfer limits, or that the transfer does not violate another account rule. If the inquiry is processed using data obtained via the real-time data channel 138, then at 302a the inquiry is forwarded to the paying bank computer system 120 by the verification service computer system 130. At 303, a response is received by the verification service computer system 130 from the paying bank computer system 120. The response received by the verification service computer system 130 may include a guarantee from the paying bank that the funds are available. The guarantee may be in the form of an offer. For example, the guarantee may indicate that the paying bank is willing to guarantee the funds for the requested transaction. The offer of the guarantee is made at the option of the paying bank (i.e., the paying bank may decide not to offer the guarantee if it is concerned about the availability of the funds), and the acceptance of the guarantee is made at the option of the depository bank. The guarantee may include a reference number to associate the guarantee with the specific transaction inquired about in FIG. 3. The reference number may be stored in the database 134 of the account verification service for later retrieval. The results of the initial inquiry and any guarantee are transmitted from the account verification service computer system 130 to the depository bank computer system 110 at 304. If the inquiry is processed using data obtained via the batch feed data channel 306, then at 302b the inquiry is processed by the verification service computer system 130 using data stored in database 134.

In some arrangements, the initial inquiry made by the depository bank computer system 110 at 301 includes a request to return a token representing the customer account number associated with the funding source at the paying bank. The requested token may be generated by the paying bank computer system 120 and returned to the depository bank computer system 110 at 304 along with an offer to guarantee at 304. In other arrangements, the depository bank computer system 110 already has the token relating to the paying customer's account number. For example, the depository bank computer system 110 may have previously received the token from a prior transaction, and stored the token for later use. Alternatively, the depository bank computer system 110 may have directly contacted the paying bank computer system 130 and requested the token based on established paying customer information (e.g., name, address, user identification, phone number, etc.). The token can later be passed from the depository bank computer system 110 to the paying bank computer system 120 in a batch settlement file for completing the transaction (e.g., as described below with respect to FIG. 6) instead of passing the actual account number. The paying bank would then recognize the token in the settlement file and decode the token (i.e., detokenize) into the actual account number for debiting the paying customer's account and finalizing the transaction.

Figure 4:
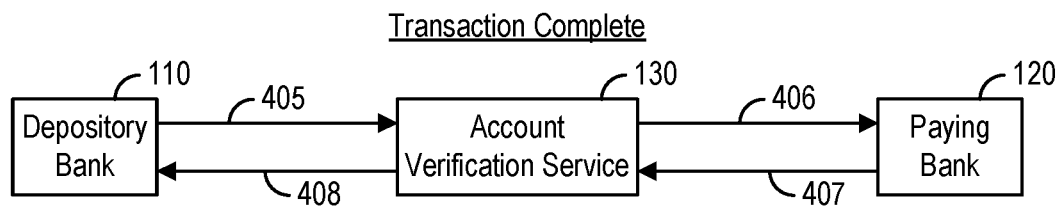
FIG. 4 is a process in which a transaction involving a depository bank, a paying bank, an account verification service, is completed according to an example embodiment.

Referring now to FIG. 4, FIG. 4 is a process in which a transaction is completed (e.g., the transaction is completed) between a depository bank and a paying bank via an account verification service, according to an example embodiment. For example, after the inquiry is made as described in FIG. 3, and it is determined based on the inquiry that the transaction may proceed, the transaction may be completed in accordance with the process of FIG. 4. At 405, a complete message may be sent from the depository bank computer system 110 to the account verification service computer system 130. The complete message may include an acceptance or a rejection of the guarantee from the paying bank. If the depository bank accepts the guarantee offer, a guarantee agreement is formed between the depository bank and the paying bank. The guarantee enables the depository bank to make funds associated with the transaction immediately available (or substantially immediately available) to the customer of the depository bank. The complete message is processed via the real-time data channel 138. Hence, at 406, the complete message, along with the acceptance or rejection of the guarantee offer, is forwarded to the paying bank computer system 120 by the verification service computer system 130. At 407, a message confirming the complete is received by the verification service computer system 130 from the paying bank computer system 120. In situations in which the guarantee is accepted by the depository bank, the message confirming the complete includes a reference number associating the accepted guarantee with the completed transaction. The reference number may be stored in the database 134 of the account verification service for later retrieval. At 408, the message confirming the complete is forwarded by the verification service computer system 130 to the depository computer system 110. The account processing logic 114 and 124 may immediately update account databases 116 and 126 to reflect the transaction. In some arrangements, the account processing logic 124 may need to decode (i.e., detokenize) a token representing the paying customer's account number in order to update the account database 126.

Figure 5A:
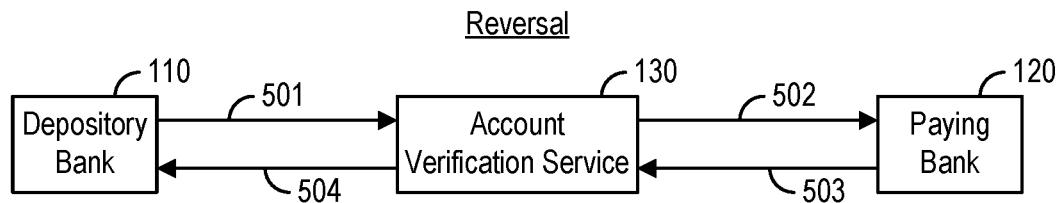
FIG. 5A is a process in which a reversal is made involving a depository bank, a paying bank, an account verification service, according to an example embodiment.

Referring now to FIG. 5A, FIG. 5A is a process in which a reversal is made involving a depository bank, a paying bank, an account verification service, according to an example embodiment. For example, after the transaction is completed in FIG. 4, it may become necessary to reverse the transaction (e.g., for transactions where a guarantee did not meet base requirements due to fraud or another reason). At 501, a reversal message may be sent from the depository bank computer system 110 to the account verification service computer system 130. The reversal message is processed via the real-time data channel 138. Hence, at 502, the reversal message is forwarded to the paying bank computer system 120 by the verification service computer system 130. At 503, a message confirming the reversal is received by the verification service computer system 130 from the paying bank computer system 120. At 504, the message confirming the reversal is forwarded by the verification service computer system 130 to the depository computer system 110. Hence, in addition to complete transactions in real-time, the arrangement of FIG. 1 may be further configured to reverse transactions in real-time. Again, the account processing logic 114 and 124 may immediately update account databases 116 and 126 to reflect the reversal of the transaction.

Figure 5B:
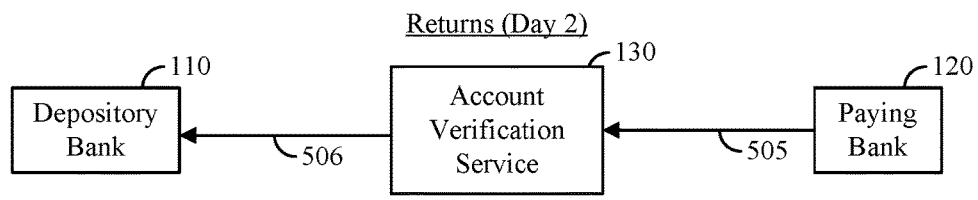
FIG. 5B is a process in which a return is made for a guaranteed transaction involving a depository bank, a paying bank, an account verification service, according to an example embodiment.

Referring now to FIG. 5B, FIG. 5B is a process in which a return is made for a guaranteed transaction involving a check deposit via the system 100. For example, if a check is guaranteed by the paying bank 120 to clear at the depository bank 110, but fraud is determined to be associated with the check, the paying bank 120 may wish to return the check to override the guarantee after ACH transfer (thus, "day 2"). The process of FIG. 5B is substantially similar to the reversal of FIG. 5A. At 505, a return message may be sent from the paying bank computer system 120 to the account verification service computer system 130. The return message may include a bank return file having information about the returned transaction (e.g., an image cash letter, ACH file, etc.). The return message is processed via the real-time data channel 138. Hence, at 506, the return message is forwarded to the depository bank computer system 110 by the verification service computer system 130. The depository bank debits the account that was credited by the fraudulent check in a chargeback to the depository account. In some arrangements, the depository bank computer system 110 transmits a confirmation of the return to the paying bank computer system 120 via the verification service computer system 130 from the paying bank computer system 120.

Figure 6:
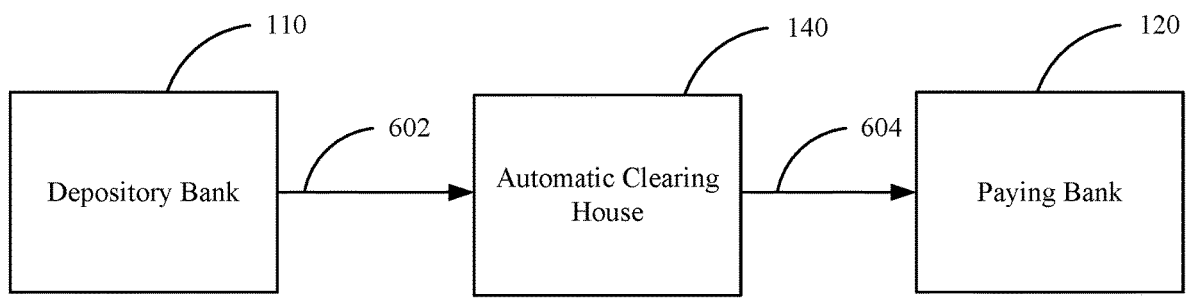
FIG. 6 is a process in which a final settlement is made involving a depository bank, a paying bank, and an account verification service, according to an example embodiment.

Referring to FIG. 6, FIG. 6 is a process in which a final settlement is made involving a depository bank, a paying bank, and an ACH service, according to an example embodiment. For example, after the transaction is completed in FIG. 4, at 602, the depository bank computer system 110 sends a standard settlement message indicating the transaction completed in FIG. 4 is complete. Specifically, the settlement message may be sent from the depository bank computer system 110 to the ACH computer system 140, where the message is stored in the database 134. The settlement message may include any guarantee reference number associated with the transaction. In some arrangements, the account verification computer system 130 verifies the transaction data against any guarantee made by the paying bank by cross referencing a transaction number of the settled transaction against a listing of transaction numbers of guaranteed transactions (e.g., by comparing reference numbers of the transaction settlement message and the transaction guarantee from the paying bank). The standard settlement message is then transmitted to the paying bank computer system 120 at 604. Specifically, the standard settlement message indicating that the depository bank computer system 110 completed the transaction is sent from the ACH computer system 140 to the paying bank computer system 120. In some arrangements, the account processing logic 124 may need to decode (i.e., detokenize) a token representing the paying customer's account number in order to finalize the transaction.

If the paying bank guaranteed the transaction, then the paying bank is still obligated to transfer the funds even if it ultimately turns out that the payor did not have sufficient funds for the transaction. By way of example, a payor may have an account balance of $500 and then deposit a check for $750, resulting in a tentative account balance of $1,250. The payor may then write a check to the payee for $1,000, the payor bank may offer a guarantee based on the tentative account balance of $1,250, and the guarantee offer may be accepted by the depository bank. If it ultimately turns out that there were insufficient funds in the account of the person that wrote the $750 check, such that the check had to be returned and the $750 in funds were not available for purposes of the present transaction, then the paying bank is still obligated to transfer the funds to the depository bank. For example, if the $750 check came back as insufficient prior to settlement, the paying bank is still obligated to complete the transaction even though it knows there are insufficient funds in the account of the payor to fund the transaction. As another example, if the $750 check came back as insufficient after settlement, the paying bank would have no recourse against the depository bank to have the funds returned. Conversely, if the guarantee offer was not accepted, then the paying bank would not be obligated to complete the transaction or would be able to seek return of the funds if the transaction had already been completed.

Figure 7:
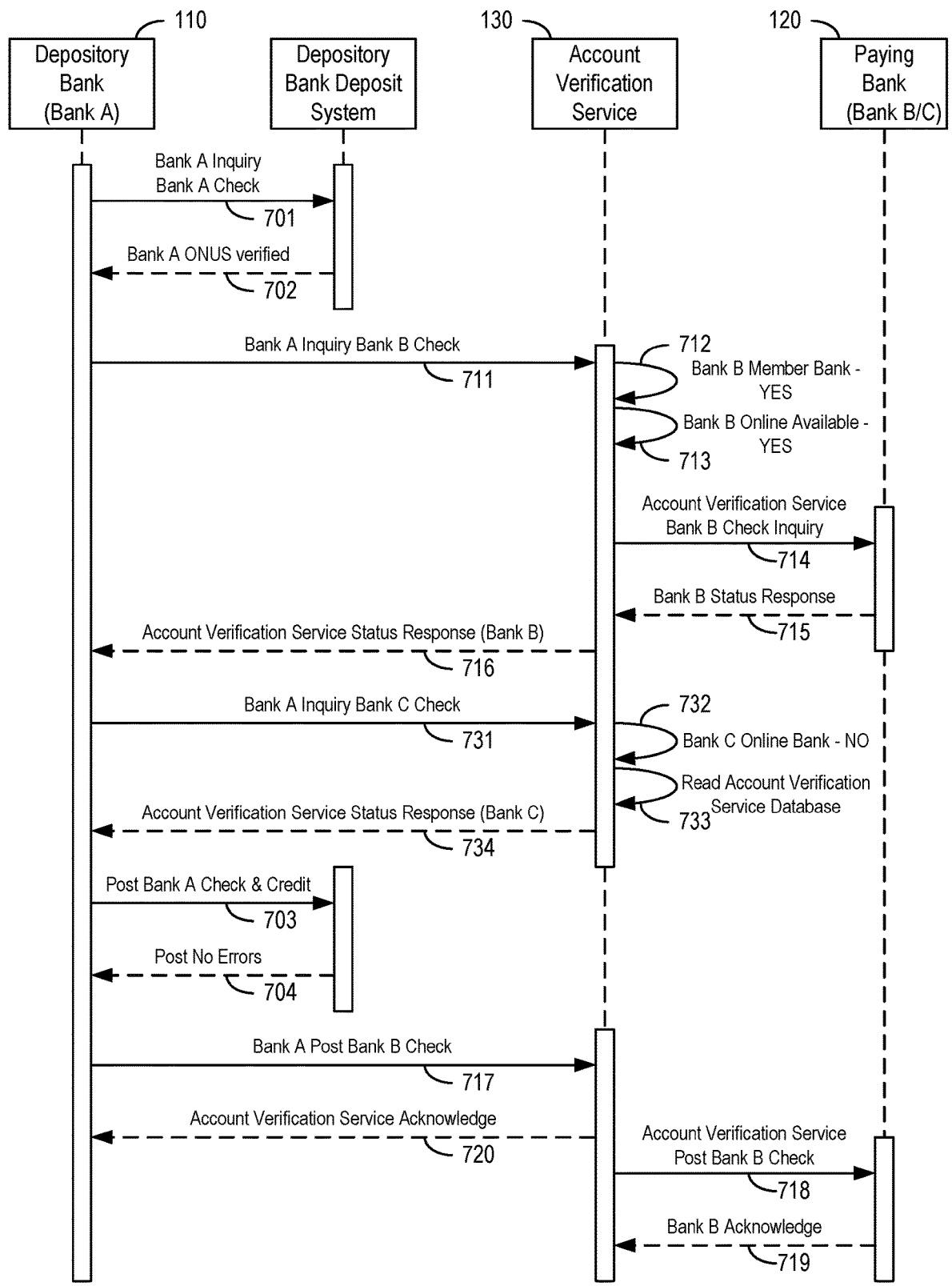
FIG. 7 shows a variety of funds transfers being processed with account verification, according to an example embodiment.

Referring now to FIG. 7, FIG. 7 shows a variety of funds transfers being processed with account verification, according to an example embodiment. FIG. 7 shows how the arrangement of FIG. 1 may be used by the depository bank to process transactions (e.g., checks) from different sources, including the depository bank itself (intrabank transactions), a payor bank (other than the depository bank) that uses the real-time data channel 138, and a payor bank (other than the depository bank) that does not use the real-time data channel 138. In FIG. 7, the depository bank is referred to as simply "Bank A" and the paying bank of FIG. 1 is shown alternately as "Bank B" and "Bank C." For purposes of providing an example, it is assumed in the discussion of FIG. 7 that checks are being processed. As has been previously described, the funds transfers may also occur via other mechanisms (e.g., ACH, other payment networks, etc.).

First, with regard to intrabank transactions, at 701, Bank A receives a check from a customer. The check is written by another customer of Bank A from an account held with Bank A. Hence, at 702, the transaction is verified as an intrabank transaction ("on-us"). At 703, the transaction is completed to both the payor and the payee accounts. That is, the payor account is decremented and the payee account is incremented in the amount of the funds transfer. The transferred funds can be immediately available to the payee.

Second, with regard to transactions involving a payor bank (other than the depository bank; e.g., Bank B) that uses the real-time data channel 138, at 711, Bank A receives a check from a customer and transmits an inquiry message to the account verification services computer system 130. The check may be received from a customer of Bank B (i.e., interbank transfer). At 712, it is determined that Bank B is a member bank and, at 713, it is determined that Bank B uses real-time data channel 308. At 714, the inquiry message is forwarded to Bank B by the account verification services computer system 130 and, at 715, a response to the inquiry is received by the account verification services computer system 130. For example, the response may indicate that there are sufficient funds in the payor's account to cover the transaction. At 716, the response message is forwarded by the account verification services computer system 130 to the computer system 110 of Bank A. At 717, a complete message may be sent from the bank computer system 110 to the account verification service computer system 130. The complete message is processed via the real-time data channel 308. Hence, at 718, the complete message is forwarded to the bank computer system 120 by the verification service computer system 130. At 719, a message confirming the complete is received by the verification service computer system 130 from the bank computer system 120. At 620, the message confirming the complete is forwarded by the verification service computer system 130 to the depository computer system 110. The account processing logic 114 and 124 may immediately update account databases 116 and 126 to reflect the transaction. Hence, for the payee, the funds can be made immediately available.

Third, with regard to transactions involving and a payor bank (other than the depository bank) that does not use the real-time data channel 138, at 731, Bank A receives a check from a customer and the bank computer system 110 transmits an inquiry message to the account verification services computer system 130. The check may be received from a customer of Bank C (i.e., interbank transfer with a financial institution other than Bank A or Bank B that does not permit real-time transactions). At 732, it is determined that Bank C is not a member bank. At 734, the account verification services computer system 130 responds to the computer system 110 of Bank A indicating that Bank C is not a member bank. The verification computer system 130 may also indicate that information contained in database 134 indicates that the payor had sufficient funds to cover the transaction the last time a batch data feed was received from Bank C.

The arrangements described herein may provide for funds transfers (e.g., via check, via ACH, via ATM, via debit card) to occur in real-time, e.g., within one minute, within less than ten seconds, or within less than one second. Hence, a customer making a check deposit may not perceive a delay in the funds becoming available once the check deposit is made. For example, a customer making a deposit with a bank teller may be able to receive all or a portion of the funds deposited back in cash, even where the amount of funds in the customer's account would not otherwise cover the received cash. For example, if the customer has $250 on deposit with a bank, and deposits a check for $500 with a teller at a bank store location, the customer may receive the entire $500 back in cash immediately (without perceiving any delay in the availability of the deposited $500). (That is, the customer does not need to come back to the bank teller later or visit the ATM again in order to make the $500 withdrawal. The bank teller can dispense the $500 as part of the same overall transaction conducted with the customer, without servicing any other customers in the interim.) As another example, if the customer has $250 on deposit at a bank, and deposits a check for $500 at an ATM, the customer may proceed to immediately withdraw $500 in cash from the ATM (without perceiving any delay in the availability of the deposited $500). (That is, the customer does not need to visit the ATM again in order to make the $500 withdrawal. The ATM can dispense the $500 as part of the same overall transaction conducted with the customer, without servicing any other customers in the interim and without the customer's card being removed from the ATM.) As will be appreciated, in addition to check and ATM funds transfers, other funds transfers mechanisms may also be used (e.g., person-to-person payments via a mobile device, person-to-merchant payments via a mobile device, person-to-person payments via a debit card, person-to-merchant payments via a debit card, etc.). As will also be appreciated, in addition to paper checks delivered to a bank via a teller or ATM, the arrangement may also be used with electronic checks delivered to a bank via a check image capture device.

In various embodiments, the arrangement described herein may be configured to provide a payment guarantee service. For example, in the context of an online transaction, the payor may provide a bank account (including routing number) or token in order to conduct an online transaction. The system 100 may provide a guarantee services that charges a specified percentage (e.g., 10 basis points) of the amount transferred in order to guarantee payment of the full amount to the depository bank and/or payee. Other features that may be provided include an enhanced ability to real-time dupe check (e.g., to verify whether or not a received check has already been deposited, to verify whether a check is drawn from a valid account, etc.), an ability to match item using deposit business date and unique transaction identifier (e.g., an ID/Seq Nbr), and an ability to determine completing result by item (verification).

In some arrangements, transactions between a customer of the depository bank associated with the depository bank computer system 110 and a customer of the paying bank associated with the paying bank computer system 130 do not require the initial inquiry (e.g., inquiry 301 as discussed above with respect to FIG. 3). Such a transaction is termed a non-inquiry transactions (NIT). Generally, a NIT is a transaction in which the funds do not need to be made immediately available or where a potential fraud loss is minimal (e.g., less than $20). A NIT may originate from a check transaction, an ACH transaction, a card transaction, an ATM transaction, or the like. Thus, the potential for loss that may result from the transaction being a fraudulent transaction (e.g., a double deposit of a check, a forged check, etc.) or an unfunded transaction (e.g., a bounced check) is minimized. For example, a mortgage payment may be deemed a NIT because the funds transferred in making a mortgage payment are not immediately available to the mortgagee (i.e., the mortgagee would need to first sell the home to extract potentially fraudulent funds from a mortgage account, which takes a considerable amount of time). Another example of a NIT is a wholesale deposit in which a third-party runner is depositing a plurality of checks for a retailer. Performing an inquiry in a wholesale deposit may be a waste of resources because the retailer already accepted the checks and returning the checks to the third-party runner will not avoid a potential bounced or fraudulent check. A further example of a NIT is a low dollar amount check deposit (e.g., $20) because the potential fraudulent loss is not worth the cost of performing the initial inquiry step. Still further, an analytics engine of the depository bank computer system 110 may determine that a requested transaction is a NIT based on various transaction analytics, such as transaction velocities, transaction patterns, customer information, and the like. Since the fraud losses are minimal or unavoidable, a NIT does not require an initial inquiry, which reduces the costs associated with processing the transaction and the time it takes to publish the transaction with the account verification service 130. However, both the depository bank and the paying bank still want to make a record of any NITs in real-time to prevent further fraud, such as duplicate check cashing.

Figure 8:
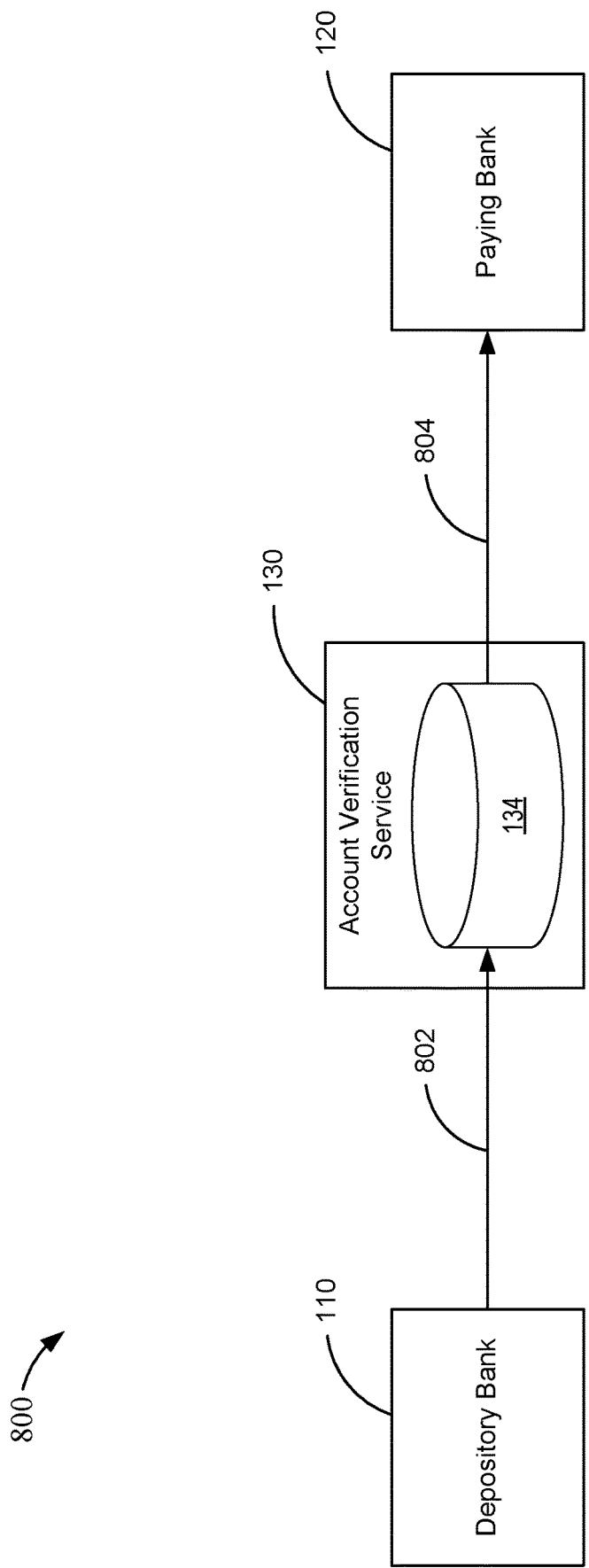
FIG. 8 shows a flow diagram of a method of performing a non-inquiry transaction according to an example embodiment.

A flow diagram of a method 800 of performing a NIT transaction is shown in FIG. 8. Method 800 is performed by the depository bank computer system 110, the paying bank computer system 120, and the account verification service computer system 132. Generally, the depository bank computer system 110 transmits a data load of all data included in a normal inquiry transaction (e.g., as described above with respect to FIGS. 2 through 6) to the account verification service computer system 130 at 802. The account verification service computer system 130 then transmits the necessary information to the paying bank 120 to complete the transaction at 804. A more detailed version of performing a NIT transaction is described below with respect to method 900.

Figure 9:
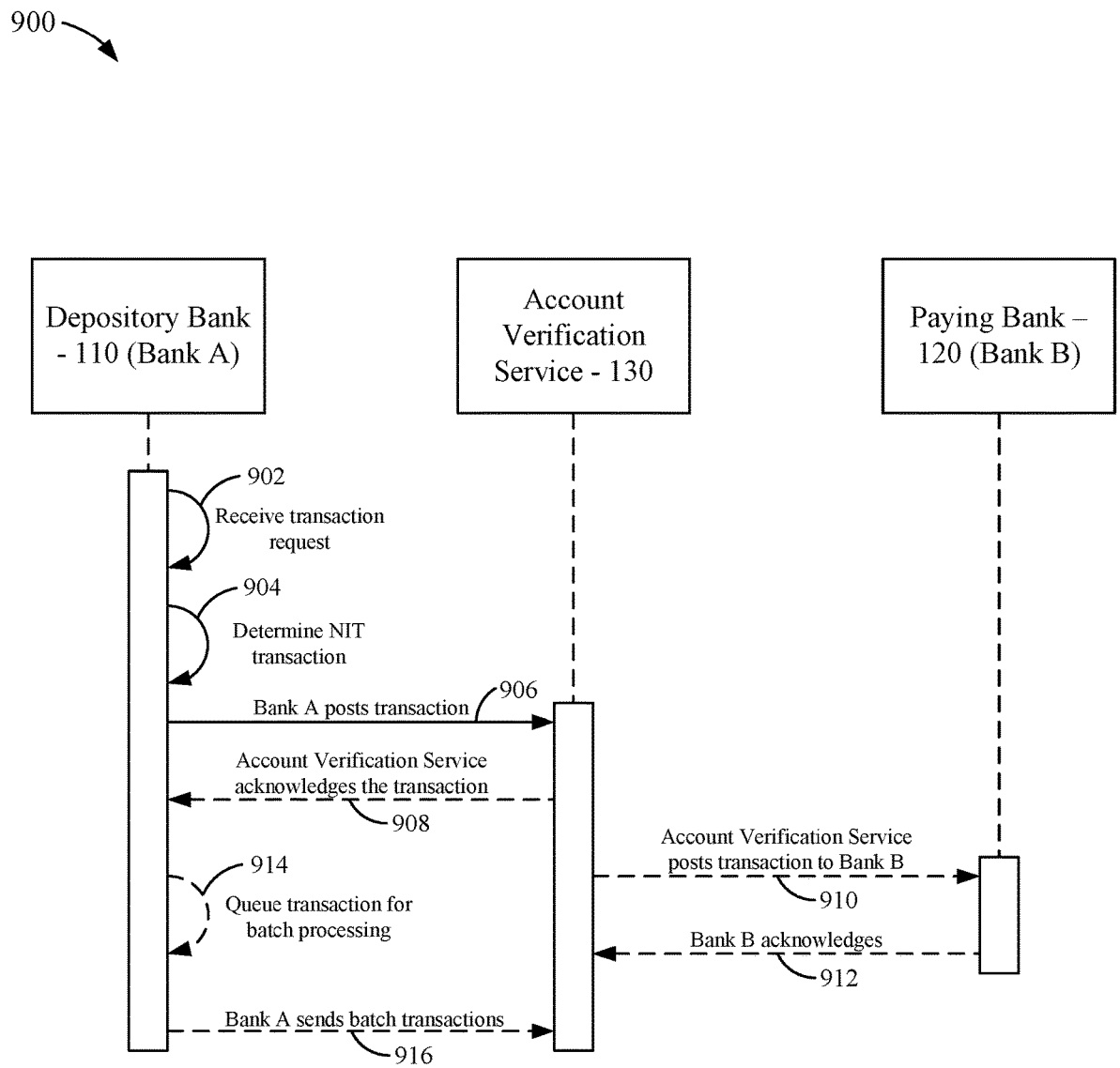
FIG. 9 shows a flow diagram of a method of completing a non-inquiry transaction according to an example embodiment

Referring to FIG. 9, a flow diagram of a method 900 of completing a non-inquiry transaction (NIT) is shown according to an example embodiment. Method 900 is a more detailed description of method 800. Method 900 is performed by the depository bank computer system 110, the paying bank computer system 120, and the account verification service computer system 130. In some arrangements, transactions between a customer of the depository bank associated with the depository bank computer system 110 and a customer of the paying bank associated with the paying bank computer system 130 do not require the initial inquiry (e.g., inquiry 301 as discussed above with respect to FIG. 3). Such a transaction is termed a "non-inquiry transaction" or a "NIT." Generally, a NIT is a transaction in which the funds do not need to be made immediately available or where a potential fraud loss is minimal (e.g., less than $20). A NIT may originate from a check transaction, an ACH transaction, a card transaction, an ATM transaction, or the like. Thus, the potential for loss that may result from the transaction being a fraudulent transaction (e.g., a double deposit of a check, a forged check, etc.) or an unfunded transaction (e.g., a bounced check) is minimized. For example, a mortgage payment may be deemed a NIT because the funds transferred in making a mortgage payment are not immediately available to the mortgagee (i.e., the mortgagee would need to first sell the home to extract potentially fraudulent funds from a mortgage account, which takes a considerable amount of time). Another example of a NIT is a wholesale deposit in which a third-party runner is depositing a plurality of checks for a retailer. Performing an inquiry in a wholesale deposit is a waste of resources because the retailer already accepted the checks and returning the checks to the third-party runner will not avoid a potential bounced or fraudulent check. A further example of a NIT is a low dollar amount check deposit (e.g., $20) because the potential fraudulent loss is not worth the cost of performing the initial inquiry step. Still further, an analytics engine of the depository bank computer system 110 may determine that a requested transaction is a NIT based on various transaction analytics, such as transaction velocities, transaction patterns, customer information, and the like. Since the fraud losses are minimal or unavoidable, a NIT does not require an initial inquiry, which reduces the costs associated with processing the transaction and the time it takes to publish the transaction with the account verification service 130. However, both the depository bank and the paying bank still want to make a record of any NITs in real-time to prevent further fraud, such as duplicate check cashing.

Method 900 begins when the depository bank computer system 110 receives a transaction request at 902. The transaction request relates to a request to transfer of money into an account associated with a customer. The account may be a demand deposit account, a mortgage account, another loan account, a certificate of deposit, a money market account, or another account held by the customer at the depository bank. The money being transferred into the account with the depository bank is requested from an account at the paying bank. In method 900, the paying bank 120 does not have to be a subscriber to the account verification service 130.

Based on the information received in the transaction request at 902, the depository bank computer system 110 determines that the requested transaction is a NIT at 904. The transaction may be a NIT based on the type of account the funds are being transferred into (e.g., a mortgage account), the amount of the transfer (e.g., if the transfer is below a threshold NIT limit), or the type of transfer occurring (e.g., a wholesale deposit). If the transaction was not determined to be a NIT, method 900 would proceed in the manner described above with respect to FIGS. 2-7. However, because the requested transaction is a NIT, no initial inquiry (e.g., inquiry 301 of FIG. 3) is needed or performed in method 900.

Still referring to FIG. 9, after determining that the requested transaction is a NIT, the depository bank computer system 110 posts the requested transaction to the account verification service 130 at 906. The post message includes the same information as a normal inquiry (or guarantee request) transaction (e.g., the entire magnetic ink character recognition line of a check, including the routing number, account number, check serial number, PC transaction code, and the amount of the check; the transaction date; a unique transaction ID; a unique item ID; a guarantee field; a channel indicator; a credit offset routing number; a credit offset account number; and a message type). Even though no inquiry is needed for the NIT, the transaction is still completed to the account verification service 130 to prevent potential fraud based on the requested transaction. For example, if the customer is attempting to deposit a NIT-level check (e.g., a check less than the NIT threshold) into an account with the depository bank, the deposit will still be completed with the account verification service 130 to prevent the check from being deposited again at another financial institution, such as a check cashing company, that subscribes to the account verification service 130. In the example, if the customer later attempts to cash the check with a check cashing company, the check cashing company can see that the check was already deposited with the deposit bank 110 by running a scan of the completed transactions with the account verification service 130. By completing the transaction to the account verification service 130, the transaction is made available in real-time. At the time of posting, the depository bank computer system 110 credits the account associated with the customer such that the funds are immediately available for use by the customer. In some arrangements, the account verification service 130 transmits an acknowledgment to the depository bank computer system 110 at 908. The acknowledgment provides an indication that the transaction has completed with the account verification service 130. In some situations, the account processing logic 114 immediately updates account databases 116 to reflect the transaction thereby reflecting the NIT in real-time (e.g., the funds may be made immediately available to the account holder, a loan or line of credit balance may be immediately reduced, etc.). In other situations, the transaction is not updated until the funds transfer from the paying bank to the depository bank is effectuated (e.g., in a later batch processing of pending transactions).

In some arrangements, the funds transfer proceeds in a similar manner as described above. Accordingly, the account verification service posts the transaction to the paying bank computer system 120 at 910. The paying bank computer system 120 may acknowledge receipt of the completed transaction at 912. In response to acknowledging receipt of the transaction, the account processing logic 124 of the paying bank computer system 120 can update account balances in the account database to reflect the transaction (e.g., by debiting the appropriate account with the paying bank).

The depository bank computer system 110 queues the transaction for batch processing at 914. The transaction may be queued by noting the debiting account number at the paying bank in a batch transaction list. In some arrangements, a token is used in the batch transaction list instead of the account number in the same manner as described above with respect to the tokenization of account numbers for pending transactions. The batch transaction list is sent by the depository bank computer system 110 at 916. In some arrangements, the account verification service 130 also processes the batch transactions to effectuate the transfer of funds from the paying bank to the depository bank computer system 110. Accordingly, in such arrangements, the batch transaction list is sent from the depository bank computer system 110 to the account verification service 130. In other arrangements, the ACH 140 processes the batch transactions to effectuate the transfer of funds from the paying bank to the depository bank computer system 110. In such arrangements, the batch transaction list is sent from the depository bank computer system 110 to the ACH 140.

Figure 10:
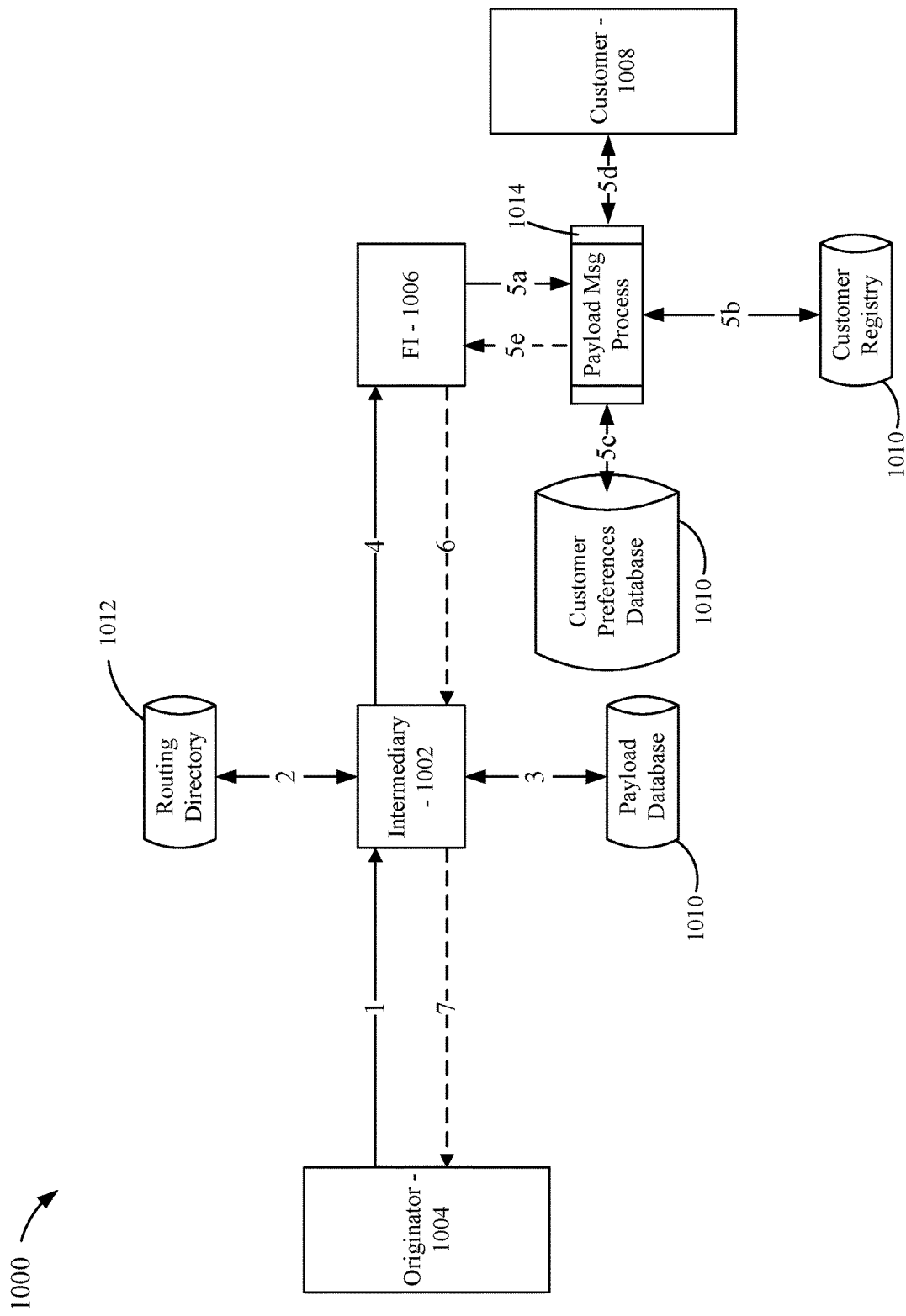
FIG. 10 shows a diagram of a system for transmitting information in real-time via an intermediary according to an example embodiment.

Referring to FIG. 10, a diagram of a system 1000 for transmitting information in real time via an intermediary 1002 is shown according to an example embodiment. In some arrangements, the intermediary 1002 is the account verification service computer system 130 described above. The primary difference between the above-described systems and the system 1000 is that the originator 1004 of the information is not necessarily the depository bank computer system 110. The originator 1004 may be, for example, a computing system associated with a merchant, an employer, a government agency, another bank or financial institution, a retail customer of the financial institution 1006 (e.g., the paying bank computer system 120 of FIG. 1), or another entity that has a relationship (or is attempting to establish a relationship) with a customer 1008 of the financial institution 1006 (e.g., the paying bank computer system 120). Generally, and as described in more detail below, the originator 1004 can initiate a message to the customer 1008 (e.g., to a smartphone or other computing device of the customer 1008) of the financial institution 1006 via the intermediary 1002. The message includes a payload, which may be associated with a transaction between the originator 1004 and the customer 1008. Optionally, the customer 1008 or the financial institution 1006 can respond to the message and transmit a response message to the originator 1004 via the intermediary 1002. As described in further detail below, the payload message can be used by the originator 1004 to implement a potential product or service (e.g., a loyalty program, a receipt, a coupon, service reminders, etc.) provided to the customer 1008.

FIG. 10 includes a series of flow arrows (1-11) that demonstrates the how the intermediary facilitates the delivery of messages between the customer 108 and the originator 1004. At 1, the originator 1004 sends a message to the intermediary 1002. The message includes a data payload (e.g., the contents of the message) and an identity token that identifies a recipient of the message (i.e., the customer 1008). The identity token may be any of an e-mail address associated with the customer 1008, a phone number associated with the customer 1008, an account number associated with the customer 1008, a username associated with the customer, or the like. For example, if the message is initiated in response to a transaction between the customer 1008 and the originator 1004 (e.g., the message corresponds to a digital receipt), the identity token may be the credit card account number associated with the credit card the customer 1008 used in purchasing a good or service from the originator 1004. The identity token is used by the intermediary 1002 to determine where to route the message (e.g., the financial institution 1006) such that the message reaches the recipient. The message also includes the data payload or content. The content may be a file, message text, and/or a message code or correlation reference number (which can later be used to look up the contents of the message). In arrangements where the content is designated by a message code or correlation reference number, the contents of the message may be stored in a payload database 1010 for later retrieval by the intermediary 1002, the financial institution 1006, and the customer 1008.

The intermediary 1002 receives the message from the originator 1004. At 2, the intermediary 1002 cross-references a routing directory 1012 based on the identity token to identify the customer 1008 and the financial institution 1006. In some arrangements, the routing directory 1012 is maintained by the intermediary 1002. The routing directory 1012 includes a listing of known identity tokens and corresponding customer identities and financial institution identities. For example, if the identity token is an e-mail address (e.g., johndoe@emailprovider.com), the intermediary 1002 can cross-reference the routing directory 1012 to identify the identity token, which then points to a specific customer (e.g., John Doe) and an associated financial institution (e.g., Financial Institution 1006) where the message should be routed. If no match is identified at 2, an error can be returned to the originator 1004. In arrangements where the content of the message is stored in the payload database 1010, the intermediary 1002 can retrieve the contents of the message by cross-referencing the payload database 1010 with the message code or correlation reference number inserted into the message by the originator 1004. At 4, the intermediary then routes the message (along with retrieved content from the payload database 1010) to the financial institution 1006 (identified through the routing directory 1012).

At 4, the financial institution 1006 receives the message from the intermediary 1002. The financial institution 1006 begins a payload message process 1014 on the received message at 5a. The payload message process 1014 is performed by the financial institution 1006 (e.g., the paying bank computer system 120) and includes cross-referencing a customer registry 1016 to identify the customer 1008 associated with the message based on the identity token at 5b. If no customer exists, the financial institution 1006 can return an error message to the intermediary 1002, which is then forwarded to the originator 1004. After the customer 1008 is identified, customer preference information is retrieved from a customer preferences database 1010 at 5c. The customer preferences database 1010 stores contact and offer preferences of the customer 1008. For example, the customer 1008 may prefer to only certain types of messages from designated originators. For example, if the message corresponds to a type of message that the customer 1008 previously indicated they do not want to receive, the financial institution 1006 can prevent forwarding of the message to the customer 1008. Accordingly, at 5c, the financial institution 1006 identifies the contents of the message (e.g., a receipt, an alert, an alert subscribe request, an alert concerning a future service date, a request to setup billpay, a loyalty scribe request, a loyalty card deliver, a coupon/offer, a customer authentication request, a product registration request, a repeat payment request, a contact add request, a reorder request, a service notation, etc.) and cross-references the content type with the customer's preferences stored in the customer preferences database 1010. In situations in which the customer does not want to receive the message, the financial institution 1006 optionally provides an indication to the originator 1004 (via the intermediary 1002) that the customer does not wish to receive these messages in the future or is not interested in the product/service related to the message. If the customer preferences indicate that the customer 1008 wants to receive the message, the financial institution 1006 sends the message to the customer 1008 at 5d. The message may be sent, for example, via e-mail, SMS, in-application message, web-banking messaging, or the like.

Still referring to FIG. 10, some messages sent to the customer 1008 at 5d may require or solicit action on behalf of the customer 1008. For example, the message may relate to a request, which the user may respond to. Accordingly, the customer 1008 can optionally respond or reply to the message by providing the response or reply to the financial institution 1006 (represented by arrows of 5d and 5e). The financial institution 1006 then generates and sends a response message to the intermediary 1002 at 6. The response message includes the customer's response (i.e., recipient reply content) to the originator 1004. The response may be in the form as a message code or correlation reference number that identifies the customer's response as stored in the payload database 1010. The intermediary 1002 then forwards the response message to the originator 1004 at 7. The forwarded message may include the content as retrieved by cross-referencing the payload database 1010 with the message code or correlation reference number. Alternatively, the originator 1004 can cross-referencing the payload database 1010 with the message code or correlation reference number. The system 1000 is useful in an unlimited number of use cases, some of which are described in further detail below.

Digital Receipt Distribution

In arrangements where the originator 1004 is a merchant or service provider, the originator 1004 can distribute digital receipts to the customer 1008 via the system 1000. For example, when the customer 1008 pays for the goods or services provided by the originator 1004, the originator 1004 can send the receipt to the customer 1008. In formatting the message to be transmitted via the system 1000, the provided payment information (e.g., credit card account number) serves as the identity token, and the receipt is the payload delivered via the message. In some arrangements, the point of sale system can ask the customer 1008 at checkout if the customer 1008 is interested in receiving a digital receipt.

Alert Signup and Distribution

Through the system 1000, the originator 1004 can distribute alerts to the customer 1008. In some arrangements, the alerts may be a one-off alert. For example, the originator 1004 can send an alert to the customer via the intermediary 1002 and the financial institution 1006. For example, the originator 1004 may be an internet retailer, and the message initiated to the customer 1008 may relate to receipt of a returned item. In formatting the message to be transmitted to the customer 1008, the payment account used to process the refund (e.g., credit card account number or checking account number) may serve as the identity token, and the payload delivered via the message is the message indicating the amount of the refund being processed.

In other arrangements, the originator 1004 can request enrollment of the customer 1008 into an alerts program offered by the originator 1004. In such arrangements, the originator 1004 can transmit a first message, corresponding to an enrollment request, to the customer 1008 via the system 1000. If the customer 1008 receives the message and responds to the message (e.g., indicating an agreement to enroll in the alert program), the originator 1004 can send future alerts to the customer 1008 via the system 1000. For example, the originator 1004 may be a news or media company requesting to sign up the customer 1008 for daily news alerts.

In further arrangements, the message may be a future alert informing the customer 1008 of an upcoming event. For example, if the customer 1008 just purchased an oil change from the originator 1004 (i.e., an auto mechanic) and paid via a credit card, the originator 1004 can send an alert to the customer 1008 informing the customer of the timing of the next oil change. The alert can be routed to the customer 1008 via the intermediary 1002 and the financial institution 1006 by using the payment account number as the identity token in the original message. The alert may include a calendar request. When the message is delivered to the customer 1008, the customer has the option to accept the calendar request. If the customer 1008 accepts the calendar request for the next oil change, the calendar request acceptance can be transmitted to the originator 1004 and a calendar entry can be automatically created and saved to the customer's computing device (e.g., imported into a calendar app on the customer's smartphone).

Billpay Setup/Repeat Payment Request

The originator 1004 can utilize the system 1000 to enroll the customer 1008 in a billpay program (e.g., to setup repeat payments). For example, the originator 1004 may be a utility provider (e.g., an electric company, a cable provider, etc.), and the originator 1004 can send a message to the customer 1008 via the system 1000 requesting that the customer enroll in a billpay program. The customer 1008 can respond to the request by accepting or rejecting (e.g., by actively rejecting the request or by ignoring the request). If the customer 1008 accepts the request, the customer 1008 can respond via the financial institution 1006, which provides the response message with the appropriate billing information (e.g., account number and routing number associated with the customer 1008) to the originator 1004.

Loyalty Subscribe Request and Card Delivery

The originator 1004 can leverage the system 1000 to maintain and operate a customer loyalty program. For example, if the originator 1004 is a merchant, the originator 1004 can enroll the customer 1008 in a loyalty program at the point of sale. When the customer presents a payment card (e.g., a credit card), the originator 1004 can initiate an enrollment request message to the customer 1008 by using the credit card account number as the identity token. After receipt of the enrollment request message, the customer 1008 agree to enroll in the program by responding yes to the originator 1004. The financial institution 1006 can format the message to include personal information about the customer 1008 (e.g., name, e-mail address, etc.) such that the customer does not need to manually provide the information to the originator 1004 (e.g., by filling out a form). After enrollment, the originator 1004 can send a follow-up message including the loyalty card (e.g., a loyalty card token) to the customer 1008. Upon receipt of the message, the loyalty card information can be stored in the customer's mobile phone (e.g., the loyalty card token can be stored in a mobile wallet of the customer's mobile device).

Coupon/Offer Delivery

Through the system 1000, the originator 1004 can distribute coupons or offers to the customer 1008. The distribution of coupons and offers is substantially the same as discussed above with the distribution of alerts via the system 1000. For example, if the originator 1004 is a merchant, the originator 1004 may issue batch coupons to all customers that purchased a certain product based on the credit card number used to purchase the product. In some arrangements, the customer 1008 can respond to a received offer and accept the offer (e.g., purchase the product if the offer is for a product). If the product is a digital product, the product may be downloaded to the customer's computing device.

Customer Authentication

During a transaction, the originator 1004 can request authentication that the customer 1008 is indeed entering the transaction. For example, if the originator 1004 sells expensive items, such as cars, the originator 1004 may require an extra layer of authentication prior to finalizing the sale for a product. Accordingly, once the customer 1008 provides a payment method, the originator 1004 initiates a verification request to the customer 1008 using the payment method account as the identity token. The verification request message is sent in substantially the same manner as discussed above with the distribution of alerts via the system 1000. The customer 1008 may be required to respond to the verification request message. If the customer 1008 confirms that the customer 1008 is entering the transaction with the originator 1004, the transaction proceeds. If the customer 1008 informs the originator 1004 that the customer 1008 is not attempting the transaction, the originator 1004 cancels the transaction. In some arrangements, the originator 1004 also sends a message to the financial institution 1006 to notify the financial institution 1006 of potential fraud associated with the customer's account.

Automatic Product Registration

The originator 1004 and the customer 1008 can leverage the system to automatically register a purchased product. For example, in arrangements where the originator 1004 is a merchant and the customer is buying a product requiring registration with the manufacturer (e.g., an appliance that requires registration prior to receiving the warranty), the originator 1004 can send a message to the customer 1008 offering to automatically register the purchased product. If the customer 1008 responds yes to the message, the originator 1004 can automatically register the product (e.g., by sending the appliance purchase date, appliance serial number, and customer information to the manufacturer) or provide the appliance serial number and purchase information to the customer 1008 for download onto the customer's computing device (e.g., smartphone) for later upload to the manufacturer.

Contact Add Request/Virtual Business Card

The originator 1004 can transmit contact information (e.g., a virtual business card) to the customer 1008 via the system 1000. The distribution of contact information via a virtual business card is substantially the same as discussed above with the distribution of alerts via the system 1000. However, the payload of the alert includes the originator's virtual business card. When the customer 1008 receives the message with the virtual business card, the customer 1008 is presented the option of storing the virtual business card in the contacts of the customer's mobile device.

Reorder Request

Through the system 1000, the originator 1004 can remind the customer 1008 to reorder a good through a reorder request. For example, if the originator 1004 is a merchant, the originator 1004 may determine that the customer 1004 orders a given product every month. Accordingly, the originator 1004 can imitate a reorder request to the customer 1008 (e.g., as described above with respect to the alerts) reminding the customer 1008 to purchase the product. The distribution of the reorder request is substantially the same as discussed above with the distribution of alerts via the system 1000. The customer 1008 can respond to a received reorder request by authorizing the originator 1004 to reorder and ship the product (e.g., via received offer and accept the offer (e.g., purchase the product if the offer is for a product).

Service Notation

Through the system 1000, the originator 1004 can send the customer 1008 information relating to a service provided by the originator 1004. For example, if the originator 1004 is an eye doctor, the originator 1004 can send the customer 1008 eye glass prescription information via a message. The distribution of the message is substantially the same as discussed above with the distribution of alerts via the system 1000. The payload of the message includes the information or a token pointing to the information in a database (e.g., a token pointing to the information in a database, such as the payload database 1010), which can be accessed by the customer 1008.

Figure 11A:
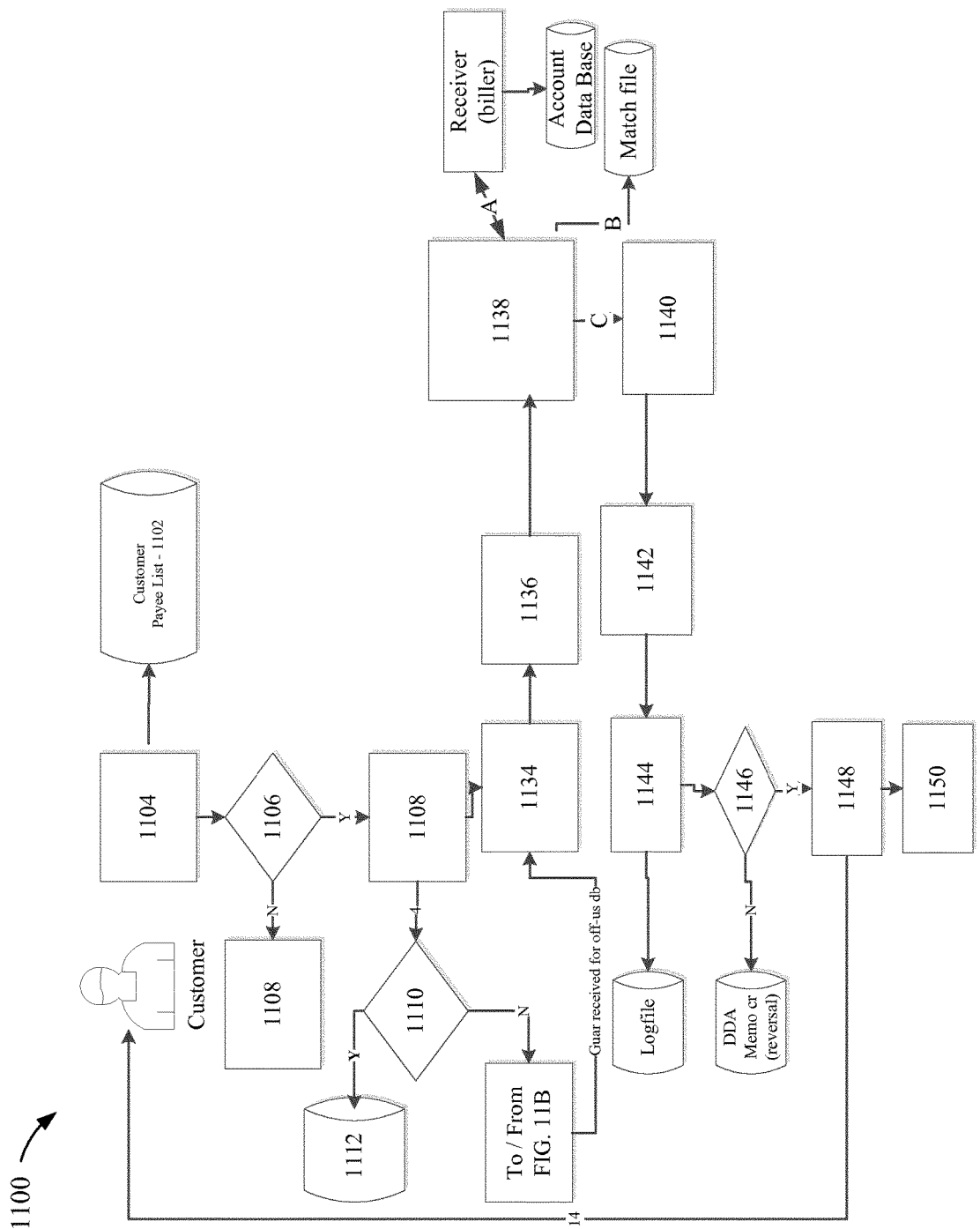
FIGS. 11A and 11B show a method of performing a billpay transaction through the above described financial systems and transaction methods according to an example embodiment.
Figure 11B:
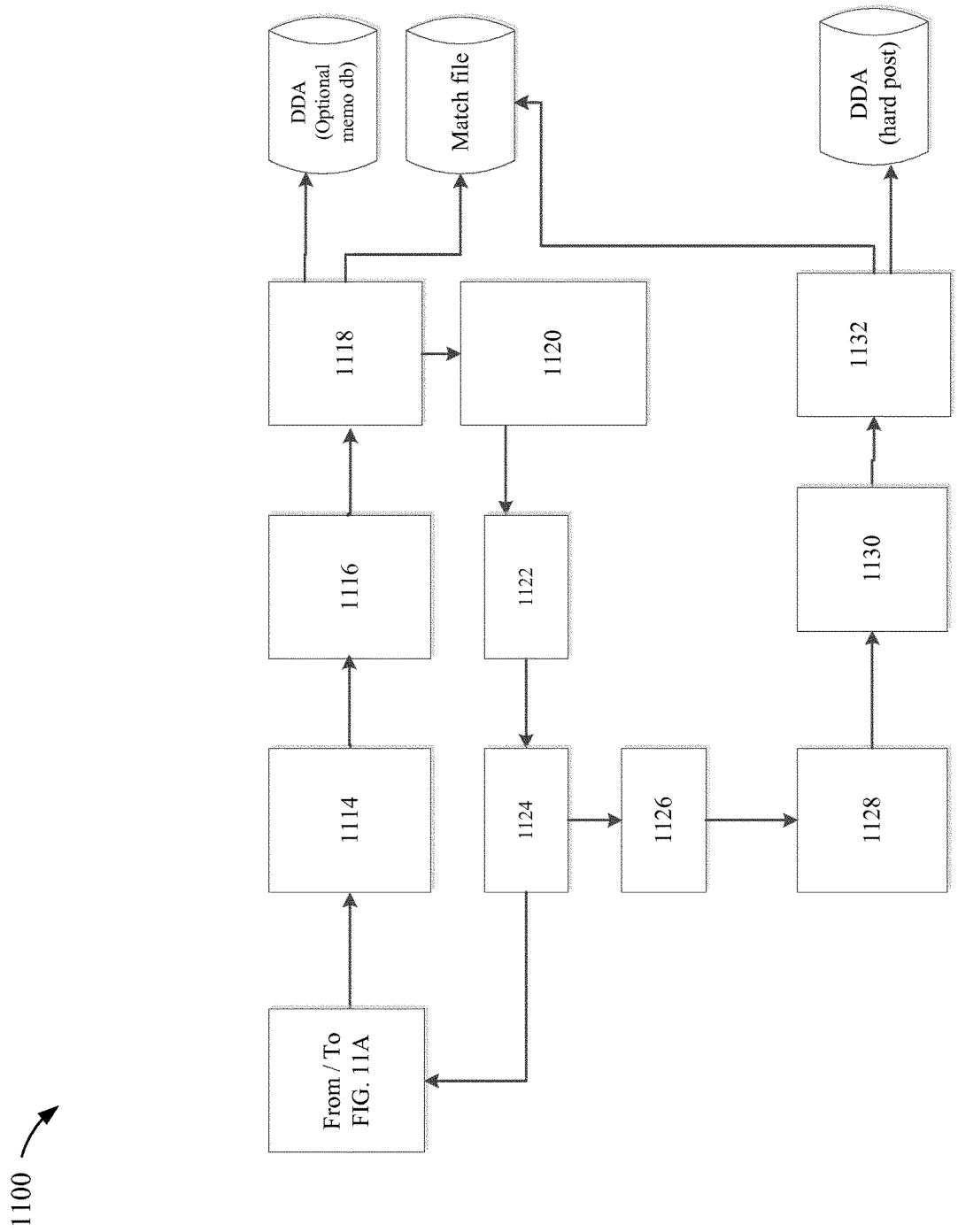

The above-described use cases for the system 1000 are by no means exhaustive. The payload message can provide for the addition of any number of services to the above-described financial transaction systems. The payload message and the data payload itself has many benefits, such as increasing customer loyalty, decreasing friction between the entities involved in the transaction, increasing the security of the transaction, and the like. The data payload may relate to the provision of pre-transactional information, inter-transactional information, and/or post-transactional information. For example, the data payload can be used to:

Referring to FIGS. 11A and 11B, a method 1100 of performing a billpay transaction through the above described financial systems and transaction methods is shown according to an example embodiment. The description of FIGS. 11A and 11B describe the method 1100 using various acronyms, which are set forth in Table 1 below.

TABLE 1

| Acronym | Meaning |
|---------|---------|
| ODFI | Originating Deposit Financial Institution (e.g., the paying bank computer system 120) |
| RDFI | Receiving Deposit Financial Institution (e.g., the depository bank computer system 110) |
| TPSP | Third Party Service Provider |
| PPD | Prearranged Payment and Deposit |
| CCD | Corporate Credit or Debit |
| CTX | Corporate Trade Exchange |
| CIE | Customer Initiated Entries |
| B2B | Business to Business |
| P2P | Person to Person |
| AVS | Account Verification Service (intermediary) (e.g., the account verification service computer 130) |

As shown in method 1100, the process for paying a bill via the above-described systems and transaction methods is different than performing a traditional online billpay transaction. In a traditional online billpay transaction, the customer paying the bill must key all biller and payment information into the billpay system, such as biller identity, customer account number, payment amount, and the like. Here, the above-described systems and transaction methods allow the customer to draw on the financial system to provide a majority of the information necessary to perform a billpay. The biller can create a profile with the intermediary (e.g., the account verification service 130), which can be drawn upon to automatically populate a customer billpay request. The biller profile can include account numbers, existing bill information, current account balances, and the like for each of the biller's customers. The biller and/or the intermediary can update the information in real-time, allowing the customer to access real-time information concerning their account, which assists in eliminating double payments.

Prior to the method 1100 beginning, it is assumed that the ODFI and the RDFI (where the receiving account of the biller is maintained) are configured to interact with the AVS. Additionally, the biller is configured to provide real-time or near real-time biller data (e.g., account balance information) to the account verification service, which is stored in a customer payee list 1102.

Referring to FIG. 11A, the method 1100 begins when a customer (of a biller) chooses to pay the biller by selecting the biller and payment speed from a payee list associated with the ODFI or the account AVS at 1104. The biller may be, for example, a cable company, a utility company, or the like. The customer is a subscriber or user of the biller's services and/or products. The customer opts to pay at least a portion of the customer's account balance with the biller. The AVS determines if the biller is registered with the above-described systems at 1106. If the biller is not registered as a real-time bill payment participant, the traditional billpay system (e.g., as described above) is used at 1108. If the biller is registered, the ODFI performs a real-time memo debit of the customer's bank account at 1108. The ODFI determines if the debit is an "on-us" debit at 1110 (i.e., both the customer and the biller have accounts with the ODFI). If the transaction is an on-us debit, the accounts of the biller and the customer are debited and credited in real time in the internal databases of the ODFI at 1112. If the transaction is off-us, the method 1100 continues to FIG. 11B.

Now referring to FIG. 11B, the ODFI has an off-us debit and needs to send the transaction to the RDFI for a guarantee. Accordingly, the ODFI sends a message to the AVS containing transaction information (e.g., RDFI routing number, RDFI account for debit, amount of the transaction, AVS provider ID, unique transaction ID, transaction business date, etc.) to the AVS at 1114. Based on the information in the message, the AVS forwards the transaction request to the RDFI for a guarantee at 1116. The RDFI validates the information and issues a guarantee that the customer account is valid and has enough funds available and writes the transaction to a match file at 1118. In some arrangements, the RDFI debits the demand deposit account and stores it in an account database. The RDFI then responds to the AVS with a transaction response message containing the guarantee information (e.g., guarantee flag, guarantee expiration data, AVS provider ID, the unique transaction ID, etc.) at 1120. The AVS then pushes the transaction response message to the ODFI with the guarantee data at 1122. The guarantee data is received at 1124, and the method 1100 continues and proceeds to settlement 1124.

Still referring to FIG. 11B, to proceed with settlement, the ODFI passes transaction data for settlement at 1126. The ODFI creates a settlement file to send through ACH or a third-party settlement service at 1128. The ACH provider or third-party settlement provider receives the file at 1130 and processes the transaction. The RDFI receives the settlement file with the guarantee information such that the RDFI reconciles the received file with the previously stored match file and hard posts the debit to the DDA database at 1132.

Returning to 1124, the method 1100 also branches and returns to FIG. 11A with the guaranteed payment status. The ODFI sends a credit push request to the RDFI via the AVS with a customer biller identifier at 1134. The AVS forwards the credit push to the RDFI associated with the biller at 1136. The forward message includes biller and customer information (e.g., RDFI ID, RDFI routing number, check digit of the RDFI, the RDFI account number of the biller account, the amount of the payment, the customer name of the biller, the customer account number, the payment ID, the transaction data, the AVS provider number, etc.). The RDFI receives the information from the AVS such that the customer account is validated with the biller and the credit is accepted with the biller (A), and the payment details are acquired at 1138. In some arrangements, the RDFI writes the transaction information to the match file (B) and payment details are returned (C). The RDFI sends a credit push response with the status and payment details (e.g., the transaction details discussed above with additional biller information including bill due date, minimum payment, balance, etc.) to the AVS at 1140. The AVS forwards the credit push response with status and payment details to the ODFI at 1142. The ODFI logs the response in a logfile and tests the status of the response at 1144. The ODFI determines whether the status of the response is good or not at 1146. If the status is not good, the ODFI performs a DDA memo credit (i.e., a debit reversal) of the customer's funds. If the status is good, the ODFI makes payment details available to the customer at 1148. The ODFI uses ACH payment or another third-party payment rail for final settlement of the transaction between the biller and the customer at 1150.

In sum, the method 1100 provides an enhanced billpay system in which the customer can pay the biller in real-time. The customer can log into the system, view their account with the biller, and select the option to pay the biller. The financial systems perform a real-time transaction as set forth in the figures. That is, the ODFI account is debited. A message is sent to the account verification service or intermediary indicating the payment. The intermediary forwards the message to the receiving entity (e.g., the RDFI and/or the Biller/Receiver). The receiving entity applies the payment in real-time, and thus the transferred money hits the customer's account with the biller in real-time (e.g., in a similar manner as described in the person to person transactions above and below). The receiving entity passes back updated information to the intermediary such that the real-time customer account information is updated. Although the actual funds transfer via ACH or check processing, which does not occur in real-time, the funds are guaranteed and thus are effectively transferred in real-time. Accordingly, the real-time provision of account status (e.g., account balance) to the customer and the real-time provision of funds to the biller eliminates the need for the biller to maintain an independent online customer portal and eliminates the need for the customer to log into individual biller online customer portals to pay bills.

Figure 12:
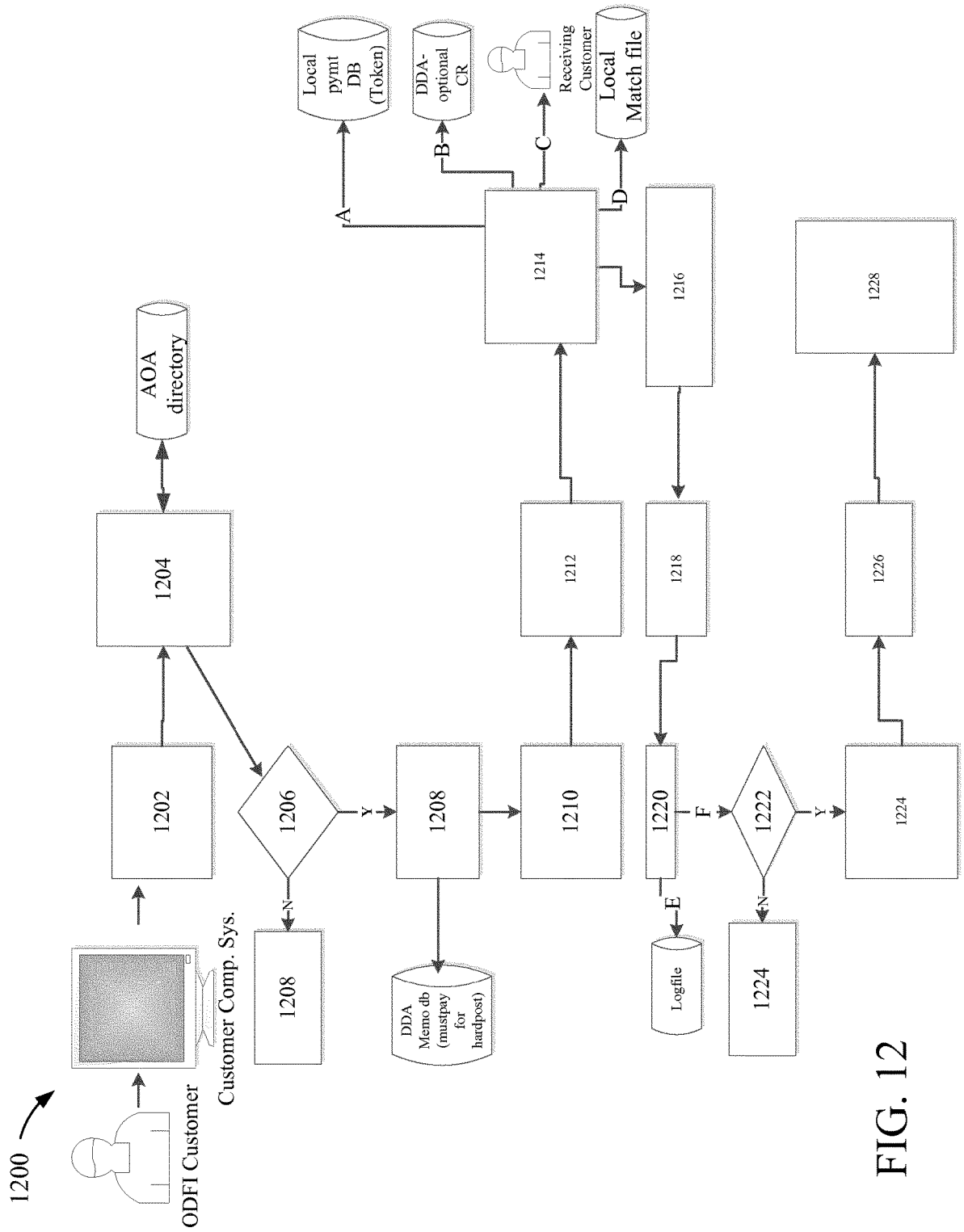
FIG. 12 shows a method of performing a real-time transfer of money from an originating deposit financial institution to a partner bank account according to an example embodiment.

Referring to FIG. 12, a method 1200 of performing a real-time transfer of money from an ODFI to a partner bank account is shown according to an example embodiment. As a precursor to method 1200, the account ownership application (AOA) directory, which can be part of the intermediary (e.g., account verification service 130), is populated with biller information and customer account information (e.g., the customer accounts with the billers, the customer accounts with the financial institutions, etc.). The customer account information associated with the billers includes real-time information concerning account status, account balances, due dates, and the like.

Method 1200 begins when the customer logs into the ODFI login to begin a billpay. The customer provides information on the payee (i.e., the biller) at 1202. The information about the payee may include a token, a phone number, an email address, an account number, or another identifier. The received payee information is passed to the intermediary at 1204. The intermediary compares the payee information with stored payee information in the AOA directory to determine if the biller is a real-time payments participant at 1206. If there is a match, the intermediary returns a status of the customer's account with the payee and an indicator of whether the payee is a participant in the real-time payment system additionally. If the payee is not a real-time payment system participant, the payee can be paid through traditional billpay systems (e.g., a non-real-time payment system) at 1208. Method 1200 continues under the assumption that the payee is a participant in the real-time payment system.

Method 1200 continues by debiting the customer's account at the ODFI at 1208. The ODFI sends a credit push request to the RDFI via the intermediary with a unique transaction identification assigned by the ODFI at 1210. The credit push message includes a biller token, an amount of the payment, the RDFI routing number, a unique transaction ID, a transaction date, and the ODFI AVS profile ID. The credit push request is initially sent to the AVS, and the AVS forwards the credit push request to the RDFI at 1212. The RDFI processes the received request at 1214. The RDFI determines the appropriate payee account to receive the payment based on the credit push request (A). The RDFI validates the account and optionally credits the account (B). In some arrangements, the RDFI sends a notification to the payee indicating receipt of the payment (C). The notification may include a query to the payee requesting confirmation of an account identity to receive the funds. The RDFI writes the payment to the match file (D). The match file contains the biller token, the amount of the transaction, the RDFI routing number, the unique transaction ID, the transaction date, and the ODFI AVS profile ID.

Still referring to FIG. 12, the method 1200 continues when the RDFI sends a credit push response with a status (e.g., acceptance) to the AVS at 1216. The AVS forwards the credit push response to the ODFI at 1218. The ODFI processes the credit push at 1220. The ODFI logs the credit push in the logfile (E) and tests the status of the credit push (F). The ODFI determines if the status of the credit push was successful or not at 1222. If the credit push request indicates that the transaction was not successful, the transaction is reversed and the originally debited account is credited with the failed transaction amount at 1224. If the transaction was successful, the ODFI arranges payment (e.g., ACH payment, check payment, or another form of payment) and associates the transaction with the unique transaction identifier at 1224. The payment is then processed (e.g., the ACH file or flat file for TPSP is delivered to the RDFI) at 1226. In arrangements where the payment is made over ACH, an ACH file is generated that contains the token in account along with any of the above described transaction information. The RDFI receives and reconciles the payment information to the local match file at 1228. Additionally at 1228, the payment information is detokenized, and the RDFI finalizes the transaction with a hard post. If an exception occurred during the transaction, an exception report is created.

Figure 13A:
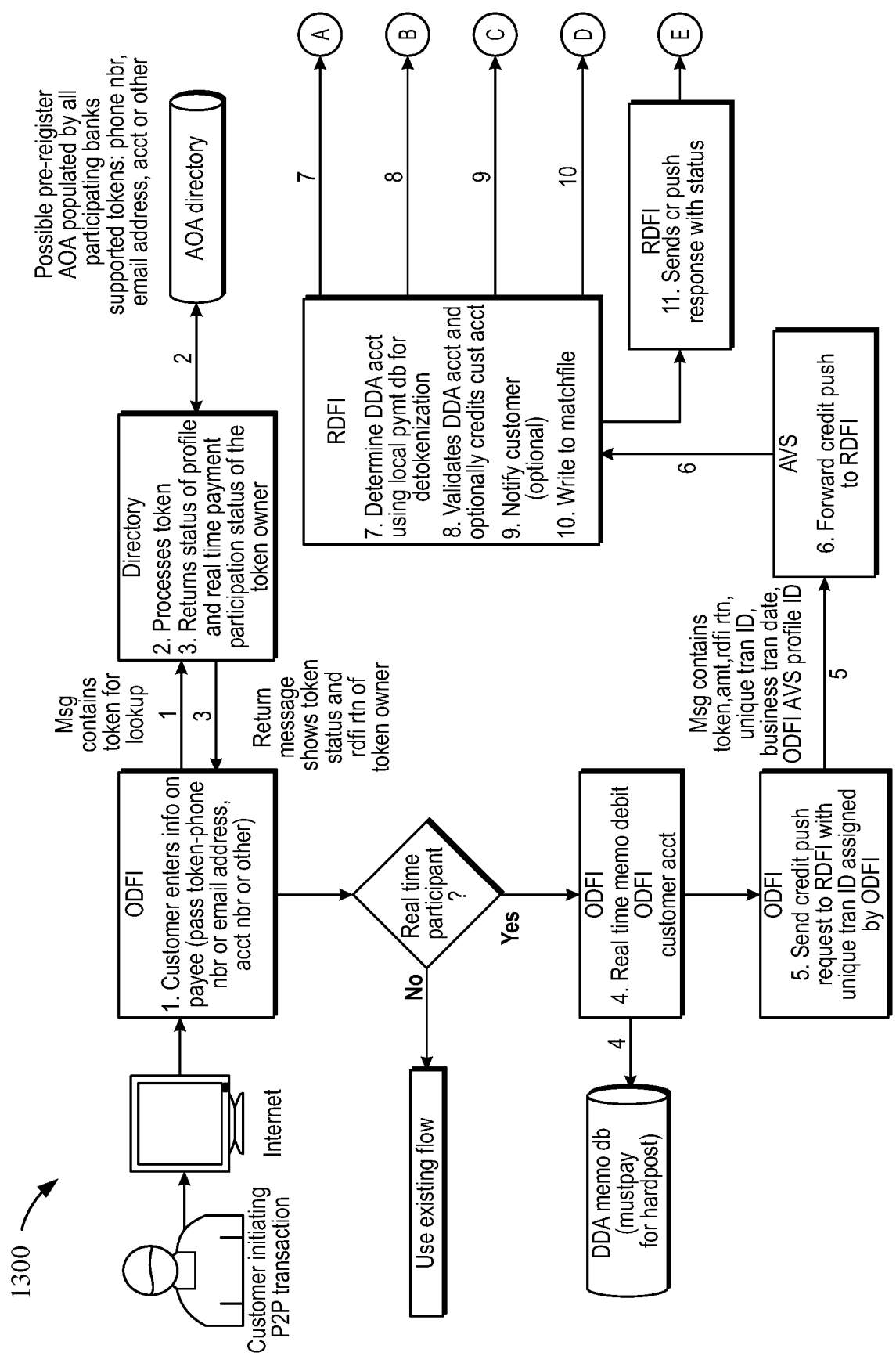
FIGS. 13A and 13B show a flow diagram of a method of performing a peer-to-peer ("P2P") transfer between a paying first customer that is an account holder with the ODFI and a receiving second customer that is an account holder with the RDFI is shown according to an example embodiment.
Figure 13B:
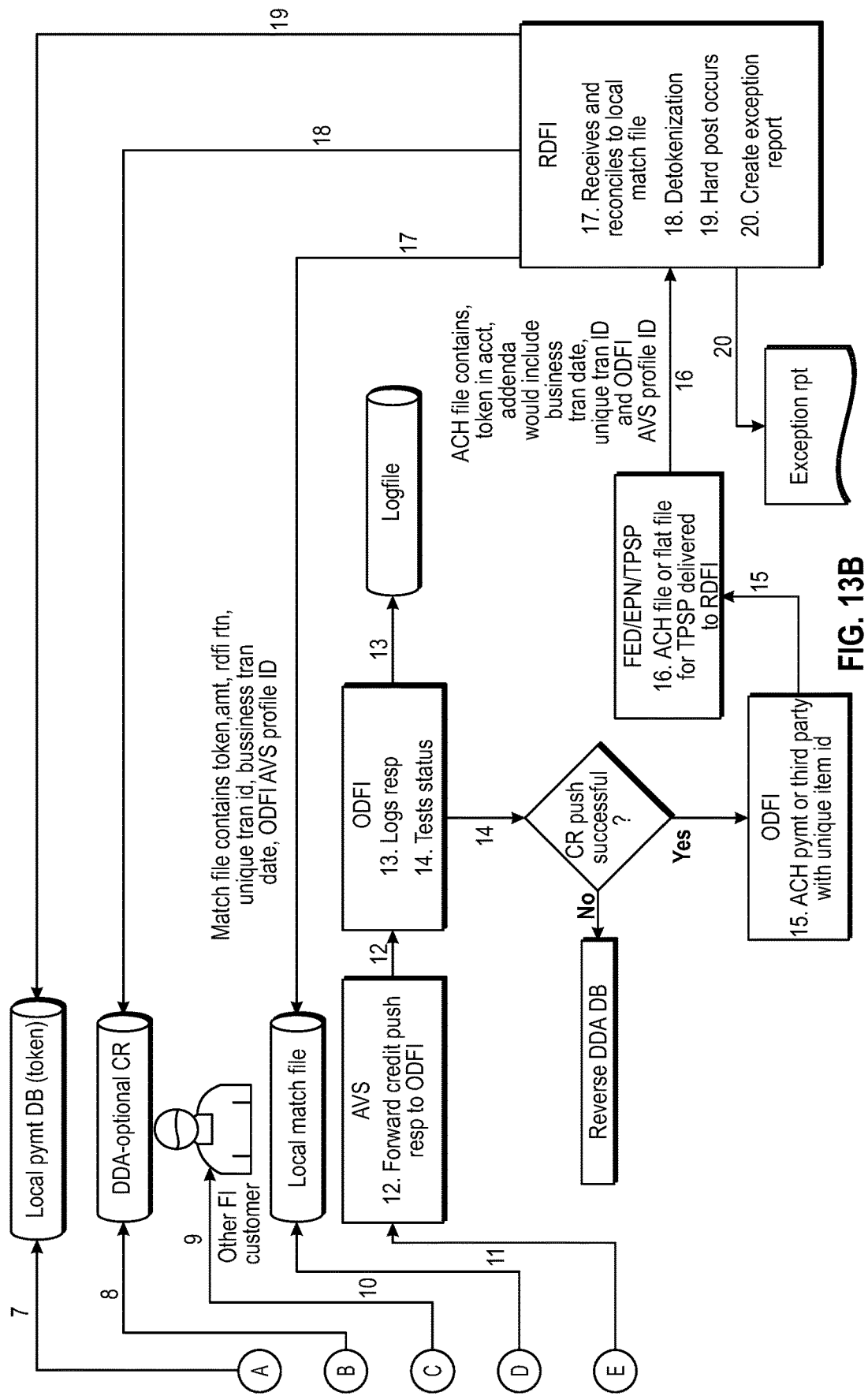

Referring to FIGS. 13A and 13B, a flow diagram of a method 1300 of performing a peer-to-peer ("P2P") transfer between a paying first customer that is an account holder with the ODFI and a receiving second customer that is an account holder with the RDFI is shown according to an example embodiment. The ODFI and the RDFI are participant banks with the above-described real-time transaction system. Additionally, the first customer and the second customer are enrolled in the real-time transaction system. The real-time P2P transfer results in funds being debited from a first customer account with the ODFI and credited to a second customer account with the RDFI in real-time. The transaction is guaranteed to make the funds available to the second customer in real-time. In some arrangements, the final settlement of funds between the ODFI and the RDFI occurs after the funds are made available to the second customer.

Figure 14A:
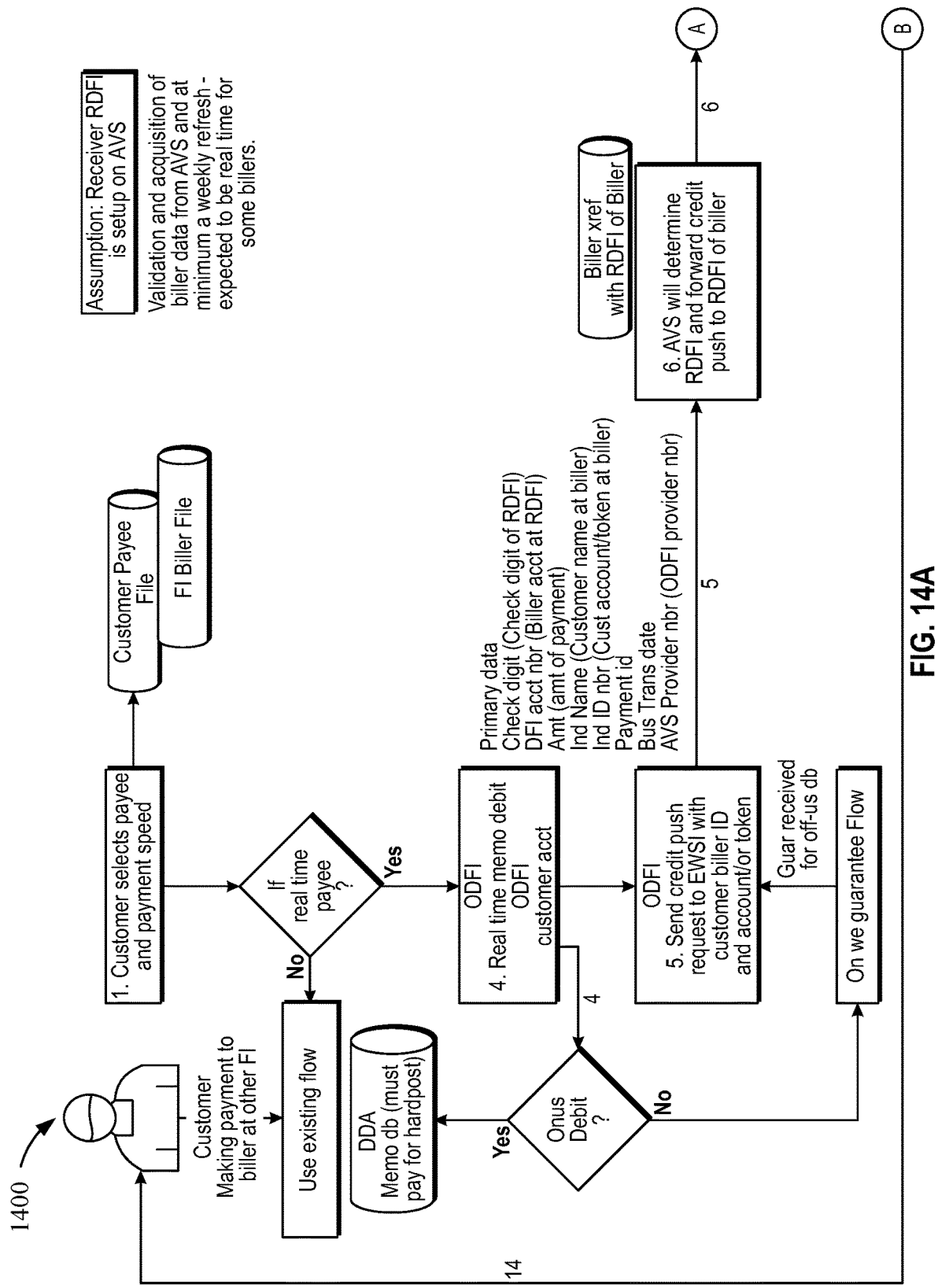
FIGS. 14A through 14C show a flow diagram of a method of performing a real-time billpay from a customer of the ODFI to a biller associated with another financial institution (e.g., the RDFI) according to an example embodiment.
Figure 14B:
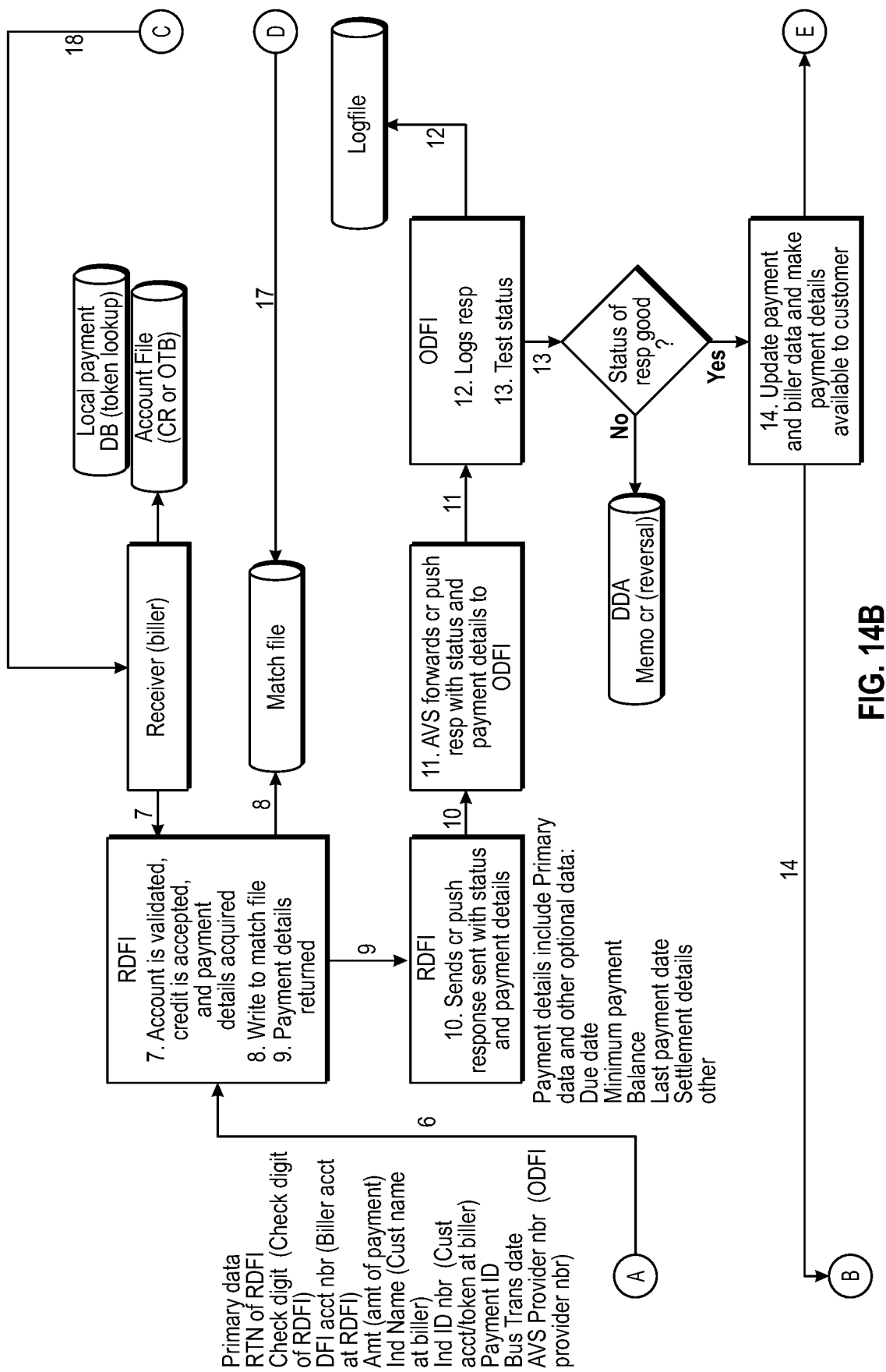
Figure 14C:
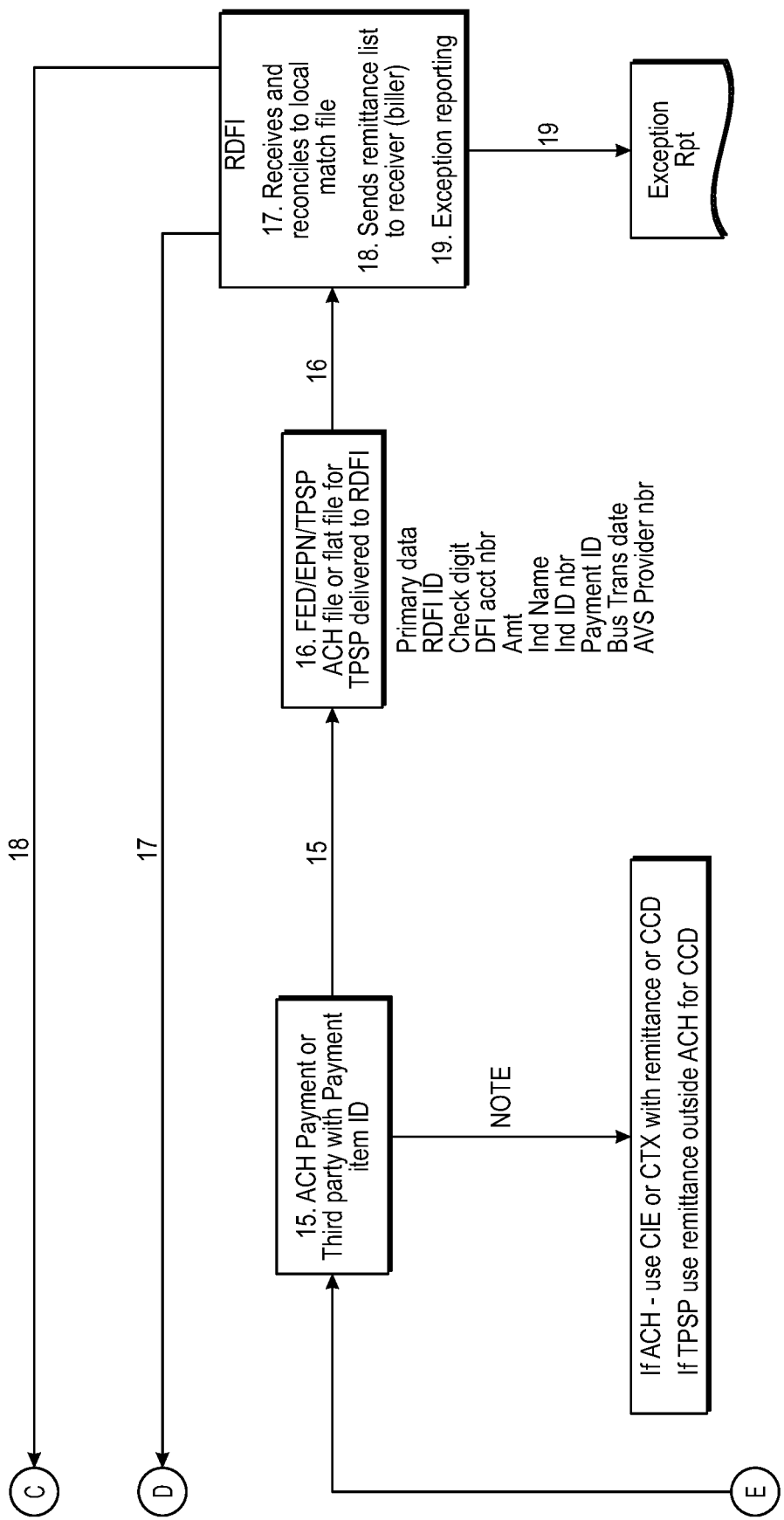

Referring to FIGS. 14A through 14C, a flow diagram of a method 1400 of performing a real-time billpay from a customer of the ODFI to a biller associated with another financial institution (e.g., the RDFI) according to an example embodiment. As shown in the method 1400, the real-time billpay is facilitated through the third-party account verification service 130 ("AVS"). The biller makes its customers' account information available in real-time to the account verification service 130. Accordingly, customers of the biller that are also account holders of a financial institution that participate in the above-described real-time transaction system can effectuate a real-time payment to the biller. One advantage to the described real-time billpay system is that the customer's account balance with the biller is updated in real-time because the paying bank (e.g., the ODFI) guarantees payment to the biller once the payment notification is sent via the account verification service 130. This allows the biller to update the customer's account in real-time to reflect the payment.

Figure 15:
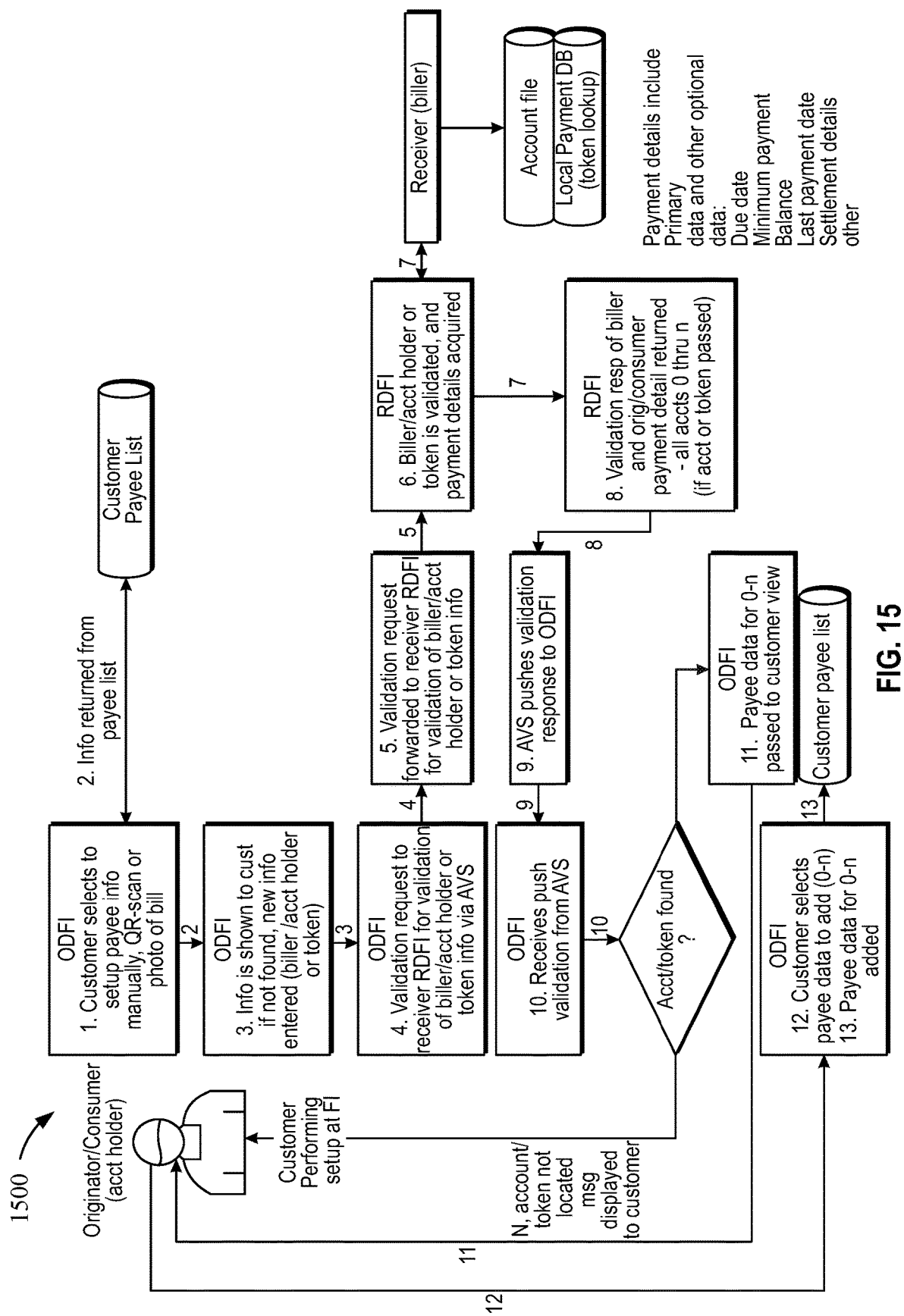
FIG. 15 shows a flow diagram of a method of configuring a real-time billpay arrangement is shown according to an example embodiment.

Referring to FIG. 15, a flow diagram of a method 1500 of configuring a real-time billpay arrangement is shown according to an example embodiment. As described in the method 1500, the customer initiates the billpay setup by first providing biller information to the customer's financial institution ("FI") (e.g., the ODFI). The biller information can be provided by manual entry into an online banking portal, by uploading a picture of a bill that is then analyzed by the FI for the biller information, or by scanning a code on the bill. If the biller is a participant in the real-time transaction system, the biller can be setup as a real-time billpay recipient for the customer as set forth in the method 1500.

Figure 16A:
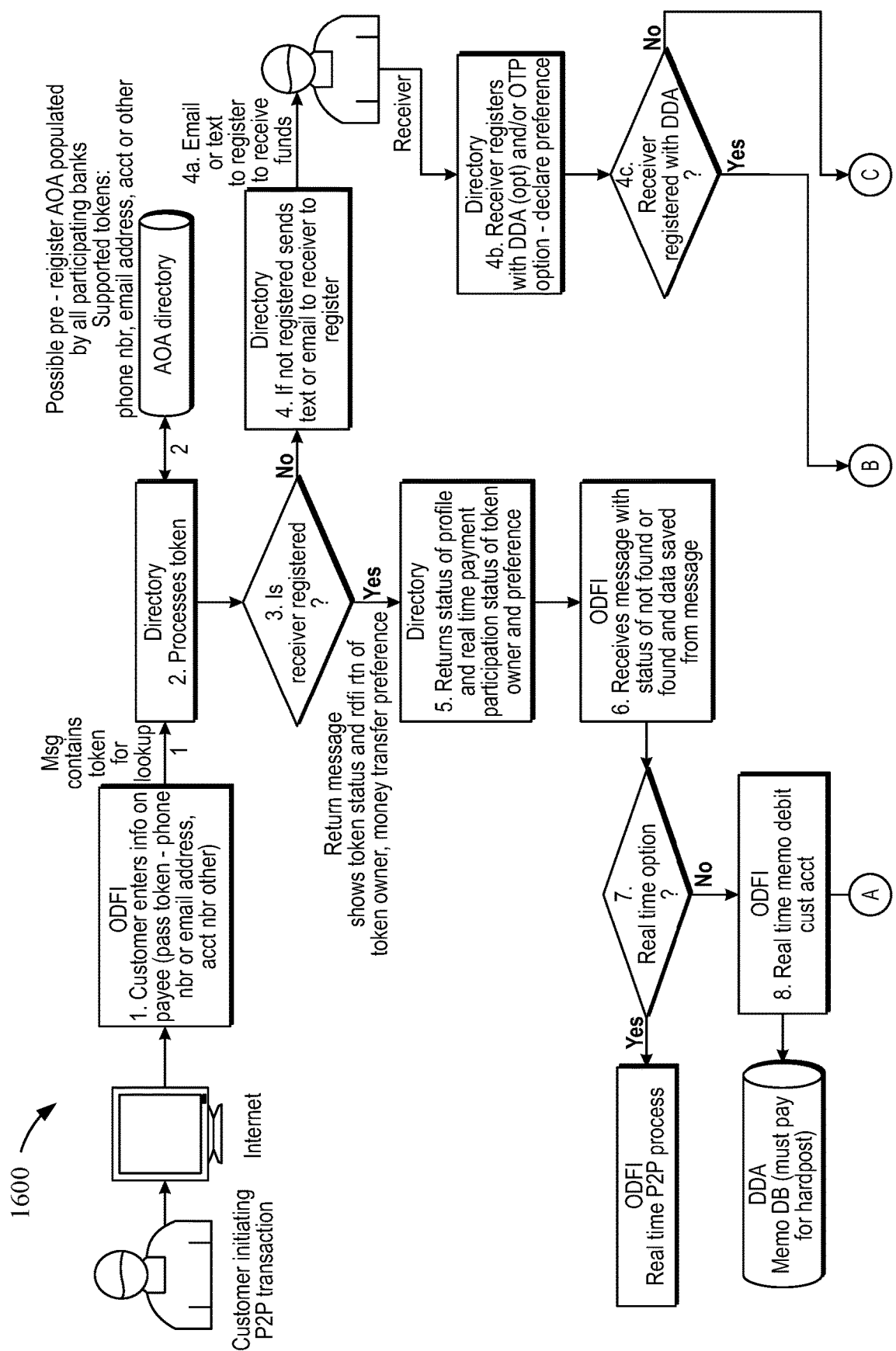
FIGS. 16A through 16C show a flow diagram of a method of performing a peer-to-peer ("P2P") transfer between a paying first customer that is an account holder with the ODFI and a receiving second customer that is an account holder with the RDFI is shown according to an example embodiment.
Figure 16B:
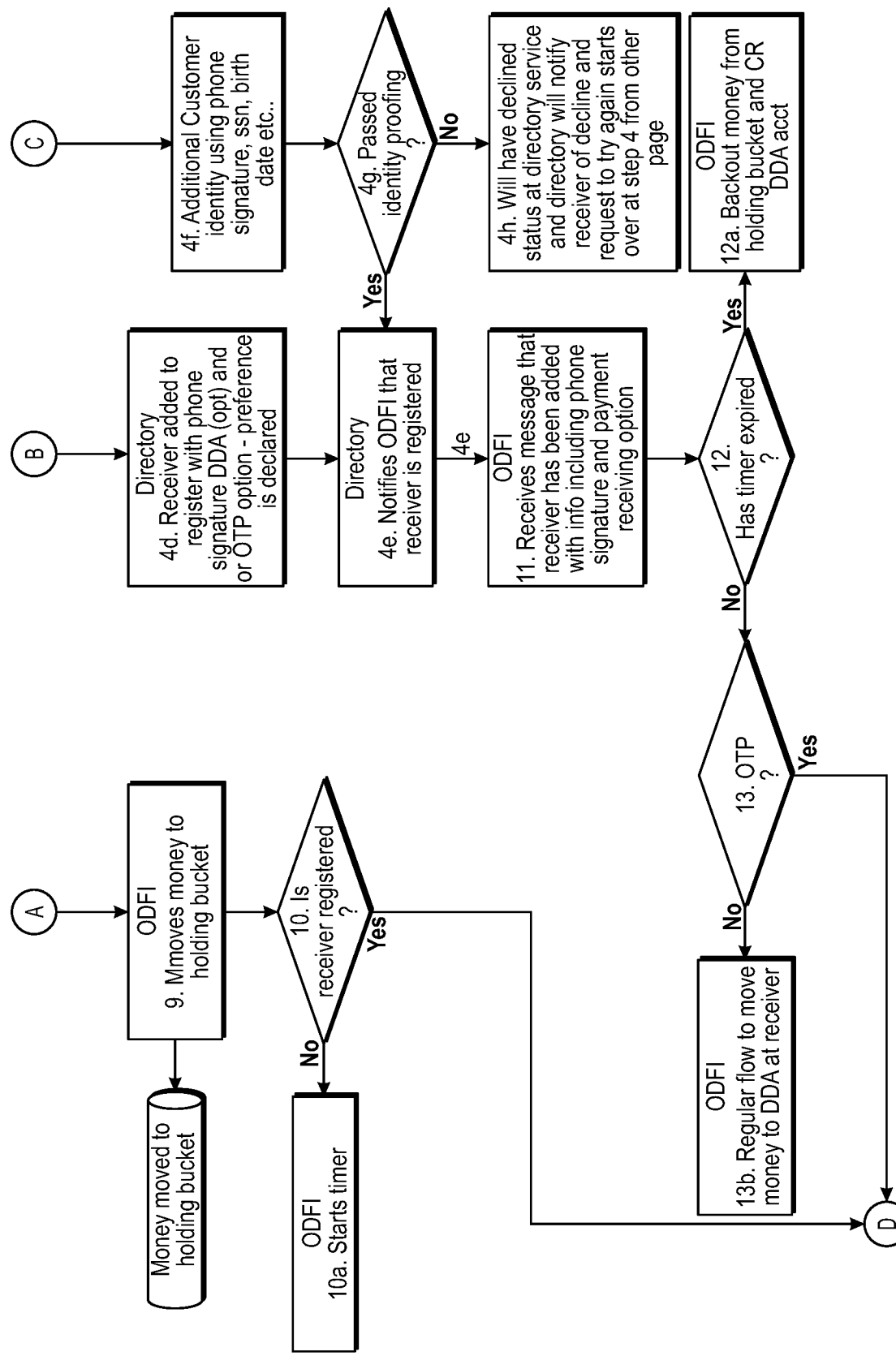
Figure 16C:
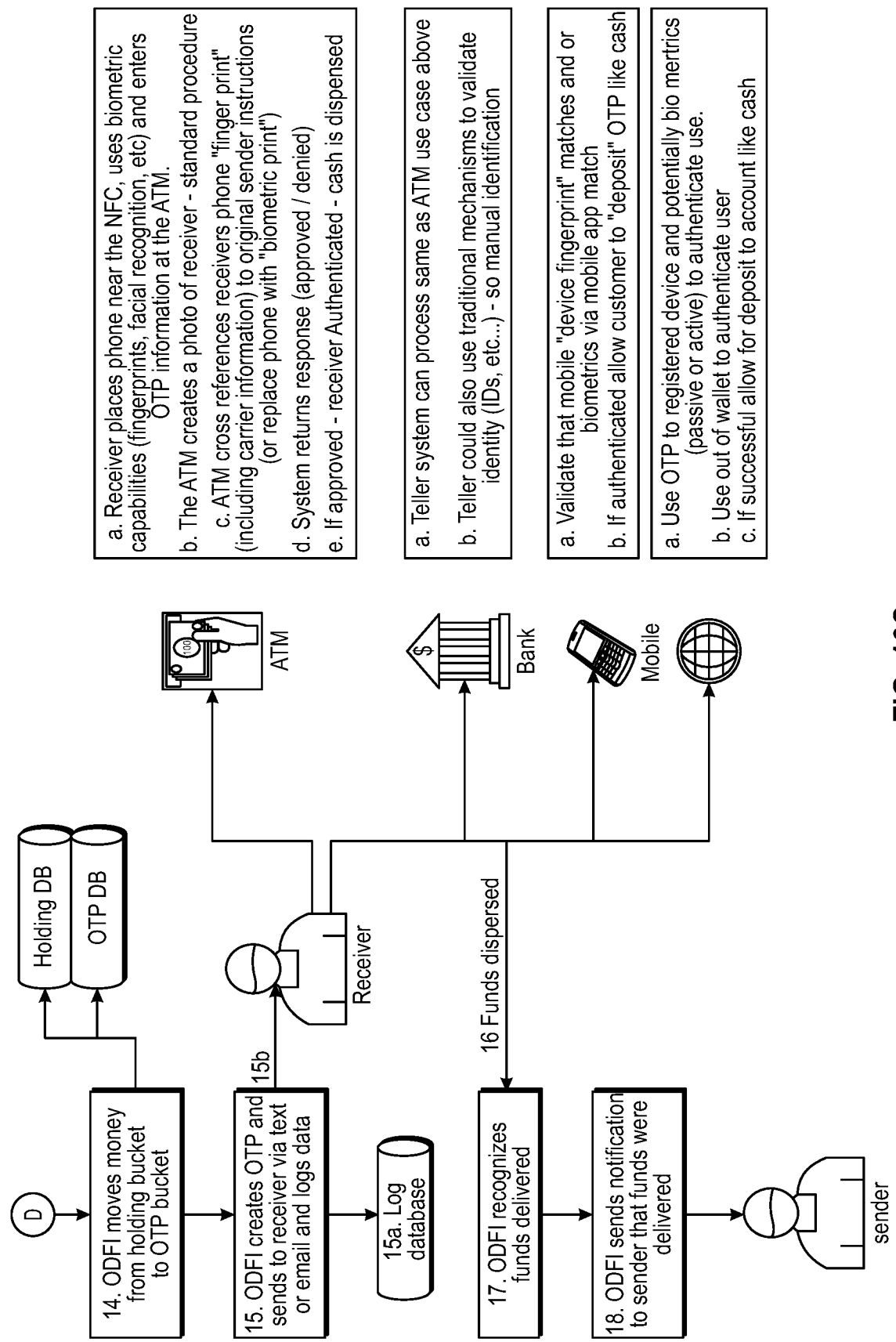

Referring to FIGS. 16A through 16C, a flow diagram of a method 1600 of performing a peer-to-peer ("P2P") transfer between a paying first customer that is an account holder with the ODFI and a receiving second customer that is an account holder with the RDFI is shown according to an example embodiment. Here, the second customer receives the funds via use of a one-time passcode ("OTP"). As shown best in FIG. 16C, the OTP can be used by the second customer to receive or accept the funds via an ATM, a bank branch, a mobile banking application, or an online banking portal.

Figure 17A:
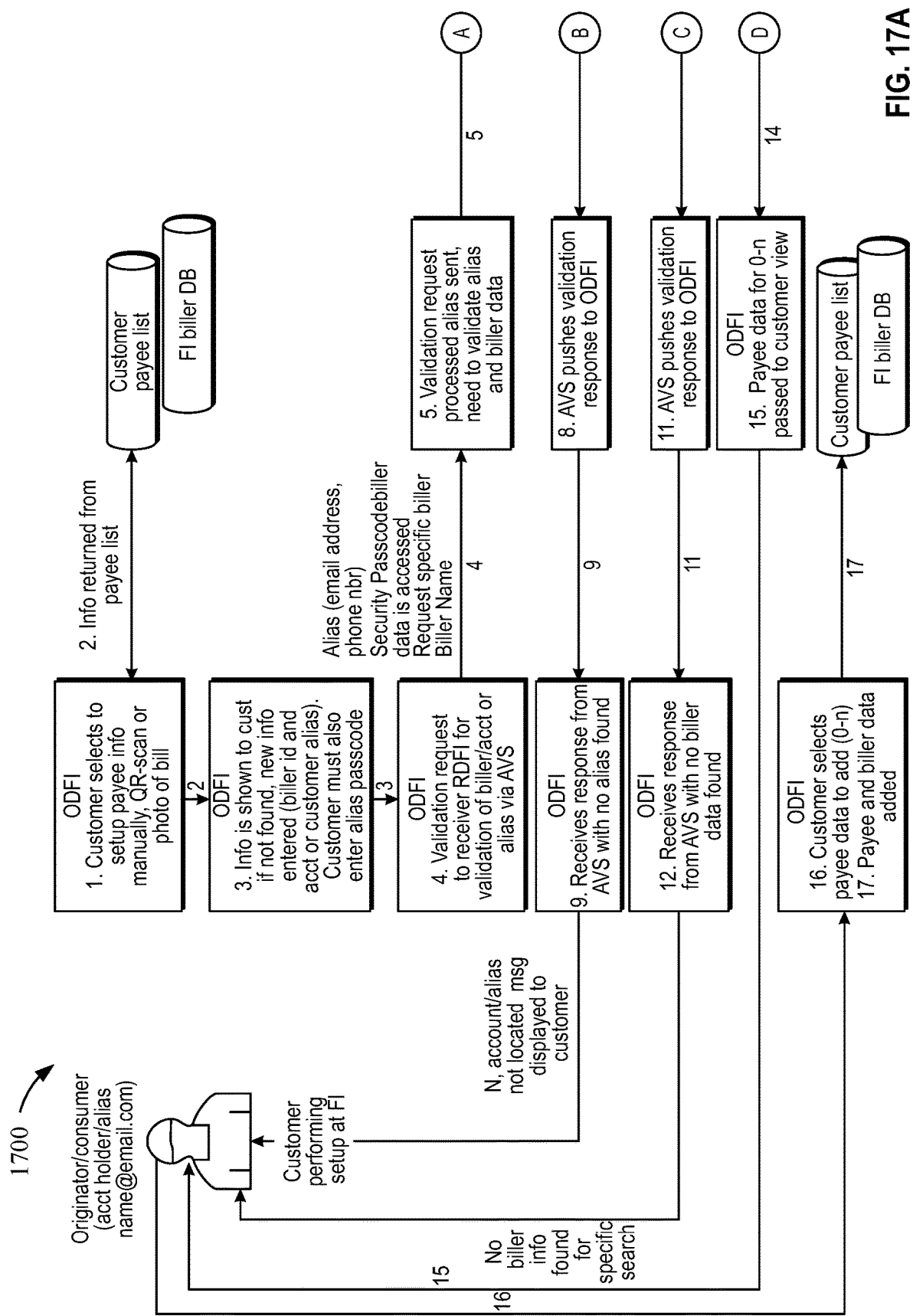
FIGS. 17A and 17B show a flow diagram of a method of configuring billpay via a customer alias with a specific biller according to an example embodiment.
Figure 17B:
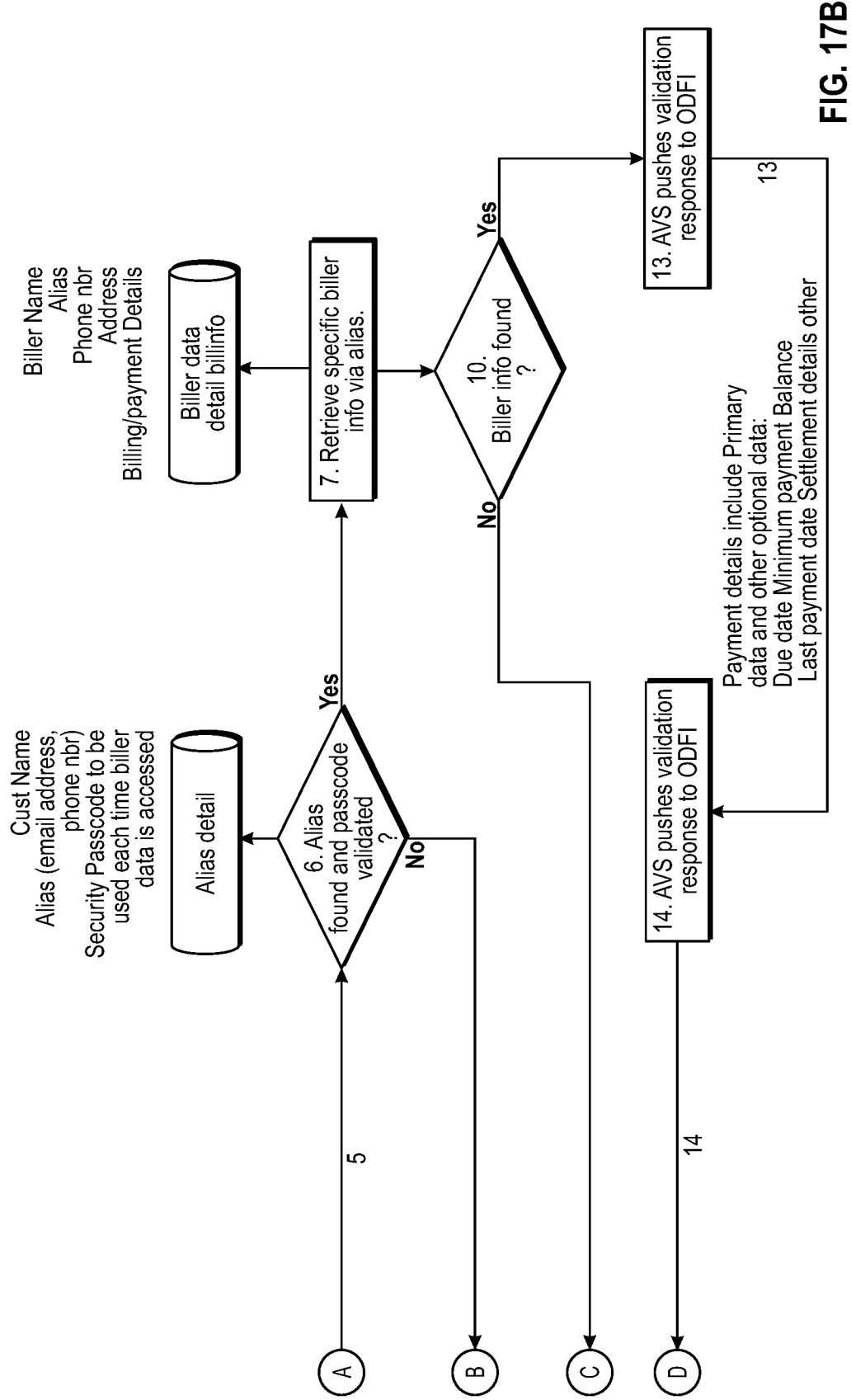

FIGS. 17A and 17B show a flow diagram of a method 1700 of configuring billpay via a customer alias with a specific biller according to an example embodiment. The billpay setup is facilitated by the account verification service 130. The customer provides the customer's alias and biller information to the ODFI. The ODFI communicates this information for validation to the biller via the account verification service 130 of the biller is a participant in the real-time payments system. If successfully verified, the biller can be added to the billpay recipient list associated with the customer at the ODFI, and the customer can initiate real-time bill payments to the biller via the real-time transaction system.

Figure 18A:
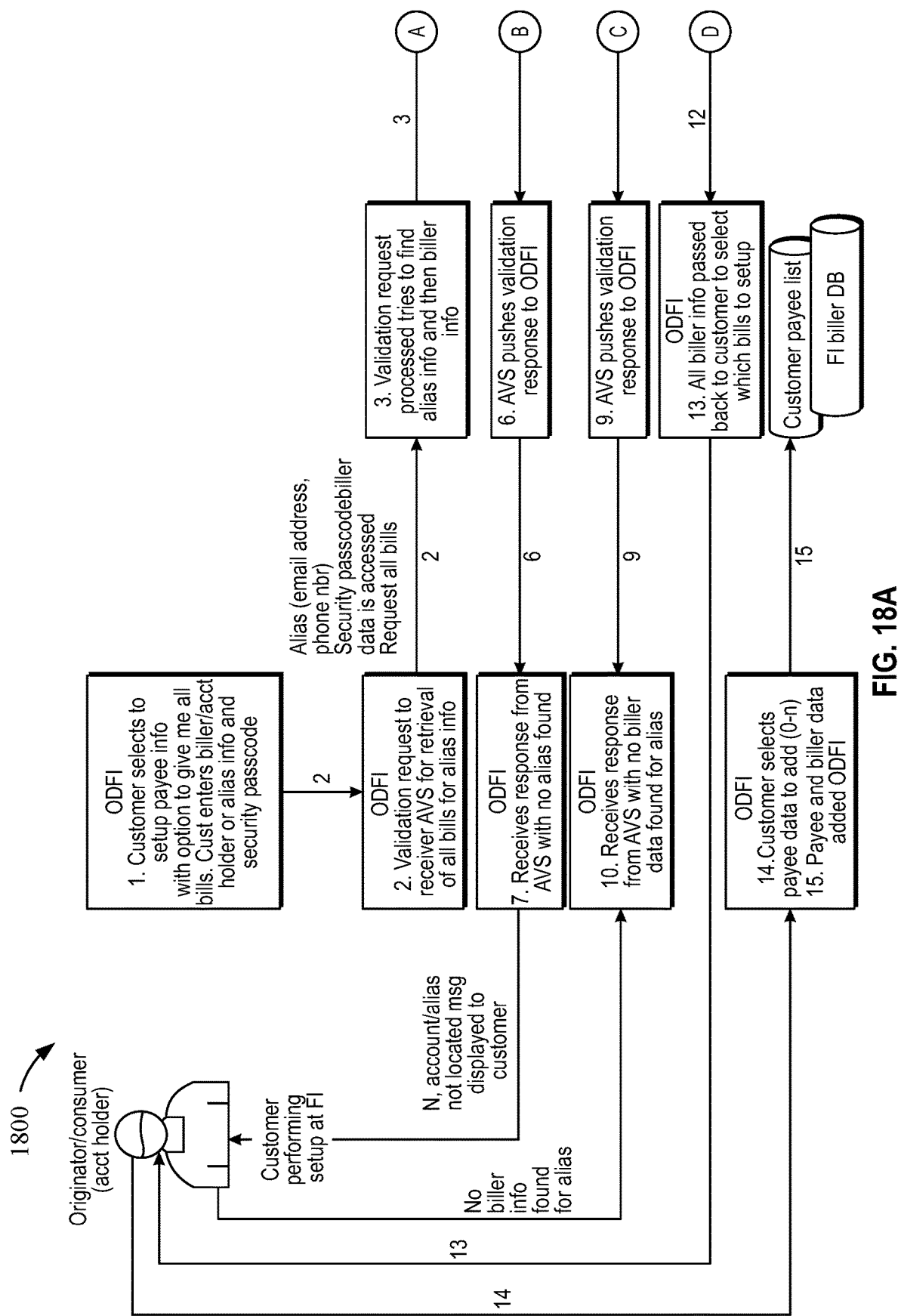
FIGS. 18A and 18B show a flow diagram of a method of configuring billpay for a plurality of different billers for real-time billpay according to an example embodiment.
Figure 18B:
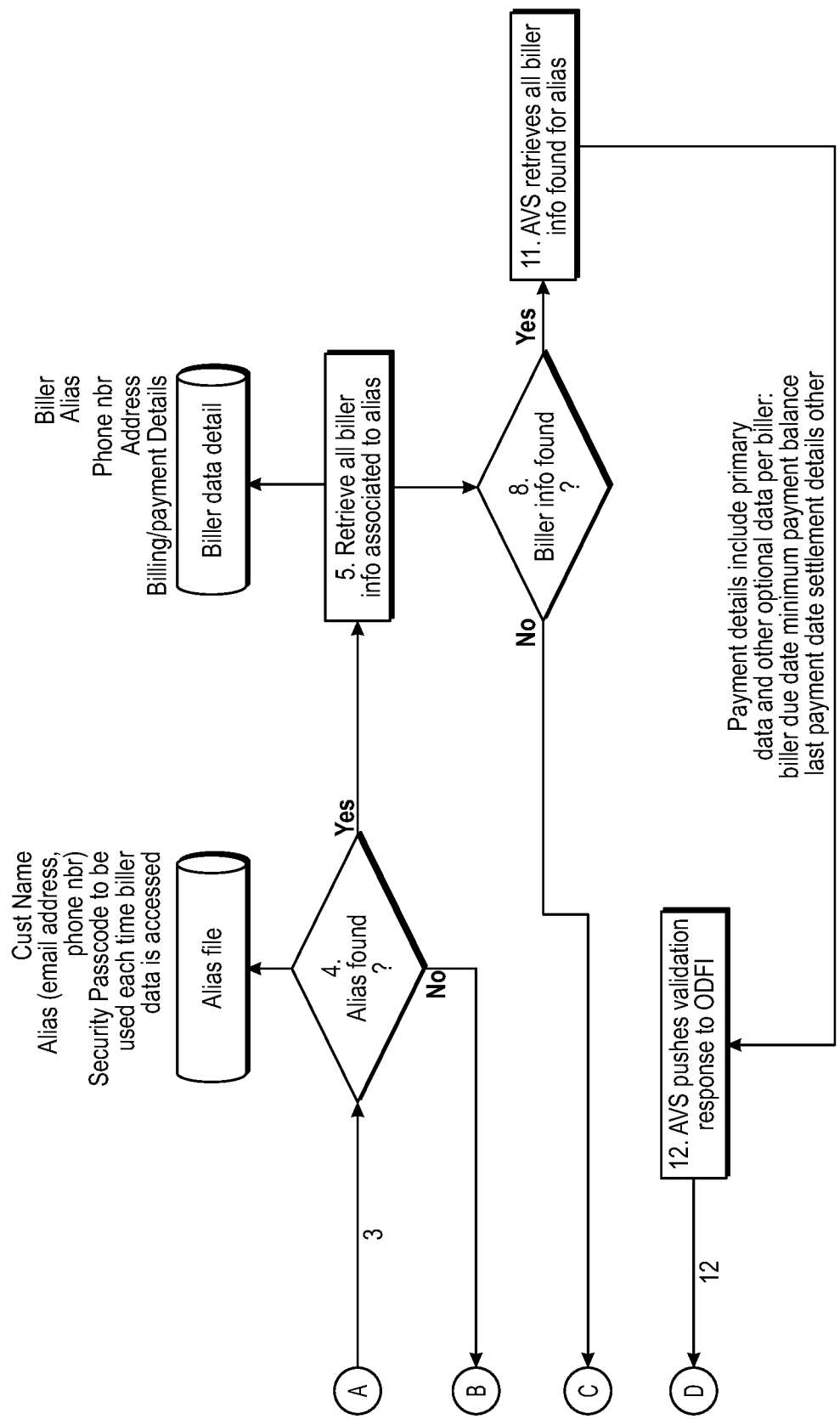

FIGS. 18A and 18B show a flow diagram of a method 1800 of configuring billpay for a plurality of different billers for real-time billpay according to an example embodiment. The method 1800 is similar to the method 1700 of FIG. 17. In the method 1800, the ODFI retrieves all known biller information from billers associated with the customer via the account verification service 130 based on biller information provided by the customer. The biller information includes biller identifications, biller account numbers, biller login credentials, biller passcodes, and the like. When known billers are returned to the ODFI, the customer can select which billers are to be imported into the billpay system.

Figure 19:
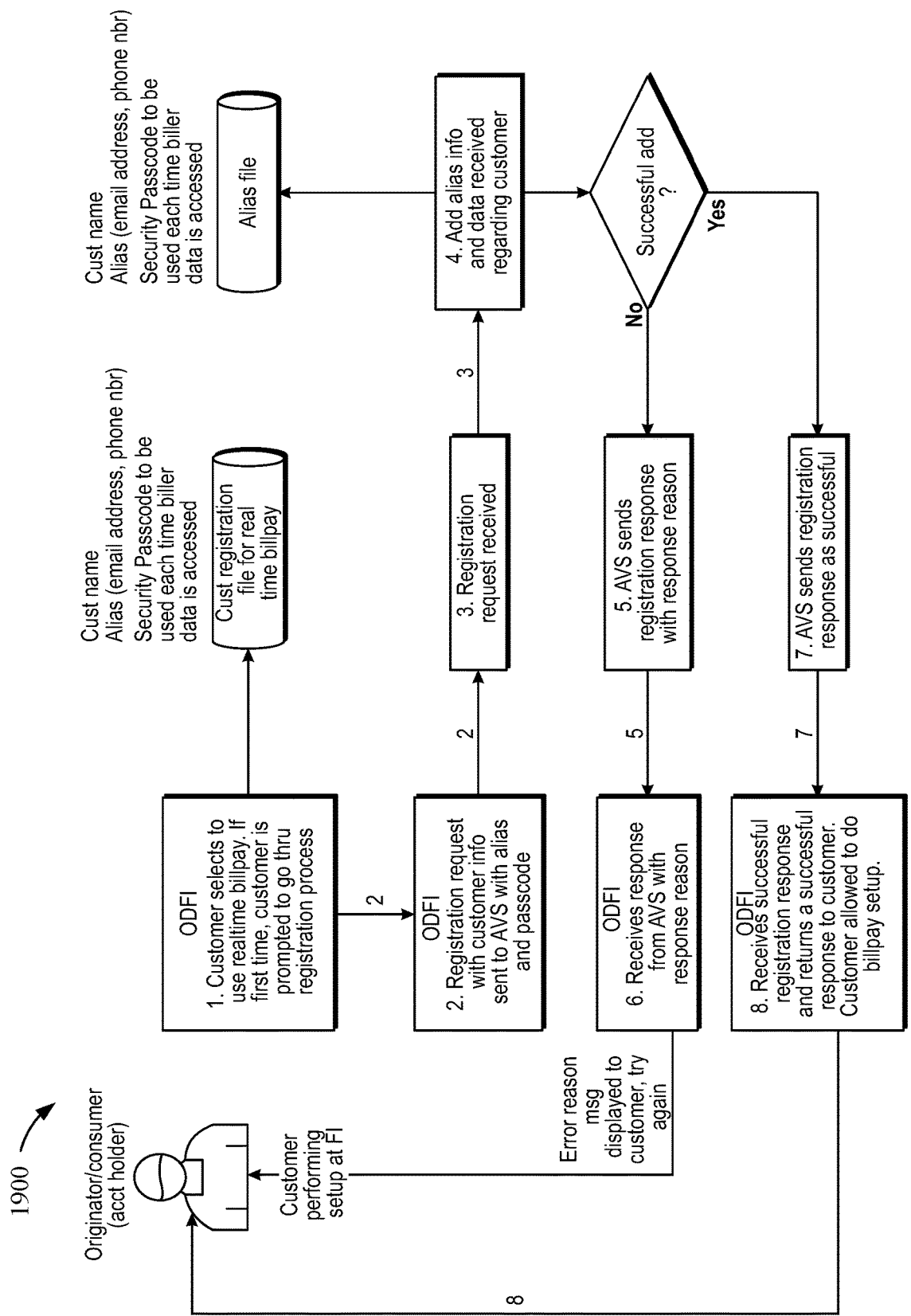
FIG. 19 shows a flow diagram of a method of registering a customer for a billpay service according to an example embodiment.

Referring to FIG. 19, a flow diagram of a method 1900 of registering a customer for a billpay service according to an example embodiment. The billpay service is a real-time bill pay service that is provided by the ODFI via the account verification service 130. The method 1900 may, for example, be performed prior to allowing the customer to registering billers with the billpay service (e.g., before methods 1400, 1500, 1700, 1800, etc.).

Referring to FIGS. 20A, 2B, and 21 through 26, flow diagrams of a method 2000 providing real-time P2P transfers initiated via a third-party using are described. The third-party facilitates the initiation of a real-time P2P funds transfer via the funds transfer system 100. The third-party communicates with an intermediary to facilitate the P2P transfer. In some arrangements, the intermediary is the account verification service computer system 130. In other arrangements, the intermediary may be a financial institution that is a member of the funds transfer system 100 (e.g., the depository bank or the paying bank). A third-party computing system associated with the third-party communicates with the various computing systems via the network 150 to facilitate the P2P transfer. FIG. 20 shows an overview of the method 2000. FIGS. 21 through 26 show various subprocesses that occur at various points during method 2000.

The third-party is a non-banking entity (e.g., an entity that does not maintain demand deposit accounts for its customers) that provides P2P transfer functionality to its customers via the funds transfer system. The functionality may be facilitated through APIs provided by the funds transfer system 100 entities (e.g., the account verification service computer system 130). The third-party may be, for example, a check cashing service, a social media service, or another non-banking entity. The third-party can provide the P2P transfer services to its customers via a website, a smartphone application, or the like. The flow diagram of the method 2000 in FIGS. 20A and 2B assumes that the third-party has already authenticated the customer initiating the P2P transaction (e.g., by authenticating the customer during a login process to access the third-party's website or mobile application).

Once the customer is authenticated by the third-party, the customer enters sender information (e.g., associated with the customer instating the P2P transaction), recipient information associated with the P2P transfer recipient, and an amount to be transferred. The sender information and the recipient information may each be in the form of a token or an alias (e.g., an e-mail address, a phone number, etc.). The third-party sends a message containing the provided information (sender information, recipient information, and payment amount) to the intermediary (e.g., the account verification service computing system 130). The message also includes a unique payment identifier, a business transaction date, and a third party profile identifier. Upon receipt of the message from the third-party, the intermediary looks up and validates both the sender and receiver tokens (and/or aliases) to verify that both the sender and receiver are registered with the real time payment system 100. The intermediary processes the sender and receiver tokens (and/or aliases) against a registration table of registered tokens/aliases to determine the sender and receiver endpoints, source of funds associated with the sender, and whether a real-time transfer is available.

If both tokens (or aliases) are not registered with the real time payment system 100, the intermediary sends a message to the third-party indicating that the transaction cannot be performed because one or both of the tokens (or aliases) are unavailable. The third-party then returns an error message to the customer initiating the transaction. If both tokens (or aliases) are registered with the real-time payment system 100, the intermediary analyzes the identified funds source to determine the type of funds source (e.g., demand deposit account or debit card). Although the method 2000 is described with respect to demand deposit account and debit card sourced transactions, it should be understood that other funds sources, such as credit cards, lines of credit, and the like, can be used as a funds source for a third-party initiated P2P funds transfer.

Figure 20A:
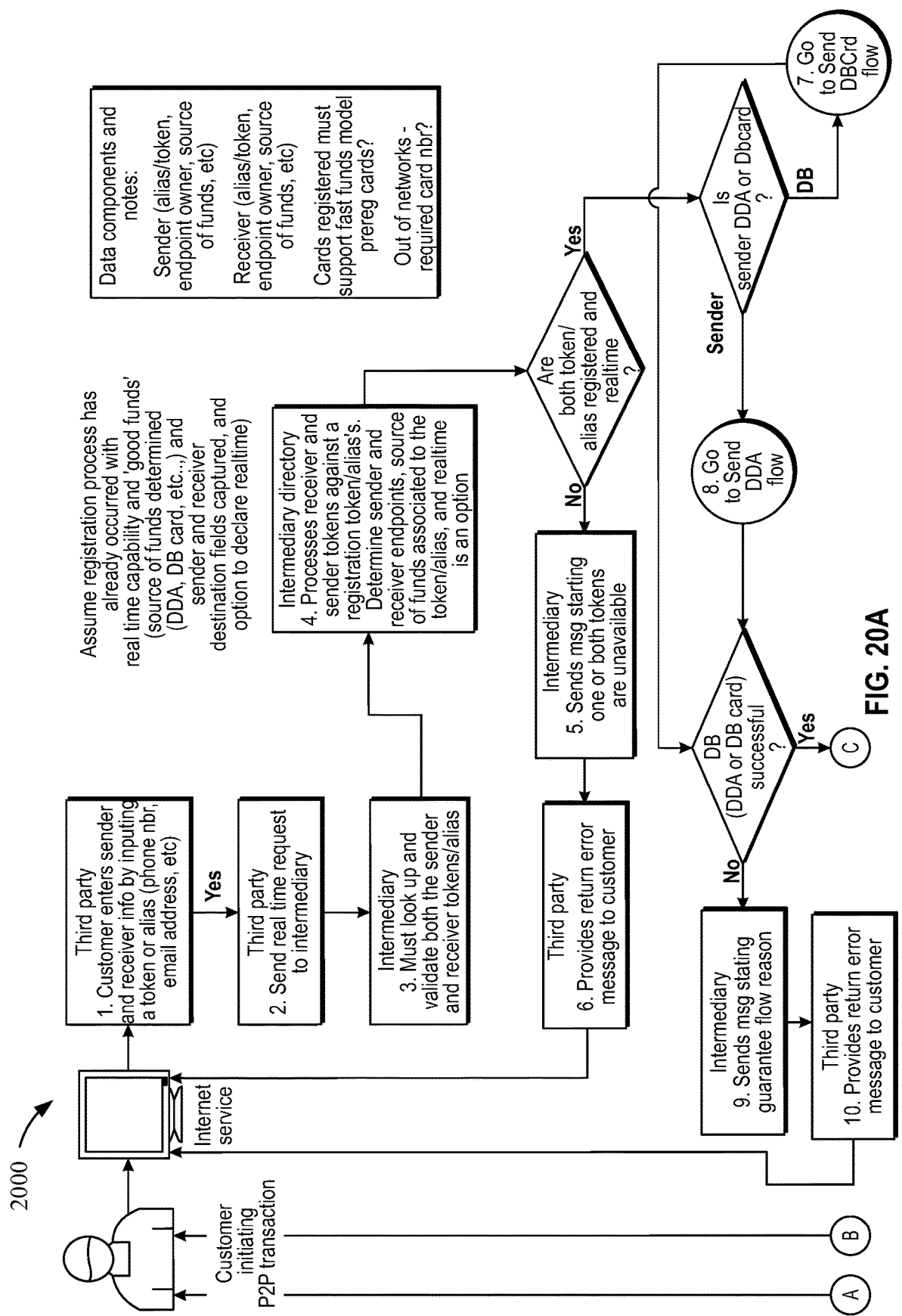
FIGS. 20A, 20B, and 21 through 26, show various flow diagrams of a method 2000 providing real-time P2P transfers initiated via a third-party according to an example embodiment.
Figure 20B:
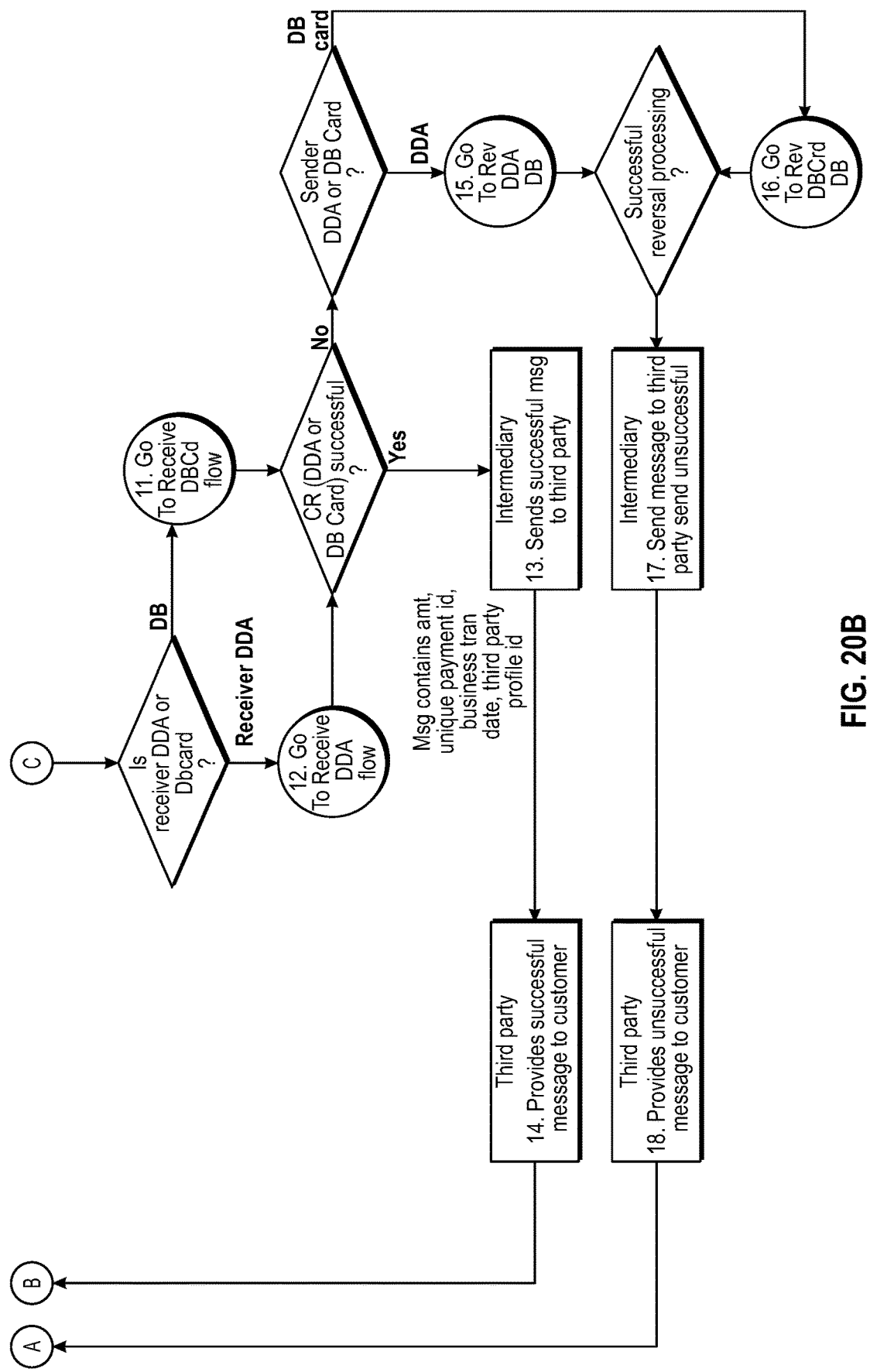
Figure 21:
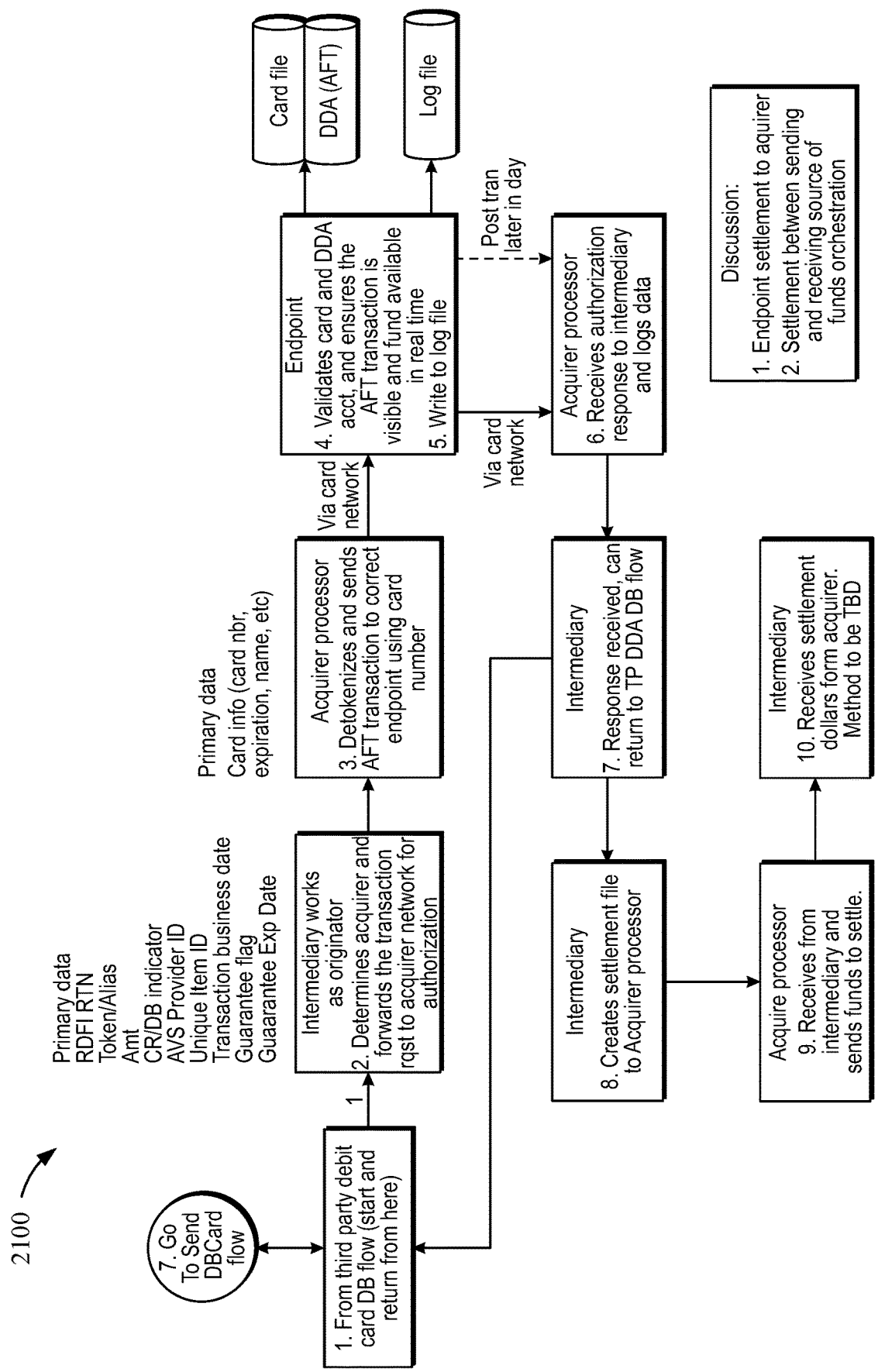

If the funds source is a debit card, method 2000 proceeds to the debit card flow 2100 of FIG. 21. In the debit card flow 2100, the intermediary functions as an originator. Accordingly, the intermediary passes the appropriate debit card number and PIN to an acquirer processor through the traditional debit card network for approval via the card network. In some arrangements, this information is tokenized. If the debit card source is verified and has enough funds, the intermediary creates a settlement file to charge the funds via the acquirer processor. In some arrangements, the funds are transferred immediately to the intermediary. In other arrangements, the funds are transferred after the intermediary confirms that the recipient is capable of receiving the funds. After the debit card is verified (or failure to verify), the method 2000 returns to FIGS. 20A and 20B.

Figure 22:
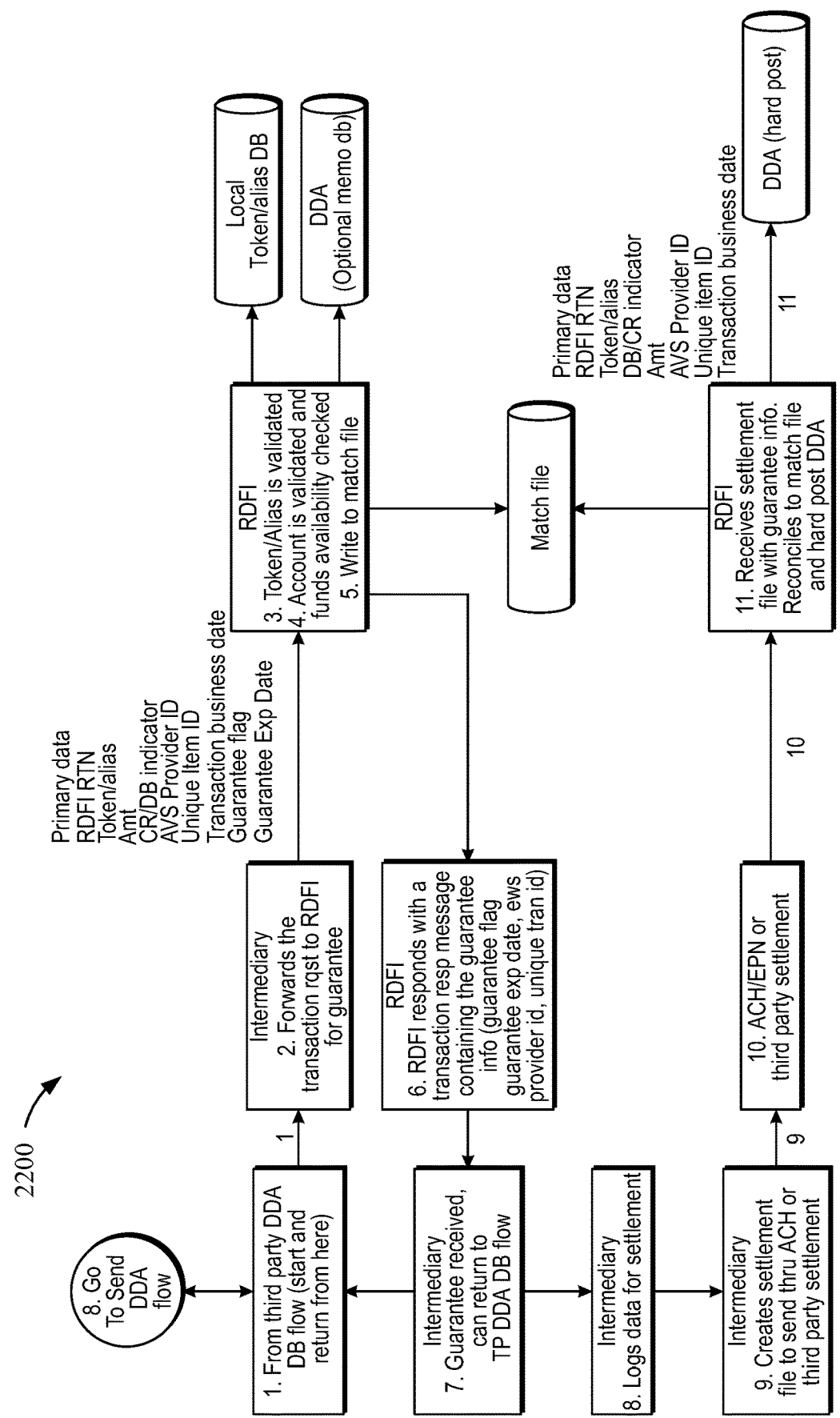
Figure 23:
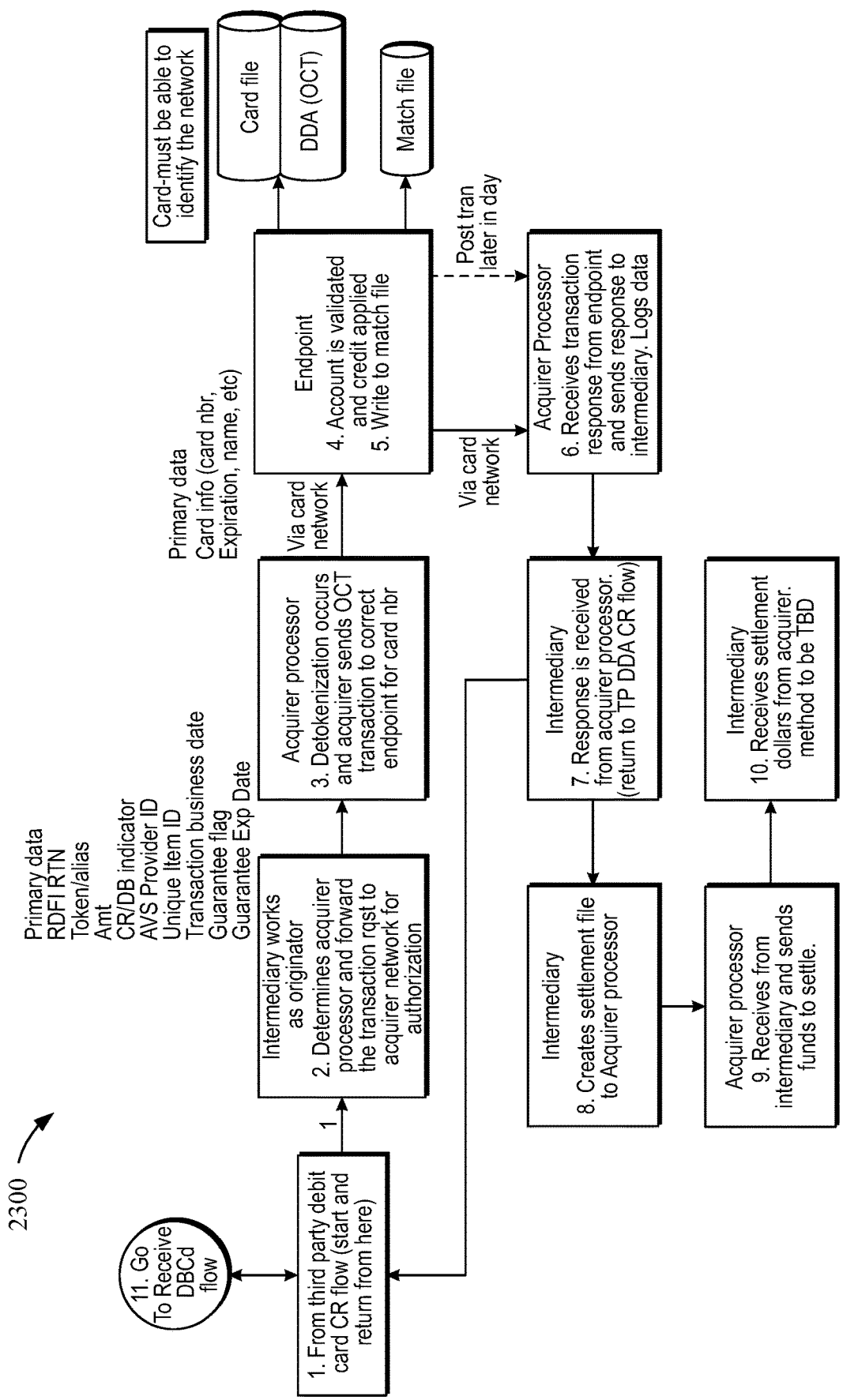
Figure 24:
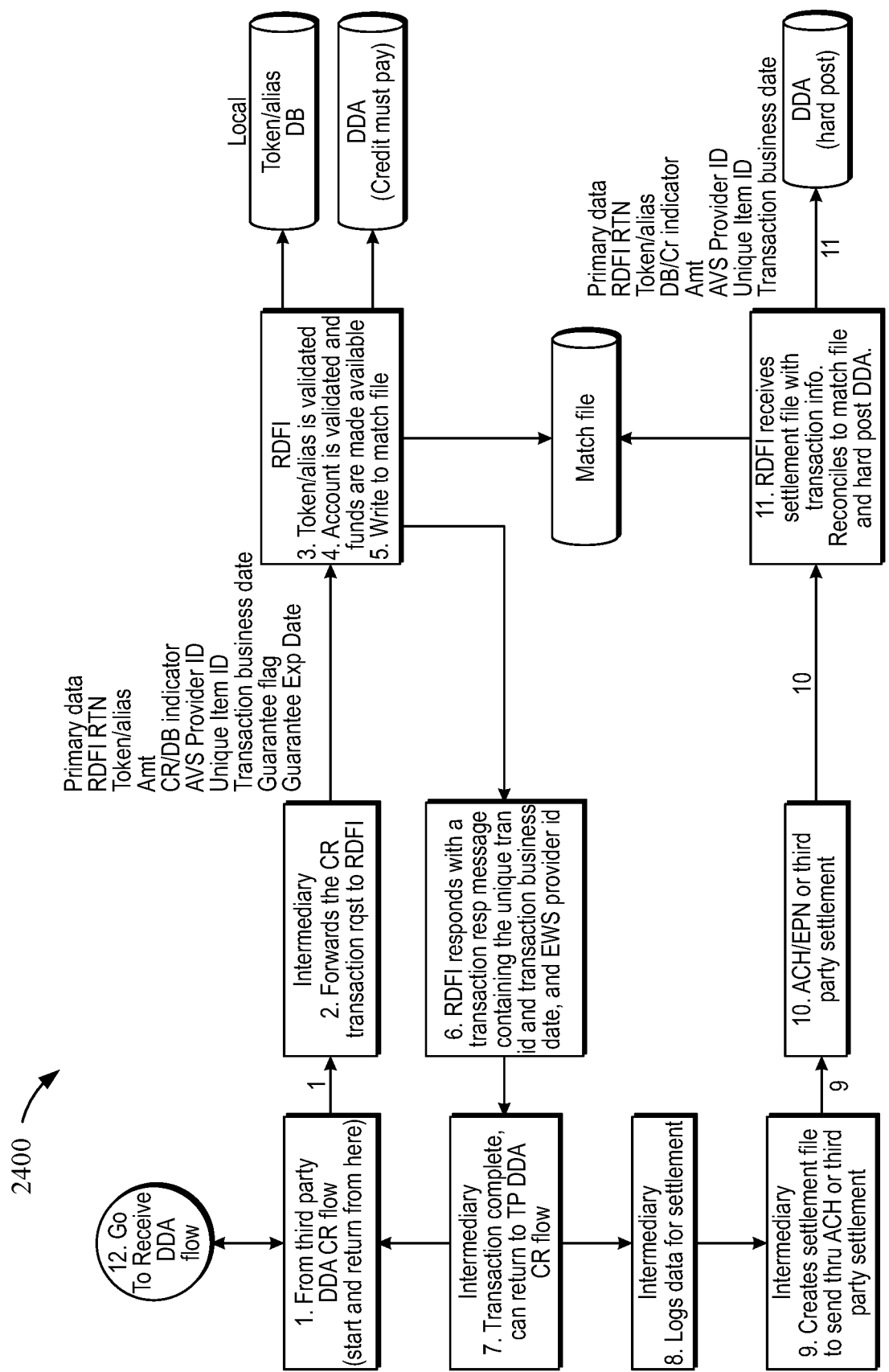

If the funds source is a demand deposit account ("DDA"), the method 2000 proceeds to the DDA flow 2200 of FIG. 22. The intermediary identifies the RDFI associated with the DDA of the sender. The intermediary contacts the RDFI for verification of the account information, sender information, and that funds are available. If the account information, sender information, and the funds are verified, the RDFI issues a guarantee to the intermediary (in a similar manner as discussed above with respect to the non-third-party initiated P2P transfers). After the guarantee is received (or lack thereof), the method 2000 returns to FIGS. 20A and 20B.

Referring again to the method 2000 of FIGS. 20A and 20B, if either of the flows 2100 or 2200 was unsuccessful in securing/verifying funds, the intermediary sends a message to the third party indicating the transaction error. The third-party then sends a message to the customer indicating that the transaction failed. The description of the method 2000 continues under the assumption that the securing and verifying funds was successful.

Next, the recipient information is determined and verified. The intermediary determines whether the recipient account is a DDA or debit card. If the recipient account is a debit card, the method 2000 proceeds to the debit card flow 2300 of FIG. 23. In a similar manner as described above with the debit card flow 2100, here the intermediary functions as the originator. A credit push is sent from the intermediary to the acquirer processor to send the funds (received through the debit card flow 2100 or the DDA flow 2200) to the recipient debit card account. After the transfer of funds (or failure thereof), the method 2000 returns to FIGS. 20A and 20B. In a successful transfer, settlement with the intermediary may occur immediately or at a later point. If the recipient account is a DDA, the method 2000 proceeds to the DDA flow 2400 of FIG. 24. The intermediary forwards the credit transaction information to the RDFI. The RDFI responds with a confirmation of receipt, and the transfer proceeds in a similar manner as discussed above with respect to the non-third-party initiated P2P transfers. After the guarantee is received (or lack thereof), the method 2000 returns to FIGS. 20A and 20B.

If after either flow 2300 or flow 2400 the transaction was successful, the intermediary sends a transaction confirmation to the third-party. The transaction confirmation includes an indication that the transaction initiated by the customer via the third-party was successful. The transaction confirmation message includes the amount of the transaction, the unique payment identifier, the business transaction date, and the third-party profile identifier. In some arrangements, the transaction confirmation includes a transaction identifier or transaction confirmation number.

Figure 25:
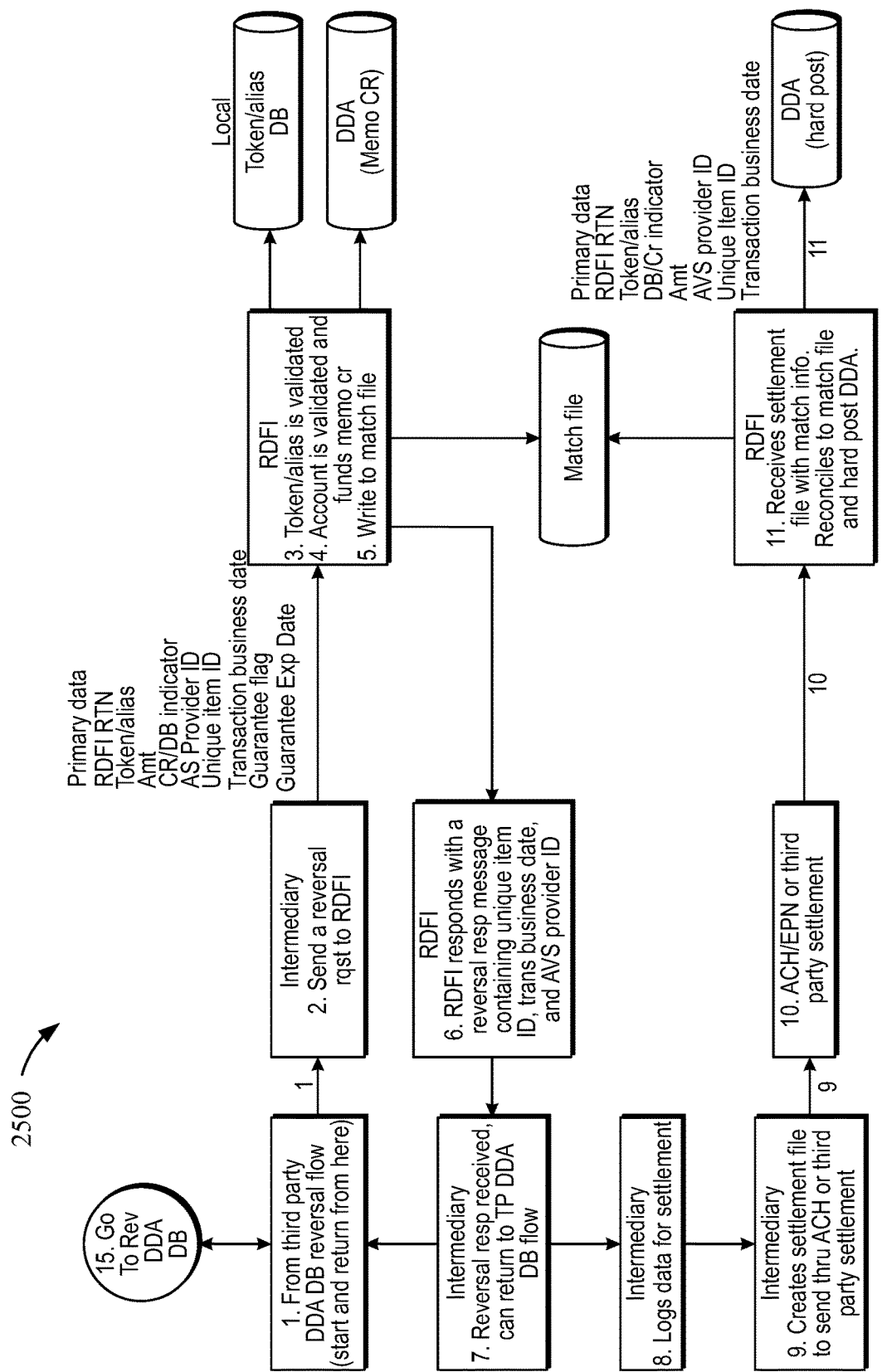
Figure 26:
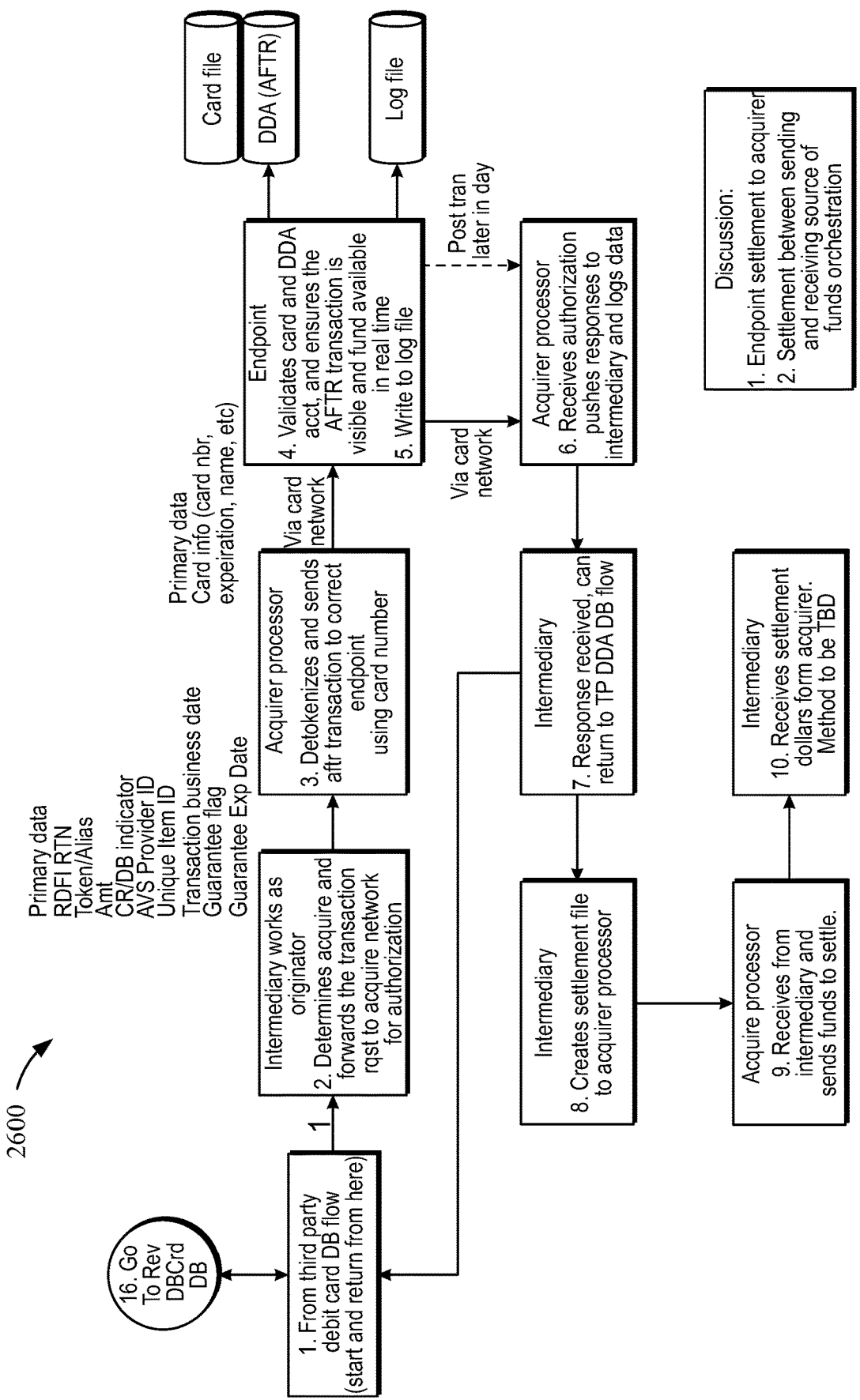

If after either flow 2300 or flow 2400 the transaction was unsuccessful (e.g., if the recipient account was closed), the debit of the sender's funds must be reversed. The reversal flow is different depending on the source of the funds (i.e., the sender's account type). If the source of the funds was a DDA, the DDA reversal flow 2500 of FIG. 25 is performed. If the source of the funds was a debit card, the debit card reversal flow 2600 of FIG. 26 is performed. Each of the reversal flows 2500 and 2600 provides funds that were previously debited from the sender account in the method 2000 back to the sender account. After the reversal performing the appropriate reversal flow 2300 or 2400, the method 2000 returns to FIGS. 20A and 20B. The intermediary sends a message to the third-party indicating that the transaction cannot be performed because the recipient account is invalid or inactive. The third-party then returns an error message to the customer initiating the transaction.

Figure 27:
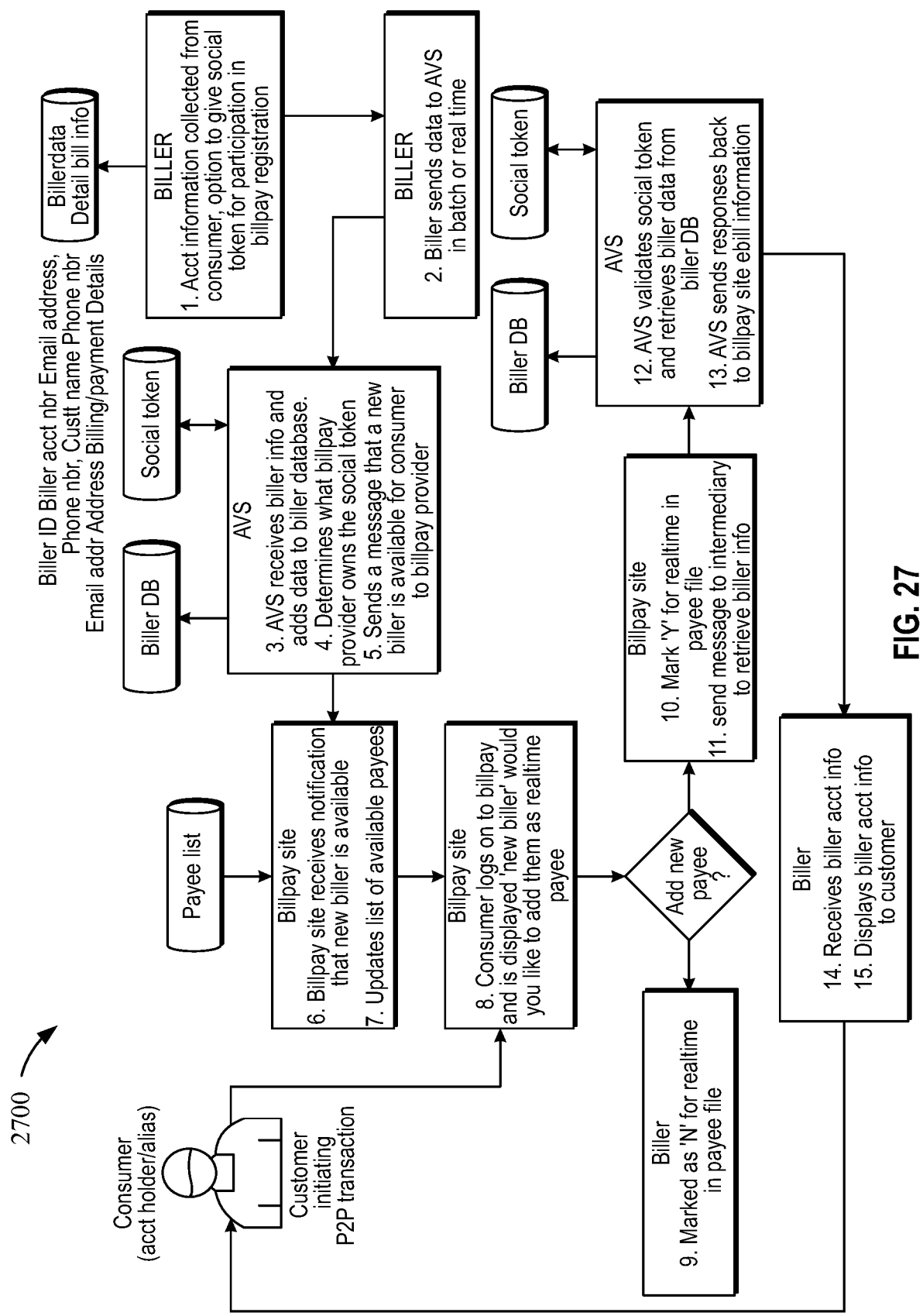
FIG. 27 shows a flow diagram of a method of pushing customer information to a biller according to an example embodiment.

Referring to FIG. 27, a flow diagram of a method 2700 of a biller providing real-time push alerts to a billpay provider or an owner of a social token is shown according to an example embodiment. In the method 2700, the AVS has access to a biller database and a social token database. The social token database stores customer social tokens (e.g., phone number, twitter account name, e-mail address, etc.) with customer information. When a customer signs up for billpay, the customer has the choice of which type of social token to use as their identifier. The customer can then enroll in billpay for a given biller by registering the social token with the biller. The biller then uses the social token to retrieve information about the customer and enroll the customer in the billpay service. Advantageously, the method provides the billers that are associated with the customer a push of updated information. Accordingly, the customer can update the social token database when the customer information changes (e.g., when the customer moves), and all billers relying on the social token for customer information will be provided the updated customer information (instead of requiring the customer to individually update each biller).

Figure 28:
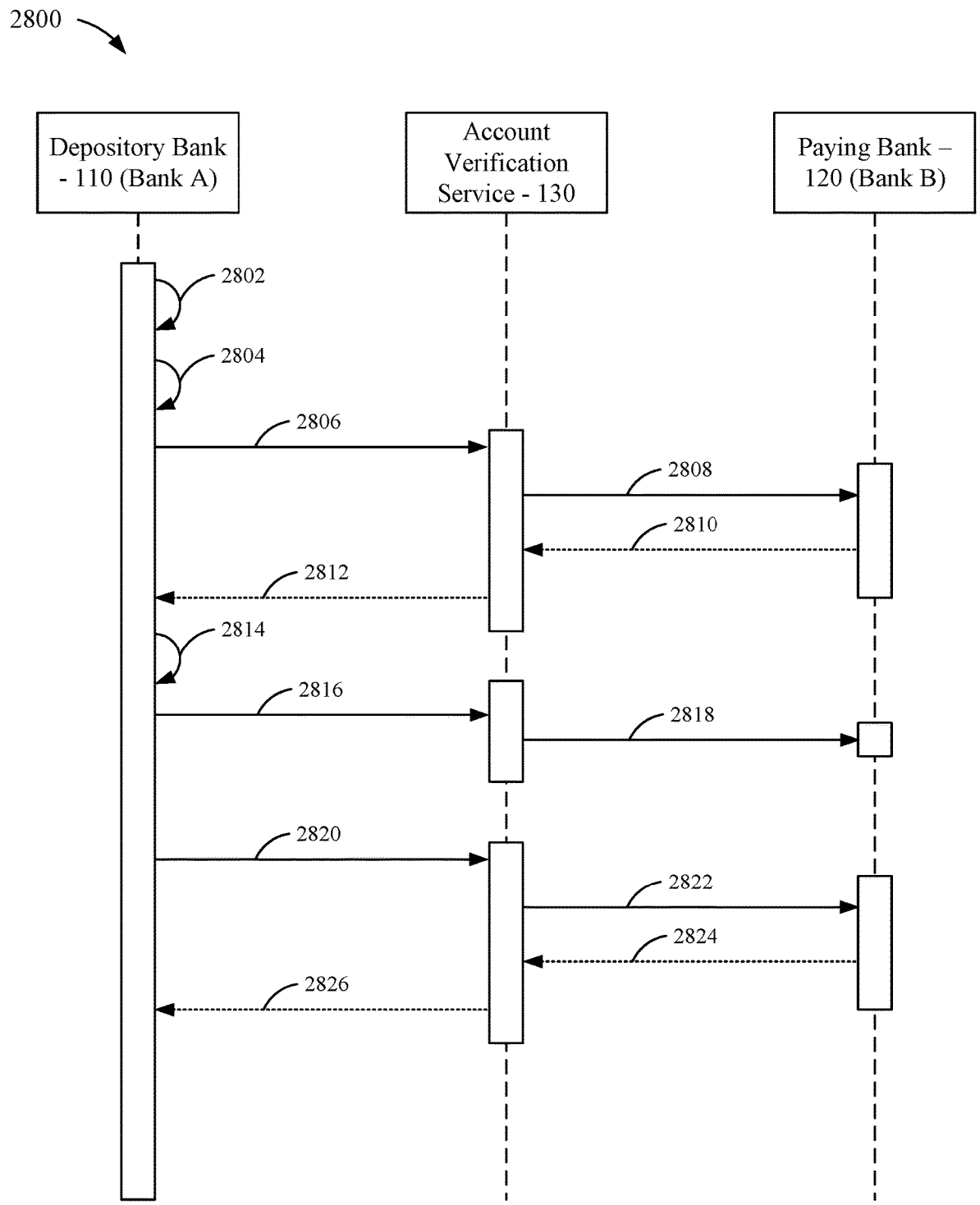
FIG. 28 shows a flow diagram of a method of performing an off-us check deposit with reversal is shown according to an example embodiment.

Referring to FIG. 28, a flow diagram of a method 2800 of performing an off-us check deposit with reversal is shown according to an example embodiment. The method 2800 is performed by the depository bank computer system 110, the paying bank computer system 120, and the account verification service computer system 130. Generally, the method 2800 describes the situation in which a customer of the depository bank deposits a check drawn from an account associated with the paying bank where the check is reversed (e.g., in a similar manner as described above with respect to FIG. 5B). The method 2800 begins when a check is received by the depository bank computer system 110 at 2802. The check is drawn from the account associated with the paying bank. The depository bank computer system 110 analyzes the check and determines that the check is not drawn from an account at the depository bank, and thus is an "off-us" check deposit, at 2804.

The depository bank computer system 110 sends an inquiry request to the account verification service 130 at 2806. The inquiry request is forwarded from the account verification service 130 to the paying bank computer system 130 at 2808. When the paying bank computer system 120 receives the inquiry request, the paying bank computer system 120 verifies the status of the account with the paying bank and that funds are available. The paying bank computer system 120 then transmits an inquiry response with a guarantee to the account verification service 130 at 2810. The account verification service 130 transmits the inquiry response from the paying bank to the depository bank computer system 110 at 2812. Steps 2806 through 2812 are described in further detail above with respect to FIG. 3 (301 through 303).

At this point, the depository bank computer system 110 credits the account of the depositor at 2814. The depository bank computer system 110 sends a transaction complete message to the account verification service 130 at 2816. The account verification service 130 sends the transaction complete message to the paying bank computer system 120 at 2818. Steps 2816 and 2181 are described in further detail above with respect to FIGS. 4 (405 and 406).

The depository bank determines that it needs to reverse the deposit. For example, the depository bank may reverse the deposit of the check if fraud was determined. In some arrangements, the depository bank reverses the transaction based on a request from the paying bank. Accordingly, the depository bank computer system 110 sends a transaction complete reversal message to the account verification service 130 at 2820. The account verification service 130 forwards the transaction complete reversal message to the paying bank computer system 120 at 2822. The paying bank computer system 120 credits the account previously debited in the reversal. Optionally, the paying bank computer system 120 sends a reversal acknowledgement to the account verification service 130 at 2824, which is then forwarded on to the depository bank computer system 110. In some arrangements, the reversal can take place after settlement (e.g., via ACH as described above with respect to FIG. 6). Steps 2820 and 2826 are described in further detail above with respect to FIGS. 5A and 5B (501 through 506).

The above-described systems and methods provide for real-time processing of financial transactions, such as deposits and transfers, between account holders of different financial institutions. The above-described systems and methods provide the real-time processing of these transactions through an enhanced computing system including an account verification service computer system 130 that facilitates communication between the different financial institutions over real-time data channels 138. The described systems may utilize faster, more accurate processing than current financial computing systems to facilitate guaranteed transactions in a faster and more secure manner, which addresses the long transaction times of current financial computing systems. Further, by separating NIT transactions from transactions requiring the initial inquiry from the depository bank and account verification from the paying bank, required computing resources are significantly reduced for each of the depository bank computer system 110, paying bank computer system 120, and account verifications service computer system 130. The elimination of the initial transaction inquiry and verification accelerates the processing of NIT transactions. Many of the daily transactions between the depository bank and the paying bank may be classified as NIT transactions (e.g., approximately half of all transactions may be NIT transactions), which further compounds the time and cost savings.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of performing a peer-to-peer (P2P) transfer by a third-party, the method comprising:
receiving, by a real-time payment system from a third-party device associated with the third-party over a real-time data channel, transfer information and a first token comprising sender information of a sender and a second token comprising receiver information of a receiver, wherein each of the first token and the second token comprises routing information comprising content associated with the transfer information and at least one of a unique payment identifier, a business transaction date, and a third-party profile identifier;
validating, by the real-time payment system, the first token and the second token based on verifying both the sender and the receiver are registered with the real-time payment system;
in response to the sender and the receiver being registered with the real-time payment system, processing, by the real-time payment system, the first token and the second token based on determining a sender endpoint, a receiver endpoint, and a demand deposit account of the sender using the content and the at least one of the unique payment identifier, the business transaction date, and the third-party profile identifier of each of the first token and the second token;
transmitting, by the real-time payment system to a first financial institution computing system over the real-time data channel, a request for a guarantee, the request for the guarantee comprising the sender endpoint and the demand deposit account of the sender;
receiving, by the real-time payment system from the first financial institution computing system over the real-time data channel, an issued guarantee in exchange for a fee, wherein the issued guarantee comprises a guarantee of an availability of funds and a reference number associated with a specific fund transfer;
forwarding, by the real-time payment system to a second financial institution computing system over the real-time data channel, the issued guarantee in exchange for the fee comprising the reference number;
receiving, by the real-time payment system from the second financial institution computing system over the real-time data channel, an acceptance comprising the reference number of the issued guarantee in exchange for the fee;
in response to receiving the acceptance of the issued guarantee, transferring, by the real-time payment system, funds based on the transfer information, the first token, and the second token; and
transmitting, by the real-time payment system to the third-party device, a transfer confirmation.

2. The method of claim 1, wherein the sender information identifies the sender previously authenticated by a third-party website of the third-party, and wherein the receiver information identifies the receiver previously authenticated by the third-party website of the third-party.

3. The method of claim 1, wherein determining the sender endpoint, the receiver endpoint, and the demand deposit account of the sender is based on cross-referencing a registration table of registered tokens.

4. The method of claim 1, further comprising:
determining, by the real-time payment system, real-time transfer is available and the demand deposit account of the sender is available for P2P fund transfers.

5. The method of claim 1, further comprising:
transmitting, by the real-time payment system to the second financial institution computing system over the real-time data channel, transfer information comprising the sender endpoint, the receiver endpoint, and the demand deposit account of the sender.

6. The method of claim 1, wherein the third-party is a non-banking entity and the third-party device communicates over the real-time data channel via an application programming interface (API) provided by the real-time payment system.

7. A real-time payment system comprising:
a processing circuit having at least one processor coupled to at least one memory, the processing circuit configured to:
receive, from a third-party device associated with a third-party over a real-time data channel, transfer information and a first token comprising sender information of a sender and a second token comprising receiver information of a receiver, wherein each of the first token and the second token comprises routing information comprising content associated with the transfer information and at least one of a unique payment identifier, a business transaction date, and a third-party profile identifier;
validate the first token and the second token based on verifying both the sender and the receiver are registered with the real-time payment system;
in response to the sender and the receiver being registered with the real-time payment system, process the first token and the second token based on determining a sender endpoint, a receiver endpoint, and a demand deposit account of the sender using the content and the at least one of the unique payment identifier, the business transaction date, and the third-party profile identifier of each of the first token and the second token;
transmit, to a first financial institution computing system over the real-time data channel, a request for a guarantee, the request for the guarantee comprising the sender endpoint and the demand deposit account of the sender;
receive, from the first financial institution computing system over the real-time data channel, an issued guarantee in exchange for a fee, wherein the issued guarantee comprises a guarantee of an availability of funds and a reference number associated with a specific fund transfer;
forward, to a second financial institution computing system over the real-time data channel, the issued guarantee in exchange for the fee comprising the reference number;
receive, by the real-time payment system from the second financial institution computing system over the real-time data channel, an acceptance comprising the reference number of the issued guarantee in exchange for the fee;
in response to receiving the acceptance of the issued guarantee, transfer funds based on the transfer information, the first token, and the second token; and
transmit, to the third-party device, a transfer confirmation.

8. The real-time payment system of claim 7, wherein the sender information identifies the sender previously authenticated by a third-party website of the third-party, and wherein the receiver information identifies the receiver previously authenticated by the third-party web site of the third-party.

9. The real-time payment system of claim 7, wherein determining the sender endpoint, the receiver endpoint, and the demand deposit account of the sender is based on cross-referencing a registration table of registered tokens.

10. The real-time payment system of claim 7, wherein the processing circuit is further configured to:
determine real-time transfer is available and the demand deposit account of the sender is available for P2P fund transfers.

11. The real-time payment system of claim 7, wherein the processing circuit is further configured to:
transmit, to the second financial institution computing system over the real-time data channel, transfer information comprising the sender endpoint, the receiver endpoint, and the demand deposit account of the sender.

12. The real-time payment system of claim 7, wherein the third-party is a non-banking entity and the third-party device is configured to communicate over the real-time data channel via an application programming interface (API) provided by the real-time payment system.

13. One or more non-transitory computer-readable storage media having instructions stored thereon that, when executed by at least one processing circuit, cause the at least one processing circuit to:
receive, from a third-party device associated with a third-party over a real-time data channel, transfer information and a first token comprising sender information of a sender and a second token comprising receiver information of a receiver, wherein each of the first token and the second token comprises routing information comprising content associated with the transfer information and at least one of a unique payment identifier, a business transaction date, and a third-party profile identifier;
validate the first token and the second token based on verifying both the sender and the receiver are registered with a real-time payment system;
in response to the sender and the receiver being registered with the real-time payment system, process the first token and the second token based on determining a sender endpoint, a receiver endpoint, and a demand deposit account of the sender using the content and the at least one of the unique payment identifier, the business transaction date, and the third-party profile identifier of each of the first token and the second token;
transmit, to a first financial institution computing system over the real-time data channel, a request for a guarantee, the request for the guarantee comprising the sender endpoint and the demand deposit account of the sender;
receive, from the first financial institution computing system over the real-time data channel, an issued guarantee in exchange for a fee, wherein the issued guarantee comprises a guarantee of an availability of funds and a reference number associated with a specific fund transfer;
forward, by the real-time payment system to a second financial institution computing system over the real-time data channel, the issued guarantee in exchange for the fee comprising the reference number;
receive, by the real-time payment system from the second financial institution computing system over the real-time data channel, an acceptance comprising the reference number of the issued guarantee in exchange for the fee;
in response to receiving the acceptance of the issued guarantee, transfer funds based on the transfer information, the first token, and the second token; and
transmit, to the third-party device, a transfer confirmation.

14. The one or more non-transitory computer-readable storage media of claim 13, wherein the sender information identifies the sender previously authenticated by a third-party website of the third-party, and wherein the receiver information identifies the receiver previously authenticated by the third-party website of the third-party.

15. The one or more non-transitory computer-readable storage media of claim 13, wherein determining the sender endpoint, the receiver endpoint, and the demand deposit account of the sender is based on cross-referencing a registration table of registered tokens.

16. The one or more non-transitory computer-readable storage media of claim 13, further comprising additional instructions stored thereon that, when executed by the at least one processing circuit, cause the at least one processing circuit to:
determine real-time transfer is available and the demand deposit account of the sender is available for P2P fund transfers; and
transmit, to the second financial institution computing system over the real-time data channel, transfer information comprising the sender endpoint, the receiver endpoint, and the demand deposit account of the sender.

17. The one or more non-transitory computer-readable storage media of claim 13, wherein the third-party is a non-banking entity and the third-party device can communicate over the real-time data channel via an application programming interface (API) provided by the real-time payment system.

* * * * *